US008006300B2

(12) United States Patent  (10) Patent No.: US 8,006,300 B2
Mizrah  (45) Date of Patent: Aug. 23, 2011

(54) TWO-CHANNEL CHALLENGE-RESPONSE AUTHENTICATION METHOD IN RANDOM PARTIAL SHARED SECRET RECOGNITION SYSTEM

(75) Inventor: Len L. Mizrah, San Carlos, CA (US)

(73) Assignee: Authernative, Inc., Redwood City, CA (US)

( * ) Notice: Subject to any disclaimer, the term of this patent is extended or adjusted under 35 U.S.C. 154(b) by 1046 days.

(21) Appl. No.: 11/552,500

(22) Filed: Oct. 24, 2006

(65) Prior Publication Data
US 2008/0098464 A1  Apr. 24, 2008

(51) Int. Cl.
G06F 21/00 (2006.01)
(52) U.S. Cl. ............... 726/20; 726/18; 726/19
(58) Field of Classification Search ............... 726/18–20
See application file for complete search history.

(56) References Cited

U.S. PATENT DOCUMENTS

| 6,918,035 | B1 | 7/2005 | Patel |
| 6,983,381 | B2 | 1/2006 | Jerdonek |
| 6,993,658 | B1 | 1/2006 | Engberg et al. |
| 7,010,692 | B2 | 3/2006 | Jablon |
| 7,073,067 | B2 | 7/2006 | Mizrah |
| 2004/0119746 | A1 | 6/2004 | Mizrah |
| 2004/0123160 | A1 | 6/2004 | Mizrah |
| 2004/0225880 | A1 | 11/2004 | Mizrah |
| 2005/0050328 | A1 | 3/2005 | Mizrah |
| 2006/0005024 | A1 | 1/2006 | Law |
| 2007/0294533 | A1* | 12/2007 | Toh et al. ............ 713/170 |
| 2008/0320101 | A1* | 12/2008 | Bennett et al. ............ 709/217 |

FOREIGN PATENT DOCUMENTS

| DE | 10102779 | 8/2002 |
| EP | 1223524 A2 | 7/2002 |

OTHER PUBLICATIONS

"The Power to Message: FAQ". http://bulksms.2way.co.za/w/faq.htm. May 20, 2006 (Wayback Machine). http://bulksms.2way.co.za/w/faq.htm. pp. 1-4.*
EP Search Report for EP Patent Application 07119441.7-2415 mailed on Apr. 2, 2008.

* cited by examiner

Primary Examiner — Nasser Moazzami
Assistant Examiner — Lisa Lewis
(74) Attorney, Agent, or Firm — Haynes Beffel & Wolfeld LLP

(57) ABSTRACT

Random partial shared secret recognition is combined with using more than one communication channel between server-side resources and two logical or physical client-side data processing machines. After a first security tier, a first communication channel is opened to a first data processing machine on the client side. The session proceeds by delivering an authentication challenge, identifying a random subset of an authentication credential, to a second data processing machine on the client side using a second communication channel. Next, the user enters an authentication response in the first data processing machine, based on a random subset of the authentication credential. The authentication response is returned to the server side on the first communication channel for matching. The authentication credential can be a one-session-only credential delivered to the user for one session, or a static credential used many times.

17 Claims, 39 Drawing Sheets

Table 1A

| Number of Password (or PIN) Positions in OTAC (One Time Authentication Challenge) | 3 | 4 | 5 | 6 | Letter Case Sensitivity |
|---|---|---|---|---|---|
| OTAR combinatorial capacity: | 85,184 | 3,784,096 | 164,916,224 | 7,256,313,856 | no |
| Probability to guess OTAR: | ~1.2e-5 | ~2.7e-7 | ~6.1e-9 | ~1.4e-10 | no |
| OTAR combinatorial capacity: | 343,000 | 24,010,000 | 1,689,700,000 | 117,649,000,000 | yes |
| Probability to guess OTAR: | ~2.9e-6 | ~4.2e-8 | ~5.9e-10 | ~8.5e-12 | yes |

FIG. 25

Table 1B

| Number of Path or Password (or PIN) Positions in OTAC (One Time Authentication Challenge): | 1 | 2 | 6 | Session Authentication Credential (SAC) |
|---|---|---|---|---|
| Combinatorial capacity on 10 by 10 grid: | 100 | 10,000 | 1,000,000,000,000 | no |
| Probability to guess OTAR (RPDPR): | ~1.0e-2 | ~1.0e-4 | ~1.0e-12 | no |
| Combinatorial capacity on 10 fields SAC: | 10 | 100 | 1,000,000 | yes |
| Probability to guess OTAR (RPDPR): | ~1.0e-1 | ~1.0e-2 | ~1.0e-6 | yes |
| Combinatorial capacity on 9 fields SAC: | 9 | 81 | 531,441 | yes |
| Probability to guess OTAR (RPPPR): | ~1.1e-1 | ~1.4e-2 | ~1.9e-6 | yes |

FIG. 26

Table 2

| RPPR | Combinatorial Capacity of One Field Pattern vs. Number of Objects (CO–color, IM–image, CR–alphanumeric character or a special mark, letters are case sensitive) | | | | |
|---|---|---|---|---|---|
| Object Types | 1 object | 2 objects | 3 objects | 4 objects | 5 objects |
| CO | 9 | | | | |
| IM | 35 | | | | |
| CR | 70 | | | | |
| CO-IM | | 315 | | | |
| CR-CO | | 630 | | | |
| CR-IM | | 2,450 | | | |
| CR-CR | | 4,900 | | | |
| CR-CO-IM | | | 22,050 | | |
| CR-CR-CO | | | 44,100 | | |
| CR-CR-IM | | | 171,500 | | |
| CR-CR-CR | | | 343,000 | | |
| CR-CR-CO-IM | | | | 1,543,500 | |
| CR-CR-CR-CO | | | | 3,087,000 | |
| CR-CR-CR-IM | | | | 12,005,000 | |
| CR-CR-CR-CR | | | | 24,010,000 | |
| CR-CR-CR-CO-IM | | | | | 108,045,000 |
| CR-CR-CR-CR-CO | | | | | 216,090,000 |
| CR-CR-CR-CR-IM | | | | | 840,350,000 |
| CR-CR-CR-CR-CR | | | | | 1,680,700,000 |
| Sub-Totals | 114 | 8,295 | 580,650 | 40,625,500 | 2,845,185,000 |

FIG. 27

Table 3

| RPPR | Combinatorial Capacity of a One Time Authentication Response OTAR Vs. Number of RPPR Field Positions in a One Time Authentication Challenge OTAC | | | |
|---|---|---|---|---|
| | 2 FIELDS | 3 FIELDS | 4 FIELDS | 5 FIELDS |
| Number of Objects per Field in a One Time Authentication Response OTAR | | | | |
| 1 | 1.30E+04 | 6.48E+06 | 1.69E+08 | 1.93E+10 |
| 2 | 6.88E+07 | 5.71E+11 | 4.73E+15 | 3.93E+19 |
| 3 | 3.37E+11 | 1.96E+17 | 1.14E+23 | 6.60E+28 |
| 4 | 1.65E+14 | 6.53E+22 | 2.72E+30 | 1.11E+38 |
| 5 | 8.10E+18 | 2.30E+28 | 6.55E+37 | 1.86E+47 |

FIG. 28

Table 4

| RPDPR | Combinatorial Capacity of a One Time Authentication Response OTAR Vs. Number of RPDPR Fields the Grids Are Instantiated From in a One Time Authentication Challenge OTAC | | | |
|---|---|---|---|---|
| | 2 FIELDS | 3 FIELDS | 4 FIELDS | 5 FIELDS |
| Number of Field Position Indicators Along the Path at Each Field the Grid is Instantiated From in a One Time Authentication Challenge OTAC | | | | |
| 1 | 1.0E+04 | 1.0E+06 | 1.0E+08 | 1.0E+10 |
| 2 | 1.0E+08 | 1.0E+12 | 1.0E+16 | 1.0E+20 |
| 3 | 1.0E+12 | 1.0E+18 | 1.0E+24 | 1.0E+30 |
| 4 | 1.0E+16 | 1.0E+24 | 1.0E+32 | 1.0E+40 |
| 5 | 1.0E+20 | 1.0E+30 | 1.0E+40 | 1.0E+50 |

FIG. 29

Table 5

| RPPR/RPDPR | Ratio of RPPR/RPDPR Combinatorial Capacities Vs. Number of Fields in a One Time Authentication Response OTAR | | | |
|---|---|---|---|---|
| | 2 FIELDS | 3 FIELDS | 4 FIELDS | 5 FIELDS |
| Number of Objects per Field in a One Time Authentication Response OTAR | | | | |
| 1 | 1.30 | 1.48 | 1.69 | 1.93 |
| 2 | 0.688 | 0.571 | 0.473 | 0.393 |
| 3 | 0.337 | 0.196 | 0.114 | 0.0660 |
| 4 | 0.165 | 0.0653 | 0.0272 | 0.0111 |
| 5 | 0.0810 | 0.0230 | 0.00655 | 0.00186 |

FIG. 30

Table 6

| Browser 1<br>(+ Server Watermark) | Browser 2<br>(+ Server Watermark) |
|---|---|
| User Name | User Name |
| ↓ | + |
| Session PIN → | Session PIN |
|  | + |
| RPDPR Grid + Path SAC (+ Grid Watermark) | ← Static PIN |
| ↓ | ↓ |
| OTAR | ← OTAC |

FIG. 31

TWO-CHANNEL CHALLENGE-RESPONSE AUTHENTICATION METHOD IN RANDOM PARTIAL SHARED SECRET RECOGNITION SYSTEM

BACKGROUND OF THE INVENTION

1. Field of the Invention

The invention relates generally to user authentication systems used for access control in computer and network security systems; and more particularly "strong" and "layered" authentication algorithms and security systems based on more than one authentication factor, and utilizing in combination more than one communication channel for user authentication.

2. Description of Related Art

In systems allowing remote users, authentication is particularly important, because on-line systems operating under the normal societal presumption that the remote user is who she claims are vulnerable to fraud. The lack of appropriate authentication technology in recent years has led to significant financial losses in the financial industry and loss of consumer trust in on-line transactions. Thus, privacy and security concerns arising from the lack of appropriate authentication technologies have delayed implementation of e-commerce and promising on-line information systems in healthcare, education, and other industries.

In recent years, user authentication development is driven by a combination of social and technological factors. Notable social factors include legislation mandating compliance with various on-line security policies, for instance:

1. FFIEC Releases Guidance on Authentication in Internet Banking Environment (http://www.ffiec.gov/press/pr101205.htm) (http://0041b1a.netsolhost.com/FFIEC_ FAQ.pdf)
2. U.S. Gramm-Leach-Bliley Act (GLBA) (http://www.ftc.gov/privacy/glbact/glbsub1.htm)

Also, there have been several important technological advances in user authentication technology (SSL, VPN, etc.) and in enterprise software applications (ERP, CRM, etc.):

1. Authentication technology has been recognized as a center piece in commercial Identity and Access Management (I&AM) product offerings. I&AM products cover a complete spectrum of Authentication, Authorization, and Administration (AAA) capabilities and, as a result, promote intensive integration of authentication technologies into enterprise security systems.
2. It has been recognized by vendors of authentication (or full fledged AAA) systems and their customers that combining several authentication factors into a multi-factor "strong" authentication system is the best method for achieving enhanced security.
3. Commercial success and quick adoption of fraud prevention and monitoring, and risk analysis engines, especially in the financial sector, have led to intensive integration of complementary capabilities of the authentication technology and fraud/risk analysis algorithms (for instance, RSA Security's acquisition of Cyota (http://rsasecurity.com/press_release.asp?doc_id=6410&id=1034) followed later by EMC's acquisition of RSA Security (http://www.rsasecurity.com/press_release.asp?doc_id=7317&id=1034)).
4. It has become quite clear that remote user authentication has to be viewed in a context of more generic Web Services leading eventually to a federated identity system allowing an on-line user to access network resources for which the user is authorized with the one set of credentials and without re-authentication between connected sessions. This has led to efforts to developing common authentication standards (for instance, led by Sun Microsystems "Liberty Alliance" http://www.projectliberty.org, Microsoft, IBM, Identrus, and others), recommendations of the National Institute of Standards and Technology in September 2004 for authentication (Electronic Authentication Guideline; http://csrc.nist.gov/publications/nistpubs/800-63/SP800-63v6_3_3.pdf), and the initiative for Open Authentication (OATH; http://csrc.nist.gov/publications/nistpubs/800-63/SP800-63V1_0_2.pdf) which addresses the challenges of standard, open technology.
5. Verisign, the security division of EMC-RSA Security, and some other companies announced publicly available commercial user authentication services, which promote further integration of networking and authentication technologies for both consumer and enterprise market.

"Strong" and "layered" authentication systems are based on combinations of two or more factors arising from three basic types of authentication factors, including (1) "what user knows" factors (PIN or password), (2) "what user is" factors (various systems utilizing unique biometric traits, such as fingerprint, voice pattern, retina pattern, etc.), and (3) "what user has" factors (hardware or software token, smart card, etc.). Generally speaking, a "strong" system is built by using two different types of authentication factors, whereas a "layered" system can use two different authentication factors of the same type. Hence, these security systems may use a PIN or password as one authentication factor and a hardware token as another, or any two or more combinations of various factors like two passwords, or one biometric factor and a hardware token. However, the choices of factors are based on optimization of three requirements—high usability, low Total Cost of Ownership (TCO), and high security. Certainly, having two passwords is not an attractive option for many customers as users have issues remembering just one, though TCO and security requirements may speak for this option. A combination of one biometric device and hardware token is obviously rejected, because of the high TCO and high usability requirement. A similar optimization technique is applied to any other possible combination of factors leaving the current leading techniques including PIN+card, PIN+token, or PIN+biometric device combinations. One should be careful when comparing influence of human factor on the authentication factor security. As a matter of fact, users forgetting their passwords, or easily disclosing them to intruders, or having difficulties in using passwords may just as easily forget or loose tokens, break them, feel uncomfortable wearing tokens all the time or using them, can keep tokens in unsafe locations, etc. In other words, a user, as a weakest link in the user authentication technology, could mishandle authentication factors with comparable ease. Hence, usability, TCO, security, and possible additional requirements (like availability of electronic deployment, availability of user on-line self-service, ease of administration, etc.) considered together is the only comprehensive optimization analysis which should be applied when comparing any "strong" and "layered" authentication solutions.

Traditional hardware-based authentication devices like tokens, smart cards, or biometric devices typically provide quite high security. The issues with their practical usage as "strong" and "layered" authentication system components lie in their relatively high manufacturing cost, the cost and time of deployment, and the cost and convenience of ongoing administration. Certainly, PIN- or password-based solutions look much more attractive in these respects.

Meanwhile, mobile devices like phones, PDAs, pagers, etc. rampantly swept worldwide markets in the last decade. This phenomenal spread of mobile devices, which far exceeds that of tokens, smart cards, or biometric devices, has brought the attention of security experts, who devise approaches to utilize these devices as another hardware-based user authentication factor. Indeed, account holders in mobile device networks are already verified and identified to assure their legal and financial responsibilities. There are no requirements for security system manufacturers and vendors, security services providers, and eventually, enterprise customers of these security systems to sustain manufacturing, distribution, and administrative costs of mobile devices—it is all taken care of by wireless carriers and service providers, and mobile account owners. Moreover, mobile phones can also be used as a hardware-based biometric authentication factor delivering user's voice pattern and as a hardware-based geographic location identification and verification factor (see for instance, Inoue, U.S. Pat. No. 6,973,068; Dacosta, U.S. Pat. No. 6,978,023; Inoue, U.S. Pat. No. 6,167,513; Multerer, U.S. Pat. No. 6,134,658; Sollee, U.S. Pat. No. 6,101,380; Bales, U.S. Pat. No. 5,781,863). These capabilities, allowing for integrating several user authentication factors in one hardware device, make mobile phones attractive as a hardware-based component for a multi-factor, "strong" and "layered" user authentication system.

It is apparent that there are limitations in using mobile devices for user authentication purposes as they do not yet have a global reach—there are locations in which communication is not available or somewhat hampered. There are possibilities that some sort of spam, viruses, worms, malware, and spyware can reach mobile devices, especially due to an obvious trend of integrating wireless phone, Internet, email, and SMS (Short Message Service) protocols and developing new networking applications for mobile devices. However, due to the reasons presented above, as well as continuous improvement of mobile services and technologies, and significant investment coming to the wireless market, the temptation to use mobile devices either as a stand alone user authentication factor, or in a combination with other authentication factors (multi-factor, "strong" and "layered" authentication systems) is quite high, and practical security system deployments embracing mobile devices have been announced in different countries.

Along with using a mobile device as a user authentication factor, a new authentication technology came into being under the name of One Time Pin (or Password)—OTP. There are numerous practical architectures utilizing this technology. Several key known schemes are as follows:

1. SMS payment security is a service that adds an additional layer of security by using Short Message Service (SMS) as part of completing bill payments and funds transfers to other people. SMS payment security service allows customers to first be identified by their internet banking login and password and then by the OTP—a one-time SMS code. This service works by sending a randomly generated, one time only code OTP via SMS to user's mobile phone while completing an on-line payment. Then, user enters the unique code into the payment confirmation screen within a short allowable period of time to complete the payment.
2. User enters user name and password (or PIN) into a browser or another login screen and then receives an SMS message with OTP which is expected to be entered into the login screen to complete the two-factor user authentication login process. There is a modified approach, where user enters a user name into a browser or another login screen and then receives an SMS message with OTP which is expected to be entered into the login screen together with user's PIN to complete the two-factor user authentication login process.
3. The server-generated OTP (in this case, it is a One Time Phone number) is presented to the user's login screen. Then, the user calls this number from her mobile phone with a previously registered number. The server, by verifying that the call came from a registered number, can be confident that the user is the account holder.

The first scheme is basically a regular login into a user's account, followed by a particular transaction authorization for the user (the account holder) through successful performance of a user authentication step with an OTP sent through SMS to the user's mobile phone, and entered through the payment screen for delivery to the financial institution. It gives assurance and irrefutable (non-repudiation) evidence to the financial institution that this is the account holder who authorized the transaction, and it gives assurance to the user that nobody else can perform a transaction in this account without having the authentication credentials.

Internationally known security expert Bruce Schneier recently noted (http://www.schneier.com/blog/archives/2005/03/the_failure_of.html; http://www.schneier.com/blog/archives/2005/04/more_on_twofact.html) that multi-factor login authentication, though useful as an additional security filter, is not addressing piggybacking by an intruder performing a Man-in-the-Middle (MITM) attack. In other words, the intruder is not after authentication credentials, but rather is waiting on the line between the user and the financial institution, humbly and quietly allowing authentication protocol messages to be exchanged until the user is authenticated. Then, the intruder can own the session by cutting off the user and, for example, making additional transactions such as disastrous money transfers. Hence, the first scheme allows elimination of a MITM attack through a user authentication step (which is not necessarily supposed to be utilizing a mobile device) which is bound to each particular transaction. The second scheme differs from the first one only in the sense that the authentication step involving OTP is requested during the user login process giving access to the user's account. The third scheme looks less practical for user authentication, requiring a large pool of available phone numbers for consumer level implementation and making it less convenient for a user by requesting to make a call.

Usability and TCO make mobile devices look quite attractive as hardware-based user authentication factors in security systems for the consumer market. That is why more attention is required to assess security of using mobile devices in various multi-factor "strong" and "layered" user authentication systems. There is a scheme in which the on-line account holder enters her user name into the login screen and then gets an SMS carrying an OTP on her mobile device to be entered into the same login screen to complete the authentication process. It is similar to scheme 2 discussed above but without a static password or PIN that the user is supposed to remember and enter first. Clearly, it is a very risky proposition because, if the mobile device is lost, stolen, or left anywhere, it will immediately put the account holder in danger.

The variation of this scheme is that the user gets an SMS carrying an OTP on her mobile device, and then, instead of entering OTP into the login screen, the user initiates another SMS message to the financial institution back office transmitting the very same OTP and displaying to the financial institution back office the user's mobile phone caller ID. This split of the authentication session onto several SMS communication sessions somewhat improves security, as intercepting on communication lines OTP sent to the user is not sufficient enough to let the intruder login to the user account without having the actual mobile device. Nevertheless, user authentication based only on a mobile device ownership provides insufficient security protection. Adding PIN or password to this scheme is a natural enhancement converting it into a two-factor "strong" user-authentication system with one "what user knows" authentication factor (PIN/password) and another "what user has" authentication factor (mobile phone). Indeed, adding PIN or password certainly improves security, and is not at odds with the user experience or a prohibitive cost increase.

At the same time, such a two-factor "strong" authentication system based on a PIN/password and a mobile device ownership is still quite vulnerable to conventional intruding techniques. There are numerous known attacks against PIN/password authentication factor—brute force, Trojan horses, key logging software, phishing, "shoulder surfing", social engineering attacks, etc. Stealing user's mobile device or attempting an unauthorized usage of it—are no less conventional and accessible techniques. Therefore, just mechanically combining two independent user authentication technologies, though it does increase the amount of an intruder's effort needed to obtain authentication credentials, does not make it more challenging technologically.

Representative prior art authentication technologies are described in Engberg, U.S. Pat. No. 6,993,658; Katz, U.S. 2003/0061503; Ehlers, U.S. 2003/0172272; Bravo, U.S. 2002/0177433; Sormunen, U.S. Pat. No. 6,112,078.

Accordingly, what is needed is a multi-factor "strong" user-authentication system and a method which offers more than one communication channel for user's authentication session (like browser and mobile phone, or browser and e-mail, etc.) while enhancing OTP technology security by mitigating possible channel intrusion or preemption.

What is also needed is a multi-factor "strong" user-authentication system and method which offers more than one communication channel for a user's authentication session (like browser and mobile phone, or browser and e-mail, etc.) while enhancing PIN/password technology security by mitigating possible entropy leakage (or a complete entropy loss) of this authentication credential to intruder during one or several login sessions.

Also, what is yet needed is a multi-factor "strong" user-authentication system and method which offers more than one communication channel for a user's authentication session (like browser and mobile phone, or browser and e-mail, etc.) while enhancing OTP and PIN/password technologies' security against intruding attacks by integrating these technologies together and cutting off conventional techniques of attacking authentication credentials.

SUMMARY OF THE INVENTION

An interactive authentication technology is described satisfying these needs. The technology is based on the use of random partial shared secret recognition combined with using more than one communication channel between server side resources and a user having access to two data processing machines, where the data processing machines may be logical or physical machines. A basic authentication session as described herein includes a random subset challenge-response security tier based on establishing an authentication credential either before (e.g., in the case of a static credential) initiating the session or after (e.g., in the case of a dynamic credential) initiating the session, opening a first communication channel between server side resources and a first data processing machine on the client side and initiating an authentication session. Then, the session proceeds by delivering an authentication challenge to a second data processing machine on the client side using a second communication channel, where the authentication challenge identifies a random subset of the authentication credential. Next, the user enters an authentication response in the first data processing machine, where the response is random subset of the authentication credential, or otherwise based on a cognitive association between the random subset identified in the authentication challenge and the authentication credential and does not include all of the authentication credential. The authentication response is returned from the first data processing machine to the server side resources on the first communication channel. In embodiments described herein, where the authentication challenge identifies a random subset of the authentication credential, the authentication response comprises the random subset of the authentication credential identified by the challenge. Thus, a multi-channel, random partial shared secret recognition system is provided for authentication of clients, such as may be required for access to protected resources. Examples of protected resources which might be protected by the authentication processes described include on-line financial accounts, sensitive records and trade secrets.

In some embodiments, the authentication credential is a static shared secret, stored in a database on the server side and associated with a particular user account established prior to the authentication session, along with a client identifier and potentially other authentication credentials, such as a standard PIN or password, security question and response pairs and so on. In the embodiments where the authentication credential is static, it is used for a plurality of authentication sessions.

In alternative embodiments, the authentication credential is dynamically produced and used in only one authentication session. In embodiments using dynamically produced authentication credentials for a random subset challenge-response security tier, the authentication credential is delivered to the client, and becomes a shared secret, by using a communication channel that is different from the second communication channel used to deliver the challenge. In a preferred example, the dynamically produced authentication credential can be delivered to the first data processing machine using the first communication channel, when a new authentication session is initiated.

Server side resources include a database which maintains user accounts set up in advance of the authentication session, to allow for authentication processes necessary for access to protected resources. Therefore, embodiments of the technology include a process for maintaining the account database using server side resources, including a record of account for a particular user that includes a client identifier, and optionally a first authentication credential, such as a PIN or password. In order to initiate an authentication session as described above, the server side resources verify entry of the client identifier. Where the optional first authentication credential is implemented, a session is initiated only after verification of the first authentication credential.

In the case of systems using static authentication credentials in support of the random partial shared secret recognition technique, the static authentication credential is kept in the record of account for the particular user. The dynamic authentication credential used in the random partial shared secret recognition technique may be generated only after verification of the client identifier and the first authentication credential. After sending the dynamic authentication credential to the client, generating the authentication challenge, and determining the appropriate authentication response for use in verification; the dynamic authentication credential may be discarded or kept temporarily until the end of the authentication session.

In currently preferred embodiments, the first communication channel is established between server side resources and a browser application running on a computer a communication protocol suitable for use on the Internet, such as an HTTP session over TCP/IP, while the second communication channel is communicated between server side resources and an application running on a mobile device, using a communication protocol suitable for use on the mobile device networks such as SMS.

In the case of a browser on a computer connected via a wired Internet connection, and an application on a mobile device having access to a wireless telephone network, the first data processing machine can be said to comprise an application executed on a first processor having an interface to a physical communication medium, and the second data processing machine comprises an application executed on a second processor having an interface to a different physical communication medium. In other embodiments, the first and second data processing machines may share an interface to a physical communication medium, such that the first communication channel comprises a first application layer channel using the physical communication medium, and the second communication channel comprises a second application layer channel using the same physical communication medium. For example in this case, the first data processing machine may comprise a browser executed on a computer while the second data processing machine comprises an e-mail client, or another instantiation of a browser, executed on the same computer. In other embodiments, the first data processing machine comprises a first software application, while the second data processing machine comprises a second software application executed on the same computer, even though they may share the same physical communication medium, or utilize a separate physical communication media coupled to the computer. In general, the first and second data processing machines are characterized by having separately addressable interfaces for communication with the server side resources so that first and second communication channels can be established, so that any party attempting to intercept the authentication session would be required to intercept communications for both of the separately addressable interfaces. The hardware computers in which the client side data processing machines described herein may be implemented include personal computers, laptops, personal digital assistants, cellular telephones, pagers, Point of Sale (POS)/ATM terminals, and other devices that support communications and data processing suitable for implementation of the technologies described herein.

A representative interactive, computer implemented method for execution by server side computer resources in a client-server system to authenticate a client having access to a first data processing machine and a second data processing machine includes, but is not limited to the following:

maintaining a database in the server side computer resources including authentication credentials for clients, authentication credentials for a particular client in the database including a client identifier;

establishing a first communication channel including a connection to the first data processing machine;

receiving an input client identifier from the first data processing machine via one or more data communications on the first communication channel;

verifying the input client identifier and, after said verifying, initiating a current authentication session and providing an authentication credential for the current authentication session;

establishing a second communication channel including a connection to the second data processing machine;

sending a session authentication challenge for the current authentication session to the second data processing machine via one or more data communications on the second communication channel, the session authentication challenge identifying a random subset of the session authentication credential;

accepting an authentication response from the first data processing machine via one or more data communications on the first communication channel; and determining whether the authentication response matches the random subset of the session authentication credential identified by the authentication challenge.

In one alternative, the representative method includes dynamically generating an authentication credential at the server side computer resources, so that the authentication credential for use to satisfy the challenge-response in a current authentication session with the client is different than authentication credentials used to satisfy the challenge-response in other authentication sessions with the client. The method also includes sending the authentication credential for the current authentication session to the first data processing machine via one or more data communications on the first communication channel after initiating the current authentication session. Alternatives can be implemented in which the authentication credential is delivered to the client using a third data processing machine and third communication channel.

In another alternative, the representative method includes maintaining the authentication credential in the database, where the authentication credential comprises a static shared secret, re-used in a plurality of authentication sessions.

In some embodiments, the representative method includes an additional tier of security that includes maintaining an additional authentication credential, like a PIN or password, in the database, verifying an input additional authentication credential, having been input at the first data processing machine and transmitted via one or more data communications on the first communication channel to server side resources, and initiating the current authentication session upon a condition of satisfying the additional tier of security.

Various embodiments of the technology utilized different variations of the random partial shared secret recognition system. In one variation, the representative method includes storing data set including a shared-secret ordered set of data fields in a memory, where the data fields in the ordered set include field contents comprising one or more storage elements represented by corresponding graphical objects on a graphical menu. An input construct for entry of field contents of said random subset of data fields is presented to the client via one or more data communications on the first communication channel. The input construct is used for entry of field contents of a random subset of data fields, and including a plurality of content entry data fields, and at least one instance of the graphical menu for selecting one or more graphical objects and causing entry of the selected objects into the content entry data fields. Examples of this variation are described below as "Random Partial Path Recognition RPPR." The authentication challenge in this variation comprises sending a communication identifying positions in said ordered set of a random subset of data fields from said ordered set, including one position in the random subset for each of the plurality of content entry data fields The process of determining whether the authentication response matches the random subset of the session authentication credential identified by the session authentication challenge includes determining whether the authentication response matches the random subset of said plurality of a dynamically generated authentication credential is identified to the user by providing indicators of visible to the client on the instance of the graphical menu, such as an arrow extending through positions in the data set, or position numbers shown adjacent objects that lie in the position data set. In some embodiments, the graphical menu comprises a first menu including a graphical pattern of graphical objects, such as objects representing alphanumeric and punctuation characters, and a second menu including a graphical pattern of graphical objects having different graphical objects, such as objects representing images and colors. The use of two menus enables entry of at least one storage element represented by a graphical object on the first menu and at least one storage element represented by a graphical object on the second menu into a content entry data field. In this case of two menus, a dynamically generated authentication credential may be provided in the form of indicators of position in the ordered set on the first and second menu, and further the indicators of position on the first and second menus can consist of patterns having the same or different shapes on the two menus.

In another variation of the random partial shared secret recognition system, the authentication credential comprises a data set in a memory, where the data set includes a plurality of data fields having respective positions in said data set and having field contents identifying a plurality of pre-defined locations on a frame of reference, the plurality of predefined locations having an order along an ordered path known to the client on the frame of reference. Examples of this variation are described below as "Random Partial Digitized Path Recognition RPDPR." An input construct for entry of field contents is presented to the client having a plurality of content entry data fields, and including at least one an instance of a graphical representation of the frame of reference configured as a graphical menu for selecting one or more graphical objects. The session authentication challenge identifies positions of a random subset of data fields in the plurality of data fields, including more than one position in the random subset for at least one content entry data field of the plurality of content entry data fields. To formulate a response, the user uses the graphical menu to cause entry of storage units selected from positions on the path into respective content entry data fields in the plurality of content entry data fields. The graphical menu associated with the plurality of content entry data fields on said input construct can be used to select more than one graphical object for at least one of the plurality of content entry data fields. In examples of this technique, a graphical representation of the frame of reference includes a number N of pre-defined locations in the frame of reference having coordinates on the frame of reference. The process of determining whether the authentication response matches the random subset of the authentication credential identified by the session authentication challenge includes determining whether the session authentication response identifies the characters displayed in the instance of the graphical representation at the pre-defined locations on the random subset of the ordered path. In some embodiments, different instances of the graphical representation of the frame of reference are used in providing input data for respective content entry data fields in the plurality of content entry data fields.

In addition to the computer implemented method described above, the technology is embodied by a data processing system, including resources to execute the process described above. Also, the technology is embodied by a computer program stored on a computer readable medium and executable by a computer to perform processes in support of the interactive, authentication method.

Other aspects and advantages of the technology described herein can be seen on review of the drawings, the detailed description and the claims which follow.

BRIEF DESCRIPTION OF THE DRAWINGS

FIGS. 10A-10F provide a secret graphical digitized path selection grid and various examples depicted by arrows with continuous paths having ten field positions along the path for on-line user account set up in support of the RPDPR authentication process during the login sessions according to the present invention.

FIGS. 10G-10K provide a secret graphical digitized path selection grid and various examples depicted by digits and shadowed grid fields with continuous paths having ten field positions for on-line user account set up in support of the RPDPR authentication process during the login sessions according to the present invention.

FIGS. 11A-11F provide various examples depicted by arrows with graphical non-continuous paths having ten field positions for on-line user account set up in support of the RPDPR authentication process during the login sessions according to the present invention.

FIGS. 11G-11L provide various examples of graphical non-continuous paths having ten field positions depicted by digits and shadowed grid fields for on-line user account setup in support of the RPDPR authentication process during the login sessions according to the present invention.

FIG. 25 shows Table 1A—RPPPR authentication factor's one time authentication response OTAR combinatorial capacity (and its reciprocal value—a probability to guess OTAR) vs. a number of alphanumeric character and special mark positions in a one time authentication challenge OTAC, and with respect to the RPPPR drop-down menu letter case sensitivity.

FIG. 26 shows Table 1B—RPDPR or RPPPR authentication factors' one time authentication response OTAR combinatorial capacity (and its reciprocal value—a probability to guess OTAR) vs. a number of alphanumeric character and special mark positions of path or PIN (or password) in a one time authentication challenge OTAC, and with respect to a session authentication credential SAC presence and a number of fields in the SAC.

FIG. 27 shows Table 2—Combinatorial capacity of the RPPR authentication factor's one field pattern vs. a number of objects (such as CO—a color, IM—an image, CR—a alpha-numeric character or a special mark, letters are case sensitive) entered from the 2D drop-down grid-like menus (such as the alphanumeric character and special mark menu and the color and image menu).

FIG. 28 shows Table 3—Combinatorial capacity of the RPPR authentication factor's one time authentication response OTAR vs. a number of field positions in a one time authentication challenge OTAC, and with respect to a number of objects per field in OTAR.

FIG. 29 shows Table 4—Combinatorial capacity of the RPDPR authentication factor's one time authentication response OTAR vs. a number of field positions in a one time authentication challenge OTAC, and with respect to a number of field position indicators along the path at each field the grid is instantiated from in OTAC.

FIG. 30 shows Table 5—Ratio of RPPR/RPDPR combinatorial capacities vs. a number of fields in a one time authentication response OTAR and with respect to a number of objects per field in OTAR.

FIG. 31 shows Table 6—Two concurrent sessions, two-factor user authentication method in the RPSSR-based system.

DETAILED DESCRIPTION

Figure 1:
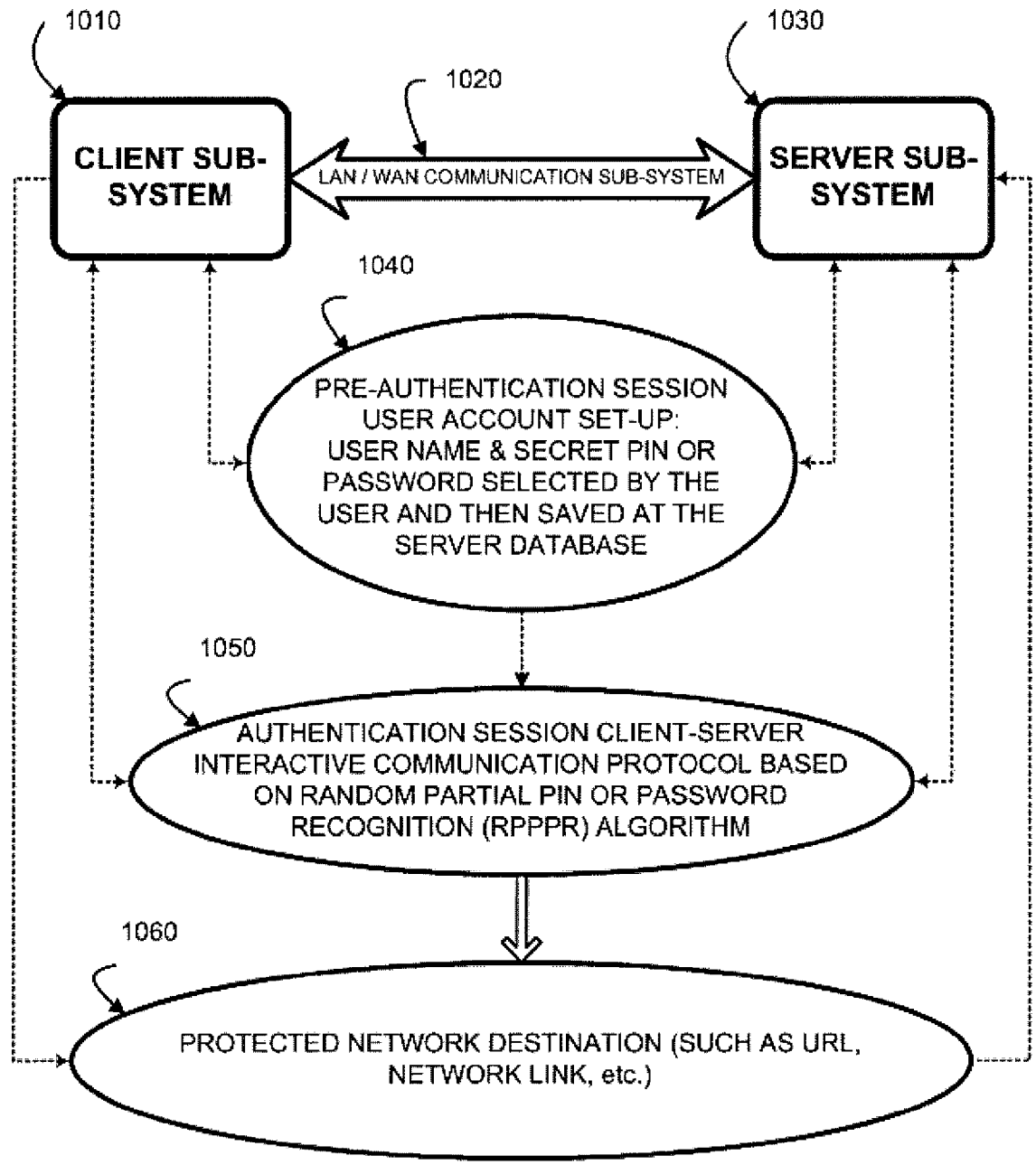
FIG. 1 illustrates client-server architecture for implementation of a user authentication process according to the present invention.
Figure 2:
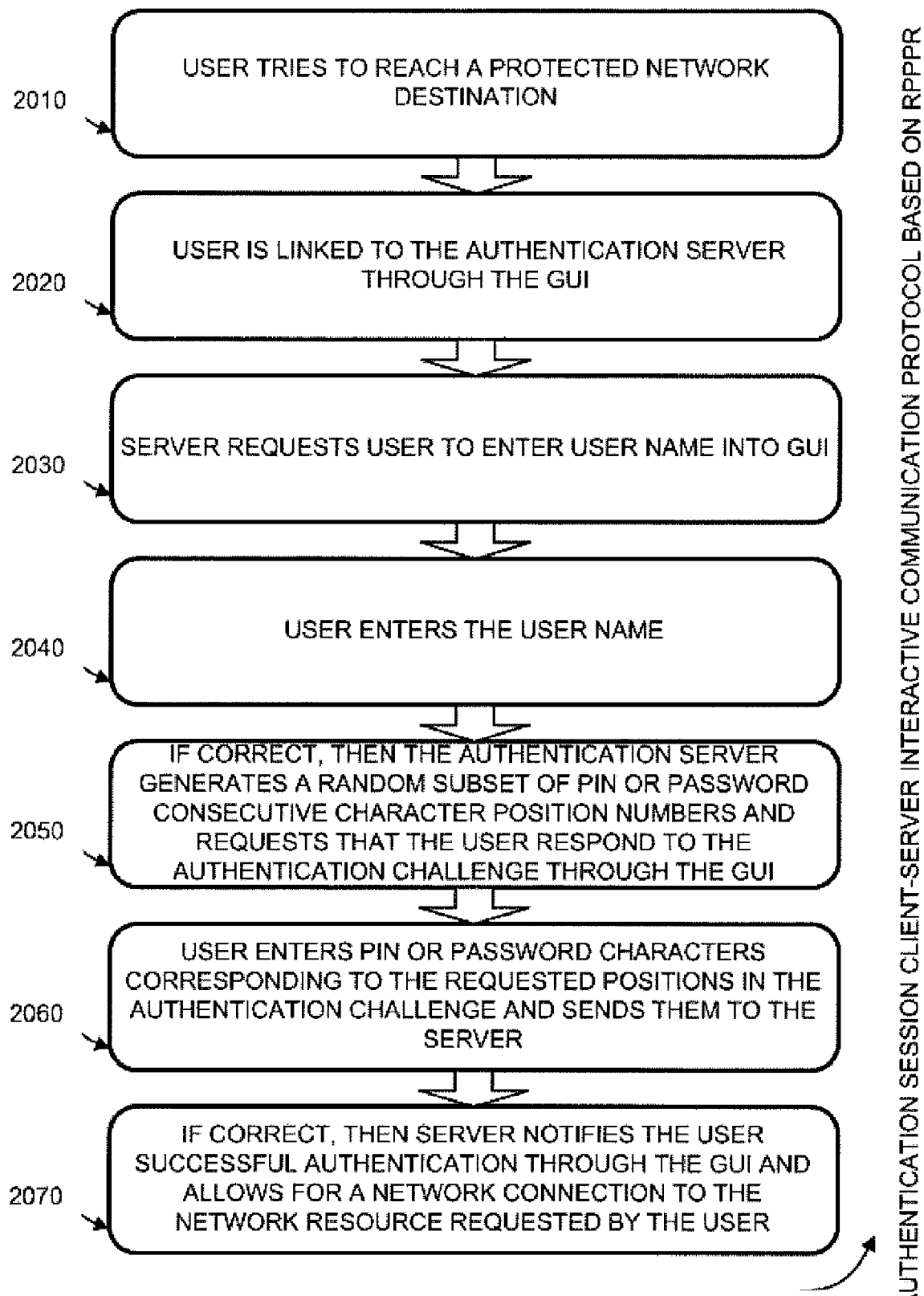
FIG. 2 is a flowchart of a basic random partial PIN or password recognition RPPPR authentication session according to the present invention.

A detailed description of the embodiments of the present invention is provided with reference to FIGS. 1 through 31.
Random Partial Shared Secret Recognition (RPSSR) System Random Partial PIN or Password Recognition (RPPPR), Random Partial Digitized Path Recognition (RPDPR), and Random Partial Pattern Recognition (RPPR) algorithms or authentication factors described below represent various embodiments of a Random Partial Shared Secret Recognition (RPSSR) system. Despite the different nature of the client-server credentials in these algorithmically and parametrically different authentication factors, they all have a common ground. The server, having obtained from a client a user name or a user ID (or a host ID in the case of device to device authentication), presents an authentication challenge (a clue) to the client during each authentication session and requires client to enter a certain Random Partial Shared Secret (a session-specific subset of the shared secret) as an authentication response corresponding to the authentication challenge through a cognitive association with the shared secret. A correct authentication response to the server would lead to a successful authentication event. Otherwise, the authentication process would fail. In a preferred embodiment, the "client" is a user at a client data processing machine; though RPSSR system client-server authentication sessions can be implemented entirely eliminating the human factor where two hardware devices authenticate each other within a network (like peer to peer routers), with one acting as a "server-side resource" and one acting as a "client" in the techniques described herein.

Hence, RPSSR systems always have a One Time Authentication Challenge (OTAC) generated and sent from the server to the client during each authentication session initiated by the client, and a One Time Authentication Response (OTAR) corresponding to OTAC is generated by the client through a cognitive association with either a static or dynamic shared secret, and sent back to the server. Thus security of RPSSR authentication credential depends on security of both the OTAC and OTAR components.

Credential's Combinatorial Capacity and Entropy Leakage

There are two approaches or two types of attacks against "what user knows"—based authentication credentials. The first type includes attacks occurring without prior collection by intruder of user's login information—these are guessing or computer-processing attacks at the credential(s) entry devices. Clearly, the higher the combinatorial capacity of the user credential, the less chance of success for these attacks. Also, there are system level defenses against this type of attack described below. The second type includes an attack occurring with a prior collection and reengineering attempts of user's login information. Credential related information can be gathered, analyzed, and processed by intruder (or intruding organization) during and after more than one user login session, gradually leading to a complete credential disclosure. This process is called an entropy leakage, meaning that each user authentication session can leak information about a shared secret to the intruder. Entropy leakage is a loss of security during authentication sessions due to various attacks available at and/or after the credential entry event. Examples of entropy leakage include key logging software, videotaping, "shoulder surfing", brute force, etc. There are conventional security methods preventing credential entropy leakage, like:
  echo dots replacing entered characters
  login time and number of wrong attempts limitations leading to session termination or account lockout if exceeded
  virtual key boards
  data encryption while in transit and the like.

Authentication factors referred to herein as RPPPR, RPDPR, and RPPR, are different embodiments of the RPSSR system, and provide a new layer of defense against entropy leakage.

Typically, entropy leakage occurs as a result of a complete or partial information loss at and/or after a shared secret entry event. However, there are guessing attacks which may lead to entropy leakage even without any credential entry event by a legitimate user. These attacks are especially dangerous if supported by a computer-processing power. Conventional system level protection is provided by limiting a number of unsuccessful credential entry events and a login time, leading to an account lock out if the limits are exceeded. RPSSR-based authentication factors provide varying levels of combinatorial capacity of shared secrets from factor to factor and, at the same time, allow system administrators to scale an authentication challenge leading to the scalable combinatorial capacity of the authentication response enhancing protection against guessing attacks.

The key idea of RPSSR-based authentication systems is to enable an interactive client-server session where a user, having provided the user's name or user's ID to the server, is challenged to enter a random partial shared secret such as a session-specific subset of a password, graphical path, or pattern. An intruder, having detected just a random subset of a credential, has difficulties to reengineer the entire shared secret.
Two-Channel Challenge-Response Authentication Method in RPSSR System RPSSR-based authentication factors are more resilient against credential entropy leakage as compared to conventional password or other "what user knows"-based systems, because the RPSSR system only requires the user to enter a random subset of the shared secret rather than the entire secret. At the same time, RPSSR-based authentication factors have a significant reserve for further front-end credential security enhancement. In fact, the authentication challenge coming to the same graphical user interface where the authentication response is entered facilitates the intruder in gathering, analyzing, and processing of the actual user's credential related data by disclosing to the intruder the framework or the one time authentication response OTAR with respect to the entire credential by making the authentication challenge OTAC visible (and/or recordable) by intruder.

One of the key ideas of the present invention is to split the one time authentication challenge OTAC and one time authentication response OTAR between several communication channels during one user authentication session in order to prevent the intruder from knowing and consequently analyzing a link between data requested by the server OTAC and entered by the user OTAR data which would farther reduce credential entropy leakage. Typically, RPSSR-based authentication factors have OTAC and OTAR on the same graphical user interface (GUI) in a browser or on a screen of user's desktop or laptop. Further, RPSSR-based authentication factors with OTAC and OTAR split between user's personal mobile communication device and a GUI in a browser or on a screen of user's desktop or laptop will be introduced and analyzed as a preferred embodiment. Certainly, other embodiments with OTAC and OTAR split between user's email or other communication channels and a GUI in a browser or on a screen of user's desktop or laptop are quite possible and would provide the same credential's security enhancement. Actual two-channel selection should be defined by practical means of optimizing the entire authentication system over a set of criteria of usability, TCO, security, etc.

Two-Channel Challenge-Response with Session Authentication Credential in RPSSR System Another key idea of the present invention is achieving no entropy leakage of user's credential in RPSSR-based authentication factors. This requires making the next logical step in analyzing entropy leakage and combinatorial capacity of the user's credential in these systems. Indeed, introducing two-channel split between a one time authentication challenge OTAC received over one communication channel, and a one time authentication response OTAR sent through another communication channel, leads to reducing entropy leakage per user's authentication session. But it does not entirely eliminate this security loss process. The intruder still has an opportunity to see (and/or record) OTAR, which might lead to the entire credential disclosure (reengineering) over a number of recorded user's authentication sessions allowing the intruder to gather, analyze, and process authentication information sufficient enough to reengineer the user's credential.

In an extreme case, the intruder could eventually disclose the user's credential over a number of authentication sessions. However, in the two-channel split between OTAC and OTAR, the intruder does not know the challenge. Therefore, knowing the user's credential only, without OTAC, would leave the intruder at odds—which one subset of the credential is to be entered to form OTAR? Certainly, the combinatorial capacity of guessing OTAR, if the user's credential is known, depends on scalable OTAC and OTAR parameters set by a system administrator, as well as the nature of the shared secret of a particular RPSSR-based authentication factor. The important conclusion at this juncture is the existence of a residual security of RPSSR-based authentication factors with two-channel split between OTAC and OTAR even after the event that an authentication credential became known to the intruder (or intruding organization).

Another logical step leads to a question—why should a user have any memorized static authentication credential to enter RPSSR system with two-channel split between OTAC and OTAR, if the credential is eventually leaked to the intruder by one of the entropy leakage methods. As the above example demonstrates, it is not necessary to have the static authentication credential in presence of a residual user authentication security. The answer becomes apparent by introducing a Session Authentication Credential (SAC) dynamically generated by the server and valid only for one authentication session. In this case, each authentication session requested by the client from the server (by sending to the server a user name or a user ID) leads to OTAC generated by the server and coming to user's mobile communication device as SMS (Short Message Service) text message (or through an email or any other than browser communication channel), while concurrently, a one-session-only, random session authentication credential SAC generated or otherwise dynamically provided by the server, corresponding with and complementing the OTAC, arrives highlighted to the GUI in a browser or on the screen of the user's desktop or laptop. Having obtained both OTAC and SAC through two different communication channels, the user generates, enters, and sends to the server OTAR completing the user authentication session.

This approach brings new important capabilities. An RPSSR system, with OTAC, SAC, and OTAR data that is valid for only one session, does not require any static authentication credential or any permanent static shared secret for multiple authentication sessions, as each session server would generate an entirely new random SAC. This greatly improves usability of RPSSR-based authentication factors by eliminating user memorization efforts and replacing them by a set of simple instructions of how to generate OTAR having obtained OTAC and SAC. Entropy leakage of SAC can be 100% if the intruder who knows user name (which is not typically a secret) can invoke an authentication session on a desktop or laptop. However, without access to the real user's mobile communication device (or in another embodiment, without access to the user's email account or anything other than the browser communication channel) the intruder does not know the authentication challenge OTAC and would have to guess OTAR. This can be a daunting task with little chance for success, depending on the administrator's configured system level protection, OTAC, SAC, and OTAR parameters, and the nature of the client-server shared secret for a specific RPSSR-based authentication factor.

Two-Factor Authentication Utilizing Two-Channel Challenge-Response with Session Authentication Credential It is quite risky to rely only on the ownership of a personal mobile communication device to reassure user authentication security in RPSSR-based authentication factors with two-channel split between OTAC, and SAC and OTAR. A simple way to enhance the system security would be combining a PIN or Password requirement along with a User Name as a first authentication factor. By doing so, the system would prevent the server from generating OTAC and SAC, unless the user is successfully authenticated by the first authentication factor, which is a conventional one-channel technology. The unique advantage of such a strong authentication system becomes apparent when comparing it with a conventional strong authentication system built on a PIN and hardware token. Indeed, in both cases one uses a PIN and a hardware device, but in the case of this invention preferred embodiment, a hardware device is a ubiquitous multi-functional personal mobile communication device owned almost by any adult in the U.S., rather than the conventional hardware token case, where a hardware device is required. As noted above, hardware tokens have spread less rapidly in popularity in the U.S. as compared to mobile communication devices. Tokens' manufacturing, distribution, and administrative costs are added up to the total cost of ownership (TCO), whereas mobile devices' standard operation mode (like SMS) does not require a special charge for being a part of a secure authentication system. Assuming similar usability of hardware tokens and personal mobile devices, we will focus further discussion of this invention on the security of two-channel split between the OTAC and the OTAR for RPSSR-based authentication factors. It will be discussed below in greater detail to allow for usability, TCO, and security optimization consideration for PIN (or Password)+mobile personal communication device strong authentication system as compared to PIN+hardware token.

Random Partial PIN or Password Recognition (RPPPR) Authentication Factor

There is a subtle difference between PINs and passwords. PINs are typically used as user authentication credentials to enter non-networked environments like an ATM machine, physical access to open a door, etc. Due to the frequent PINs usage and difficulties and inconvenience of resetting PINs in a timely manner right before authentication sessions, their security is partially traded off towards better usability (less memorization pressure). PINs usually only contain 4-6 digits, whereas password policies typically require 7-10 alphanumeric characters, often with letter case sensitivity.

Higher security requirements mirror the fact that passwords are typically used to access networked environments (like enterprise network; or on-line documentation repository with capabilities to copy, print, transform, and transmit information; or on-line transactions assuming significant legal and financial responsibilities). Unlike PINs, password security typically is not traded off for better usability (password policies are usually quite stringent) as they are used in on-line environments facilitating password express reset opportunities.

The discussion of PINs and passwords above underlines that RPPPR authentication factor works the same way for PINs and passwords. Preferences given to one or another type of credentials in a particular authentication system may account for the reasons stated above and as a matter of fact are unrelated to RPPPR functionality.

FIG. 1 illustrates a basic communication set up for RPPPR authentication processes according to the present invention. A client machine 1010 communicates by communication media, such as a local area network or wide area network communications subsystem 1020, with a server side resources referred to as server subsystem 1030, such as a server configured computer, a server farm, a computer and data storage system with database capabilities and other single site and distributed site server side configurations. A protected network destination 1060 controls access to resources such as secure web sites identified by URLs, links to secure networks, etc.

To set up access, a pre-authentication session 1040 is executed by the client subsystem 1010 and server subsystem 1030. In the pre-authentication session 1040, a user account is set up in the server subsystem 1030, the user name and a secret PIN or password is selected by the user and stored in a database of account records via the server subsystem 1030. It is contemplated that PIN or password's alphanumeric characters have consecutive character positions characterized by consecutive position numbers—for instance, if PIN="391048", "3" occupies $1^{st}$ digit position of the PIN, "9" occupies $2^{nd}$ digit position of the PIN, ..., "8" occupies $6^{th}$ digit position of the PIN; similarly, if password="missile", "m" occupies $1^{st}$ character of the password, "i" occupies $2^{nd}$ character of the password, ..., "e" occupies $7^{th}$ character of the password. For RPPPR, the position numbers are related by a cognitive function of their respective positions in a PIN or password. The user account information, user personal information (answers to customizable by administrator security questions), user name and PIN or password with numbered consecutive character positions are stored in a secure server database. In strong authentication embodiments, at least one additional parametrically independent data set for another authentication factor is included in the database for the user accounts.

To gain access to the protected network destination 1060, the client subsystem 1010 and server subsystem 1030 execute an authentication session 1050 that includes a client-server interactive communication protocol based on RPPPR. A more detailed description of an embodiment of authentication session 1050 is provided with reference to FIG. 2.

According to one basic flow, an authentication session is initiated when the user tries to reach a protected network destination (block 1060). The protected network destination redirects the user's attempted access to the authentication server, or the attempted access is otherwise detected at the authentication server 1030. In one example, where the user is attempting access using an Internet browser (block 2010), a communication interface is returned to the user's browser including a graphical user interface with links to authentication server 1030 (block 2020). The communication interface may be returned through redirection, for example, by the authentication server or another network resource. The server prompts the user to enter a user name into a field in the graphical user interface (block 2030) via the graphical user interface. The user enters the user name, which is returned to the authentication server (block 2040). If the user name is valid, then the authentication server identifies a random subset of PIN or password consecutive character position numbers and delivers this authentication challenge to the user (block 2050). The user is prompted to enter the one time authentication response OTAR which is the PIN or password characters corresponding to the requested positions in the received one time authentication challenge OTAC using the graphical user interface (block 2060). The user inputs relevant data content in the identified character positions and the input data are returned to the server (block 2060). If the input data matches the random subset of PIN or password requested by the server, then successful authentication is signaled to the user via the graphical user interface for example, signaled to the protected network destination and/or signaled to other resources, such as the authorization and accounting systems that need to know that the authentication session has succeeded, and network connection to the requested protected network destination is allowed (block 2070).

Figure 3A:
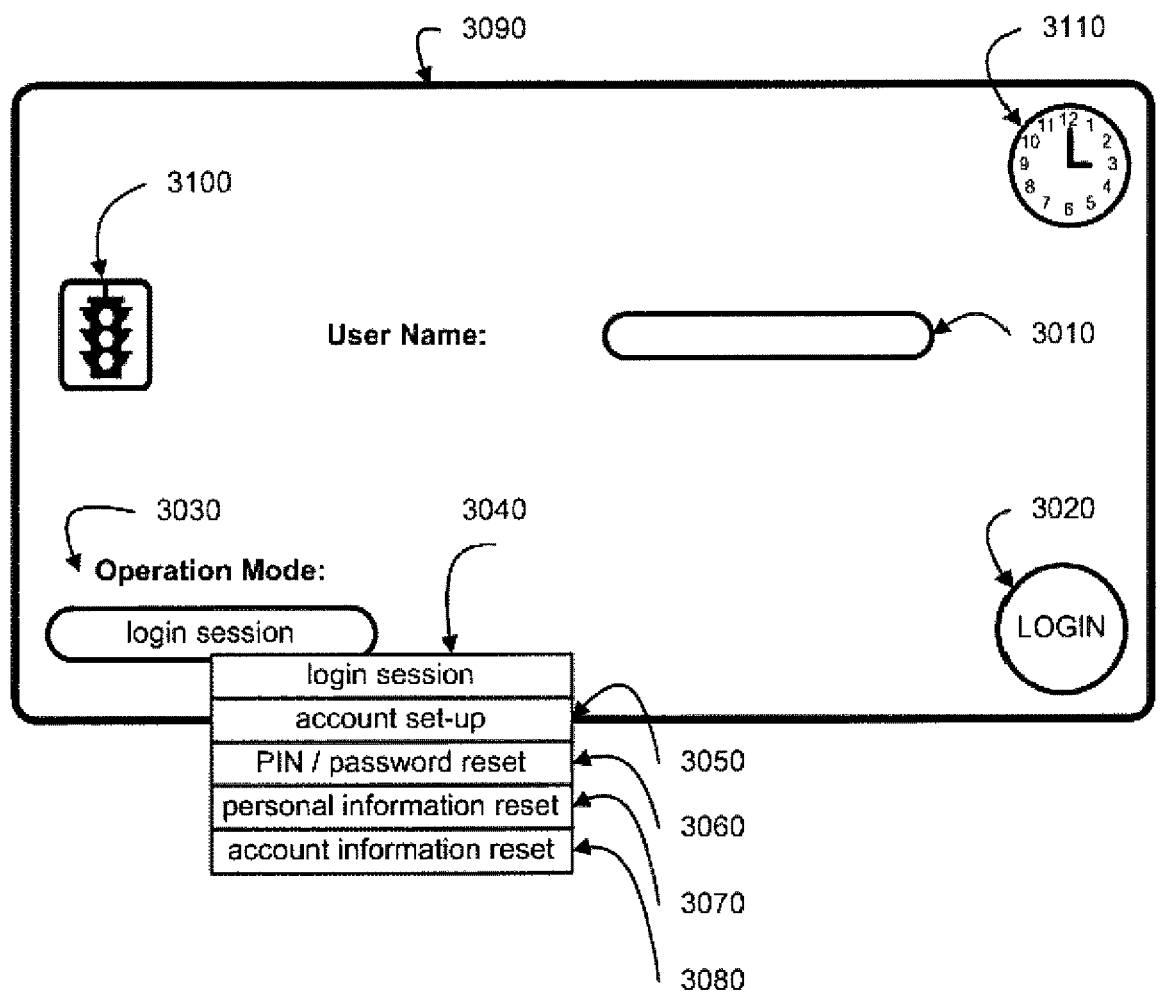
FIG. 3A illustrates a graphical user interface supporting the variety of RPPPR operation modes, and particularly, the login process at the user name entry state used in one example of an authentication program according to the present invention.
Figure 3B:
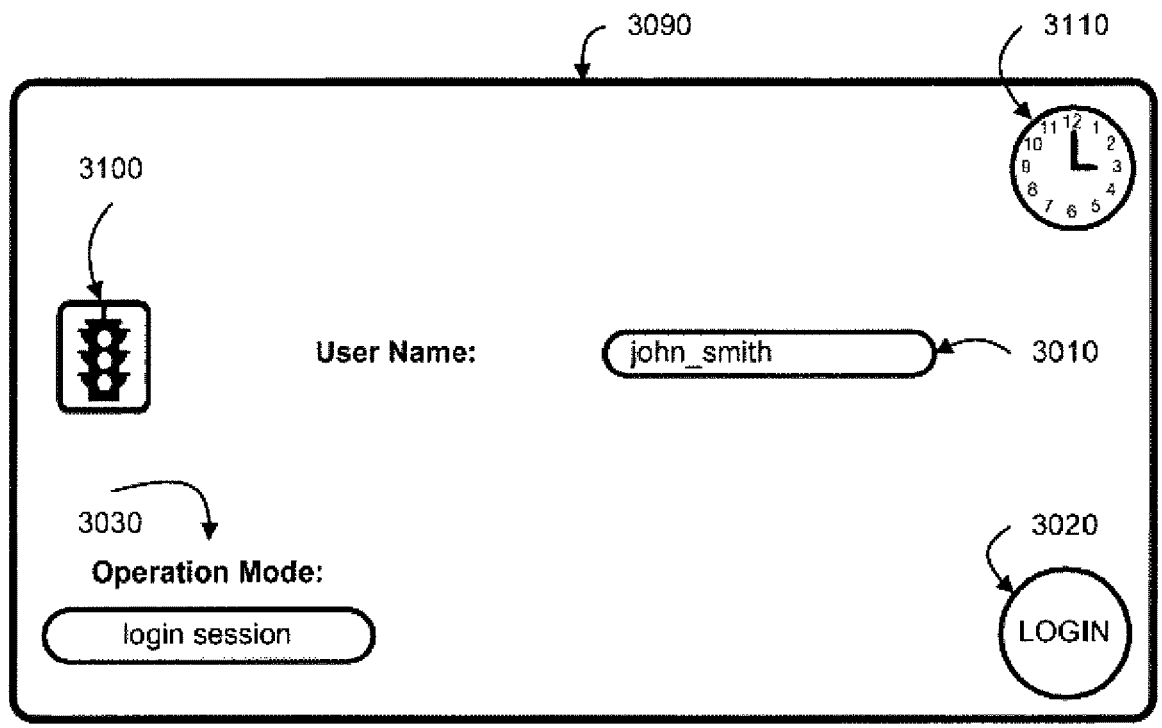
FIG. 3B illustrates a graphical user interface supporting the login process at the user name entry state used in one example of an authentication program according to the present invention.
Figure 3C:
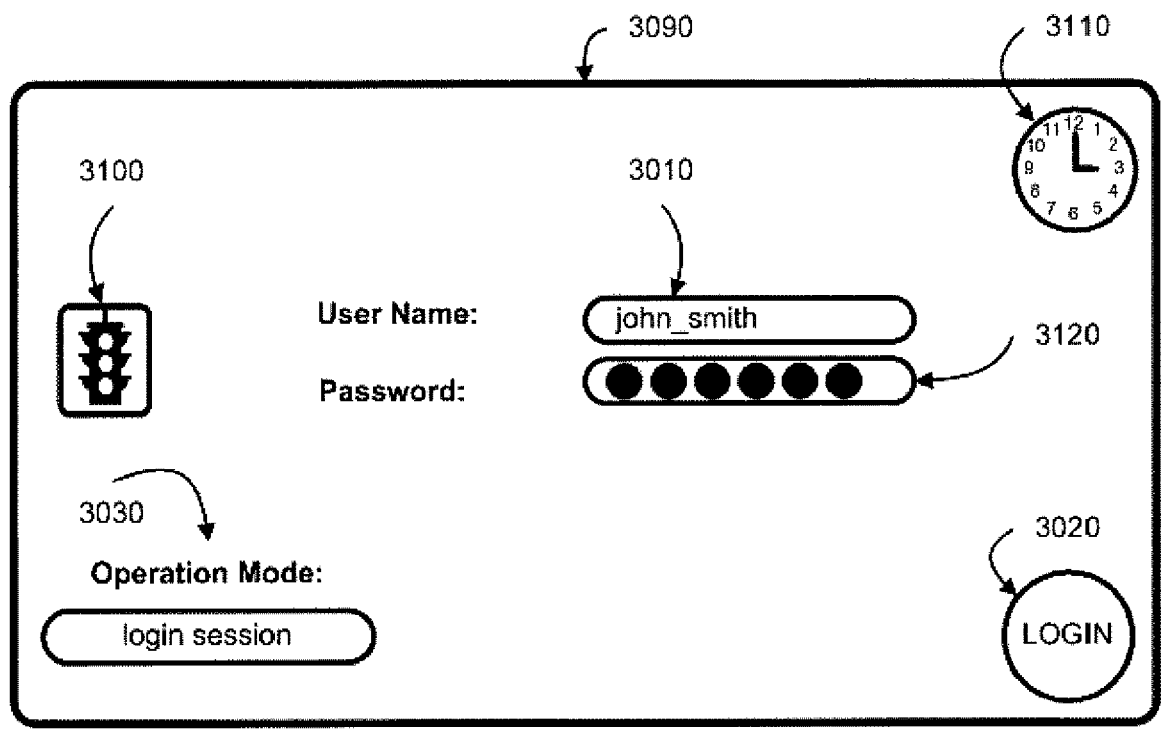
FIG. 3C illustrates a graphical user interface supporting the login process at the user name and password (or PIN) entry states used in one example of an authentication program according to the present invention.

FIGS. 3A, 3B, and 3C illustrate input constructs based on graphical user interfaces presented using Web browsers for a login and authentication session. FIG. 3A illustrates an opening screen 3090 which is presented to the user at the beginning of an RPPPR authentication session. In the opening screen 3090, data entry field 3010 is used for entry of the user name. Login button 3020 is indicated to initiate processing of field data and to start the login process.

When operation mode menu 3030 is included, it creates a drop-down menu of operation mode buttons, including login session operation mode button 3040, account set up operation mode button 3050, PIN or password reset operation mode button 3060, user personal information reset button 3070, and user account information reset button 3080. Stoplight icon 3100 is included in screen 3090. Stoplight icon 3100 turns red before a user name is entered (either by indicating LOGIN button 3020, or hitting the "Enter" key on a user's keyboard), is yellow during client-server communications while the client is waiting for verification of a user name, and turns green when user name is accepted. Also included in screen 3090 is session timer icon 3110 indicating elapsed time for a login session. The system administrator can set parameters in the server that terminate a login process or any other process selected by the user operation mode session in menu 3030 if the timer expires (the session time can have different time limits for various operation modes), or otherwise react to timer expiry.

FIG. 3B illustrates graphical user interface screen 3090, which is presented at the beginning of an authentication session, once the user has selected "login session" 3040 option in Operation Mode menu 3030, during the user name entry process. At the same time, the user name is sent, processed, and is eventually either recognized or rejected by the server. In this example, stoplight icon 3100 is presented. Stoplight icon 3100 turns green after the user name has been recognized. The entered and accepted user name could be displayed in user name field 3010, either as usual text or as sequence of echo dots for security reasons. If the user name is recognized by the server, the following authentication factor (it can be any of RPPPR, RPDPR, or RPPR authentication factors) will be presented in the GUI. Otherwise, stoplight 3100 will turn from yellow (reflecting processing at the server and on communication-lines) back to red (stoplight's status before user name was entered into field 3010) with an error message window that indicates the user name is not recognized.

FIG. 3C illustrates graphical user interface screen 3090 which has functionality similar to GUI presented in FIG. 3B except that the user must enter her password into field 3120 along with her user name (field 3010). The password in field 3120 is always veiled by echo dots for security reasons. Then, LOGIN button 3020 is indicated (or the "Enter" key on user's keyboard is hit) to enter this information into the system and sent to server 1030 which tries to verify both the user name and the password. The color status of stoplight 3100 is red before user name and password are entered, it turns yellow while information is in transit on communication-lines or processed by server 1030, and turns green when information of a successful authentication by the password authentication factor reached the GUI, otherwise, the stoplight turns red again and is followed by an error message that either the user name or password were not entered correctly and should be tried again.

In the case of a "strong" (or multi-factor) authentication, if the user name and password are successfully recognized by server 1030 and stoplight 3100 in FIG. 3C turns green, the following second authentication factor (it can be any of RPPPR, RPDPR, or RPPR authentication factors) will be presented in the GUI requesting user to fulfill it.

Figure 4A:
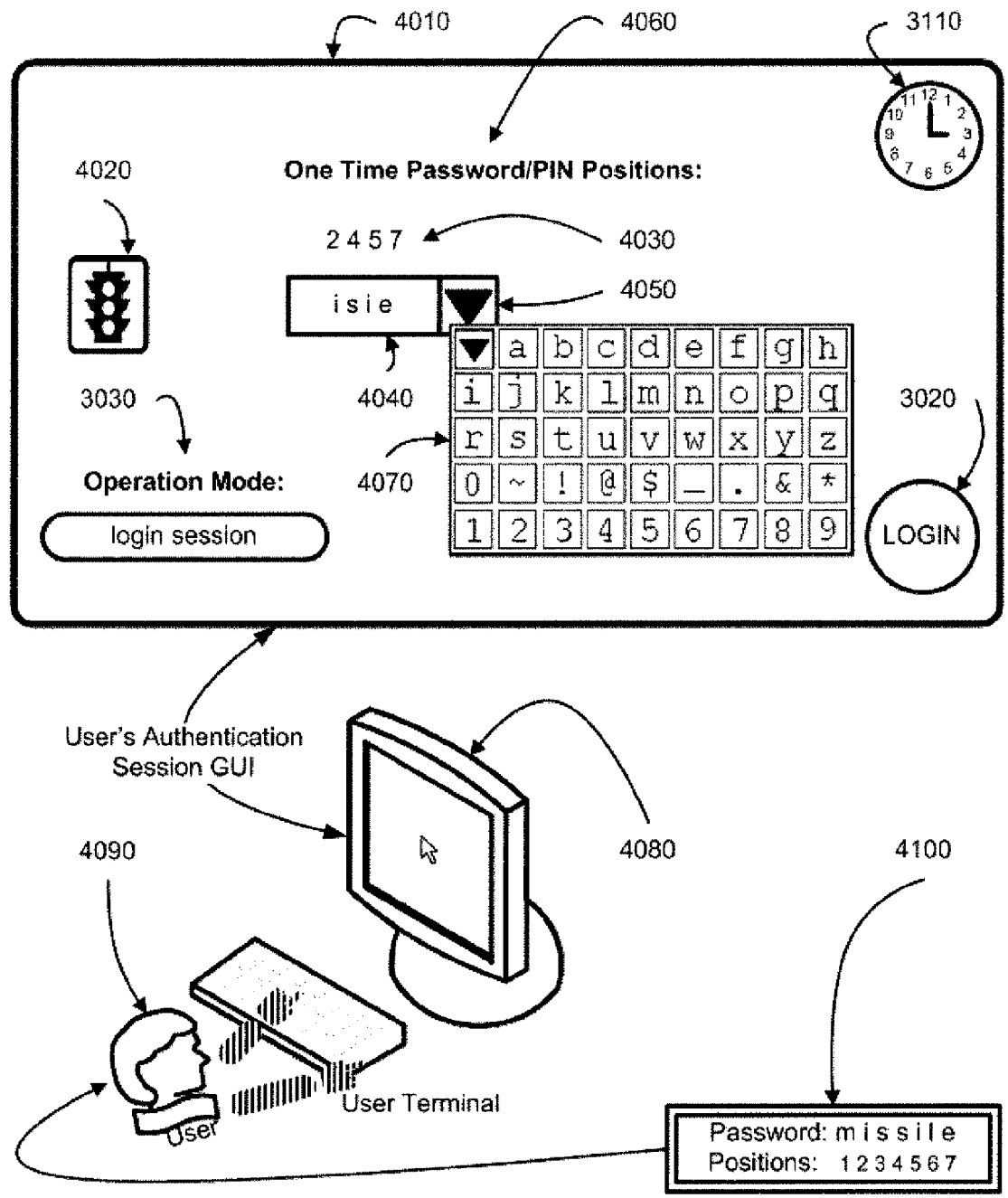
FIG. 4A illustrates a graphical user interface supporting the login process at the random partial PIN or password data entry state used in one example of an authentication program according to the present invention.

FIG. 4A illustrates graphical user interface screen 4010 presenting to user 4090 RPPPR authentication factor login session, which could appear on user's terminal 4080 right after server 1030 (FIG. 1) successfully recognized: user's name (FIG. 3B)—this is the case of one-factor RPPPR authentication solution; or user's name and password (FIG. 3C)—this is the case of two-factor ((Password or PIN)+RPPPR)) authentication (strong authentication) solution.

Field 4040 shows alphanumeric characters or special marks entered with consecutive mouse points and clicks (or a certain procedure with a keyboard assuring the same operation) on two-dimensional menu grid 4070 having static content cells and invoked by indicating field 4050. Capital size letter can be entered into field 4040 by pressing the Ctrl key on a keyboard and concurrently clicking on a letter of interest in menu 4070. Entered character(s) can be erased by placing the caret after the character in field 4040 and clicking the right mouse button on the upper left cell in the menu 4070 having a triangle sign as many times as many characters need to be erased (or hitting the "Backspace" button on a keyboard to achieve the same effect). Menu 4070 can be closed by clicking the left mouse button on the upper left cell having a triangle sign in menu 4070.

One time authentication challenge OTAC 4030, titled for RPPPR authentication factor as "One Time Password/PIN Positions" 4060, displays for user 4090 session-specific random password character positions (in this particular example, positions are 2 4 5 7) which user 4090 is to fulfill in field 4040 (the character sequence in this particular case is "i s i e") through a cognitive association with user's password 4100 (in this particular example, the password is "missile"—all consecutive character position numbers are shown in 4100 under the password). Menu 4070 as a virtual keyboard secures the system against software key logging attacks by intruders (or intruding organizations); also, it allows for the creation of graphical passwords or PINs over static architecture two-dimensional menu 4070, which is easier to recall than textual strings aggravated with enterprise password policies' stringent requirements. For instance, the third row in menu 4070 from left to right would mean the password="zyxwvutsr" which is very difficult to remember. However, there is no need to remember this complex password. User 4090 just needs to invoke 4070, recall the first cell ("z" in this particular case) and direction to go to observe and process the password or PIN according to RPPPR authentication factor procedure.

Certainly, administrators can bar users from choosing very simple shapes like columns or rows by using on-line policies limiting such choices of graphical passwords during account setup procedures. Graphical passwords do not necessarily need to be continues, horizontal, vertical, diagonal, containing non-repetitive characters and special marks, or of a certain fixed length, but could be any combination of the above—the only requirement is that it should be easy to recall. Otherwise, it defeats the purpose of using them and a conventional password text string can be memorized instead. It should also be noted, that graphical passwords chosen over menu 4070 can be longer than conventional textual passwords because there is no serious taxation on human memory with the length increase, whereas the security of such passwords is greatly improved through the higher combinatorial capacity that makes guessing attacks more impractical and that lowers credential entropy leakage for the RPPPR authentication factor.

Once the one time authentication response OTAR is entered into field 4040, user 4090 clicks on LOGIN button 3020 or hits the "Enter" key on a keyboard. Stoplight 4020 status changes from red to yellow while the entered data is in transit or processed by server 1030 (FIG. 1) and, eventually, turns green signaling successful RPPPR authentication and rerouting user 4090 to the protected resource of interest 1060 FIG. 1 (for instance, a protected URL address, or a protected link, or a protected file, directory, database, etc.). Otherwise, stoplight 4020 color turns red again signaling a failed RPPPR authentication event and an error message appears on the GUI that the one time authentication response OTAR is not correct and the authentication session should be restarted, Clock 3110 in FIG. 4A indicates in real time the elapsed session time and its limit is settable by the system administrator to eliminate guessing attacks against user credentials. Once the session time is expired, the login session is terminated.

Figure 4B:
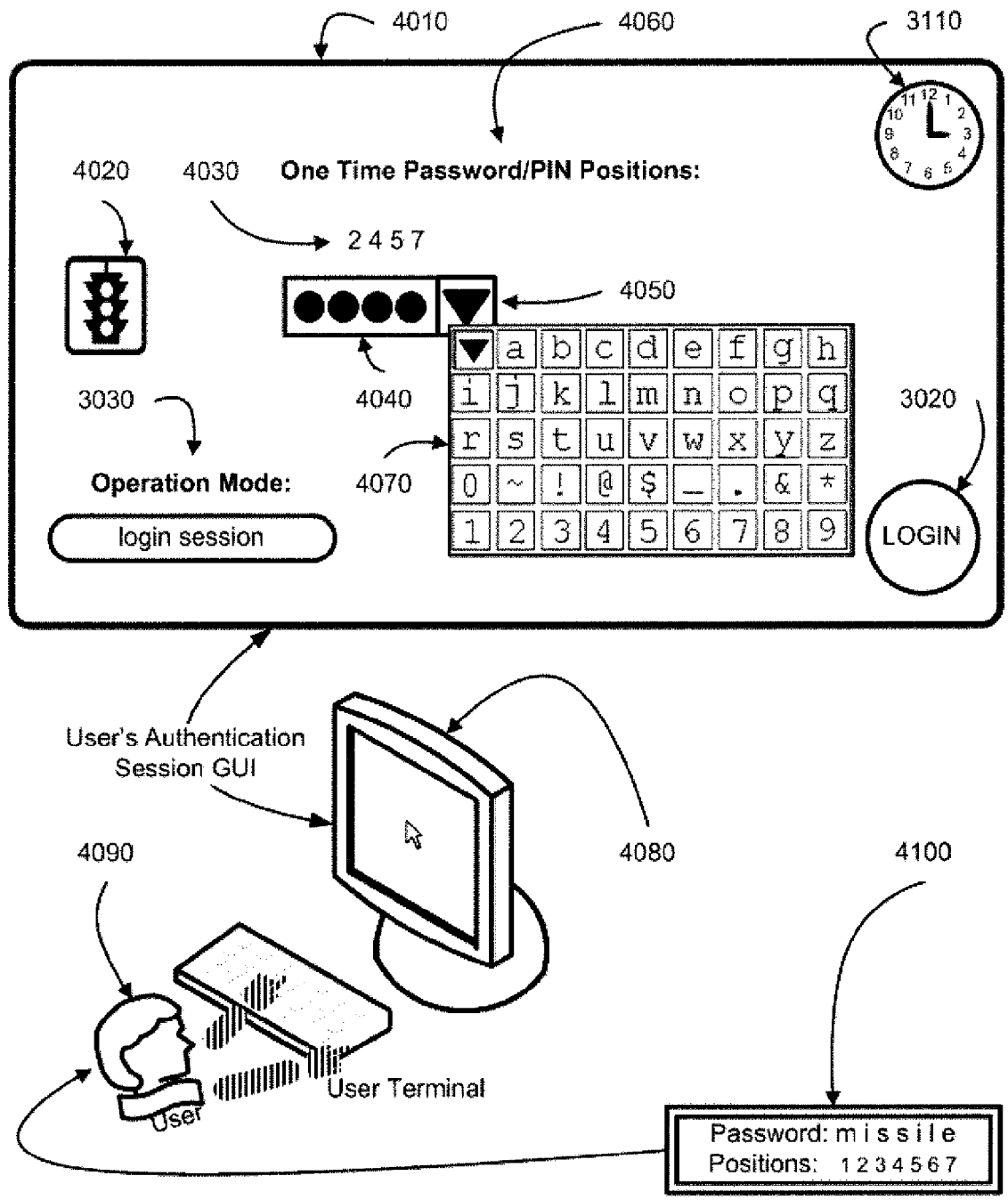
FIG. 4B illustrates a graphical user interface supporting the login process at the random partial PIN or password data entry state, with data entered veiled as echo characters, used in one example of an authentication program according to the present invention.

FIG. 4B is identical to FIG. 4A except that the one time authentication response OTAR data entered into field 4050 is veiled by echo dots effectively hindering and hampering the data visibility and/or data recording opportunity by an intruder in order to lower credential entropy leakage per authentication session.

The authentication security level achieved with RPSSR authentication factors depends on the factor(s) used as well as the session security parameter configuration chosen by the system administrator. Key parameters describe the essence of the session authentication challenge. For instance, in the case of RPPPR authentication factor, password 4100 character position digits (say from left to right) are an ordered set of positions 4100. In this case, RPPPR authentication challenge is a random subset of the digits from the ordered set of the entire password character positions. For example, the password is: "missile", the ordered set is: 1-m, 2-i, 3-s, 4-s, 5-i, 6-l, and 7-e, session one time random authentication challenge OTAC 4030 is: 2 4 5 7, RPPPR one time authentication response OTAR in field 4040 is: "i s i e". The security parameter chosen by the system administrator in this case is the number of digits (4, or a range from 3 to 4 digits) in session random authentication challenge 4030. The fewer digits are in a challenge, the lower is the password entropy leakage per session. However, the probability to guess RPPPR one time authentication response OTAR is higher. Hence, the administrator is the one to reconcile these opposite security trends in order to optimize the security strategy when choosing the security parameters. Typically, three or four digits in a challenge would be a good compromise. The probability to guess the entire authentication response assuming case sensitive and insensitive alphanumeric characters and/or special marks in passwords from two-dimensional menu 4070 presented in Table 1A shown in FIG. 25 (altogether, there are 44 alphanumeric characters and special marks in the menu; letters' upper case option (Ctrl key+click) increases it to 70 different characters and special marks in the menu).

Two-Channel Challenge-Response RPPPR Authentication Factor

Figure 5:
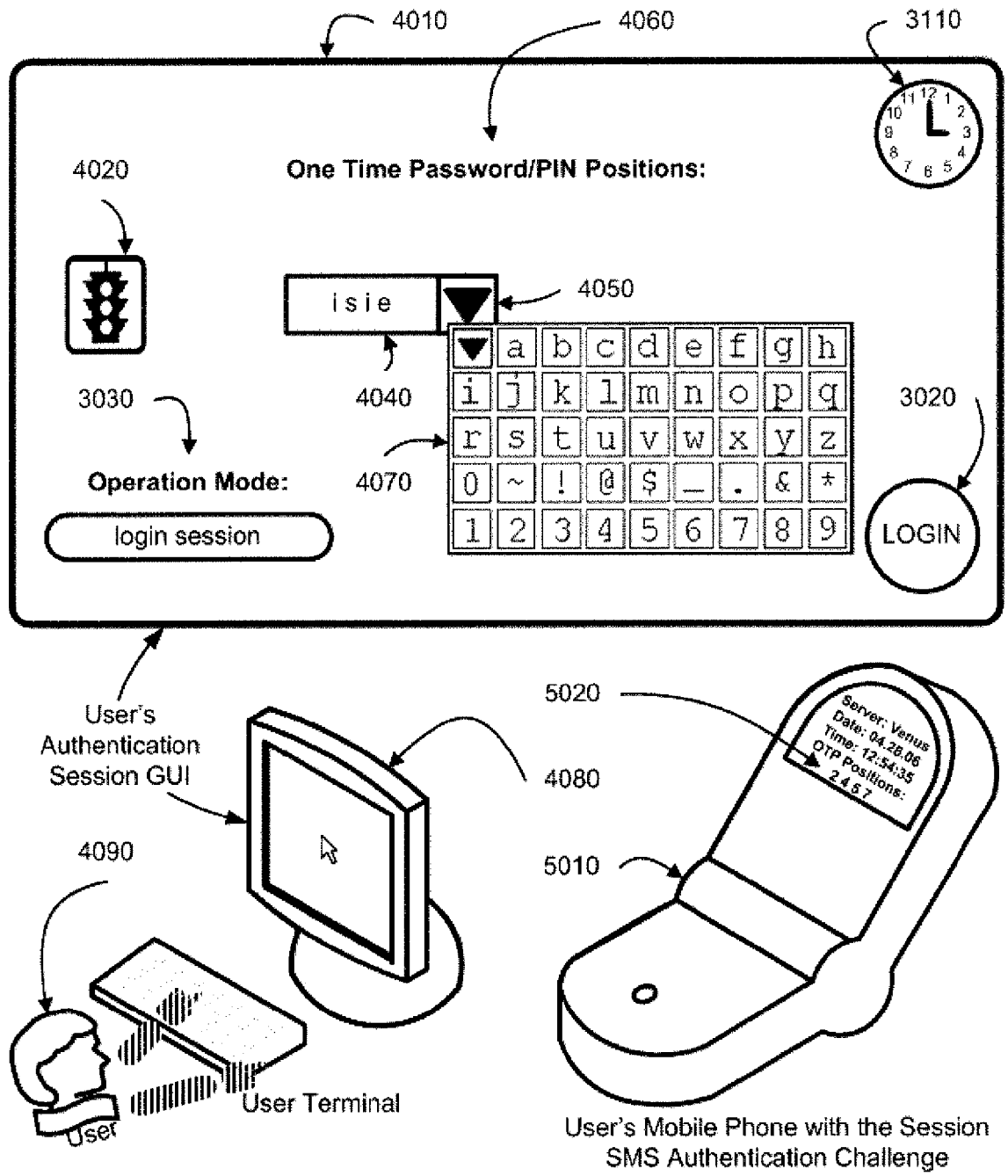
FIG. 5 illustrates a graphical user interface supporting the login process at the random partial PIN or password data entry state, while the authentication challenge is coming as a SMS text message to user's mobile communication device, used in one example of an authentication program according to the present invention.

FIG. 5 illustrates the same login session with RPPPR authentication factor as in FIG. 4A and FIG. 4B with the only difference that one time authentication challenge OTAC 5020 is delivered not to the GUI but to the user's 4090 personal mobile communication device 5010. This splits OTAC, generated by the server 1030 (FIG. 1) and delivered with Short Message Service (SMS) 24010, 24020 (see FIG. 23 and FIG. 24) text message 5020 displayed on user's personal mobile communication device 5010, and a one time authentication response OTAR generated by the user in GUI 4010 in the browser or on a screen of user's terminal 4080, where graphical construct 4040, 4050, 4070, and 3020 to enter and send OTAR to server is presented.

Such a two-channel split between OTAC and OTAR makes it much harder for an intruder to reengineer the user's credential—it would require more sessions with recorded OTAR to assure that all characters and special marks in the credential are already gathered and it will be much more difficult to analyze the eventual credential form. Altogether, it further reduces credential entropy leakage while enhancing the RPPPR authentication credential security against various attacks.

Session Authentication Credential in RPPPR with Two-Channel Challenge-Response

Figure 6A:
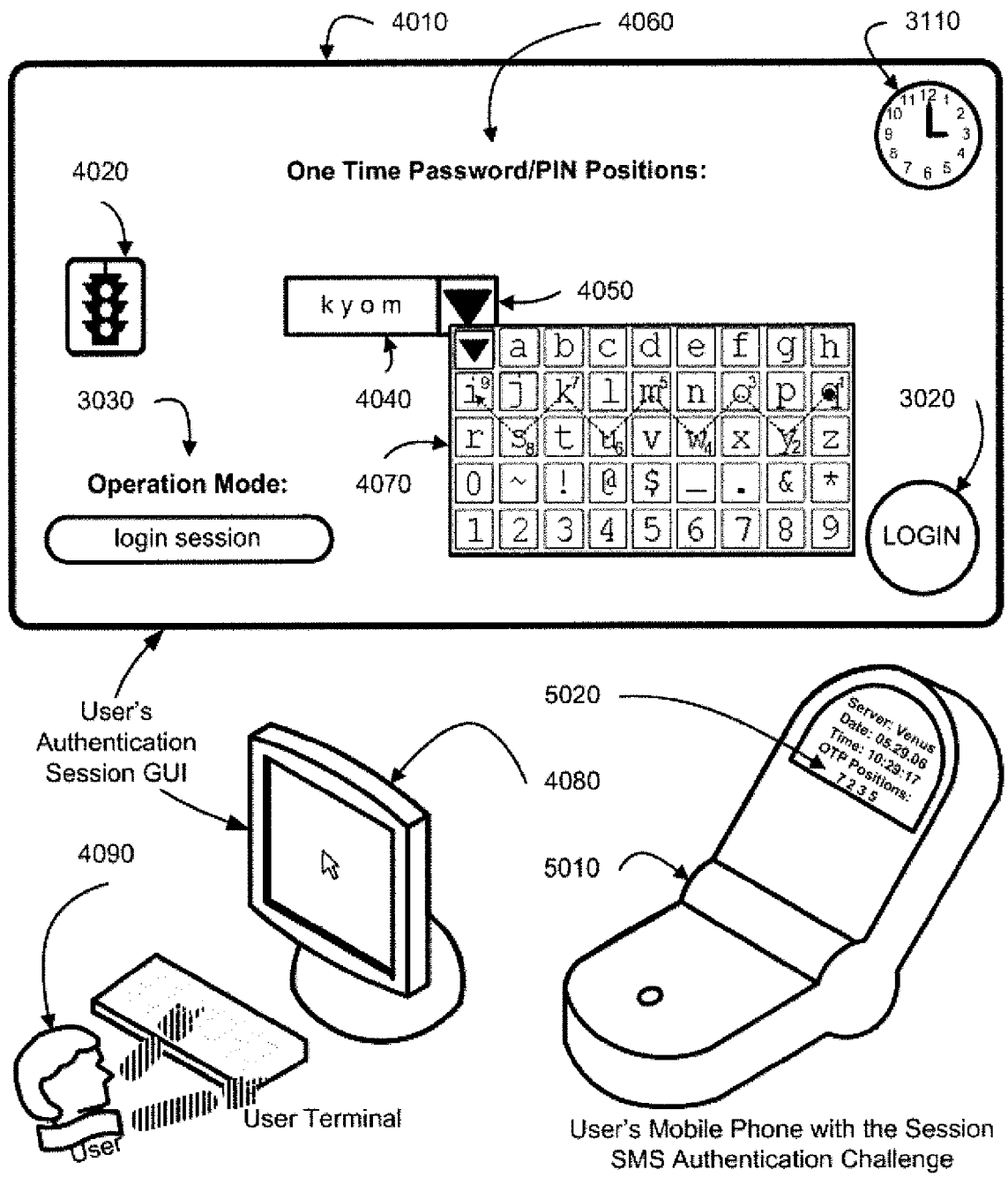
FIG. 6A illustrates a graphical user interface supporting the login process at the random partial PIN or password data entry state, with session only valid personalized PIN or password highlighted on the virtual drop-down keyboard and session only valid authentication challenge displayed as a SMS text message at user's mobile communication device, used in one example of an authentication program according to the present invention.

FIG. 6A illustrates the same login session with RPPPR authentication factor as in FIG. 5, with one time authentication challenge OTAC 5020 coming to the personal mobile communication device 5010 and a one time authentication response OTAR entered into field 4040 in the GUI 4010 on a browser or a login screen of a desktop or laptop 4080 of user 4090. The only difference is that user 4090 does not need to exercise any cognitive association with a static client-server shared secret to generate one time authentication response OTAR 4040. There is no static shared secret in this approach. Instead, Session Authentication Credential (SAC) is generated by server 1030 (FIG. 1) and transmitted to the GUI in a browser or on a login screen of user 4090 desktop or laptop 4080 once the User Name (and PIN or password as a first authentication factor in a two-factor (strong authentication) case) was recognized by the server first. User 4090 can see session authentication credential SAC (a one time session-only random graphical password) on user's terminal 4080 highlighted with a directed line consecutively digitized at each cell along the line direction on two-dimensional menu grid 4070.

In this particular embodiment, the graphical password (which is a session authentication credential SAC) shown in FIG. 6A is: "q" character—occupies the $1^{st}$ position along the graphical password, "y" character—occupies the $2^{nd}$ position along the graphical password, "o" character—occupies the $3^{rd}$ position along the graphical password, "w" character—occupies the $4^{th}$ position along the graphical password, "m" character—occupies the $5^{th}$ position along the graphical password, "u" character—occupies the $6^{th}$ position along the graphical password, "k" character—occupies the $7^{th}$ position along the graphical password, "s" character—occupies the $8^{th}$ position along the graphical password, "i" character—occupies the $9^{th}$ position along the graphical password. One time authentication challenge OTAC 5020 displayed on the user 4090 personal mobile phone 5010, and in this particular embodiment in FIG. 6A it is "7 2 3 5". These digits point to specific character positions to be fulfilled in the one time authentication response OTAR entered into field 4040, which in this particular embodiment, would be "k y o m". Then, user 4090 indicates LOGIN button 3020 to send the authentication response to server which would compare the one time authentication response OTAR with the expected authentication response. Next, there is a successful or failed signal of the authentication session result in a similar way as in FIGS. 4A, 4B, 5. Stoplight 4020 and session elapsed time clock 3110 in FIG. 6A function identical to the previous cases.

Figure 6B:
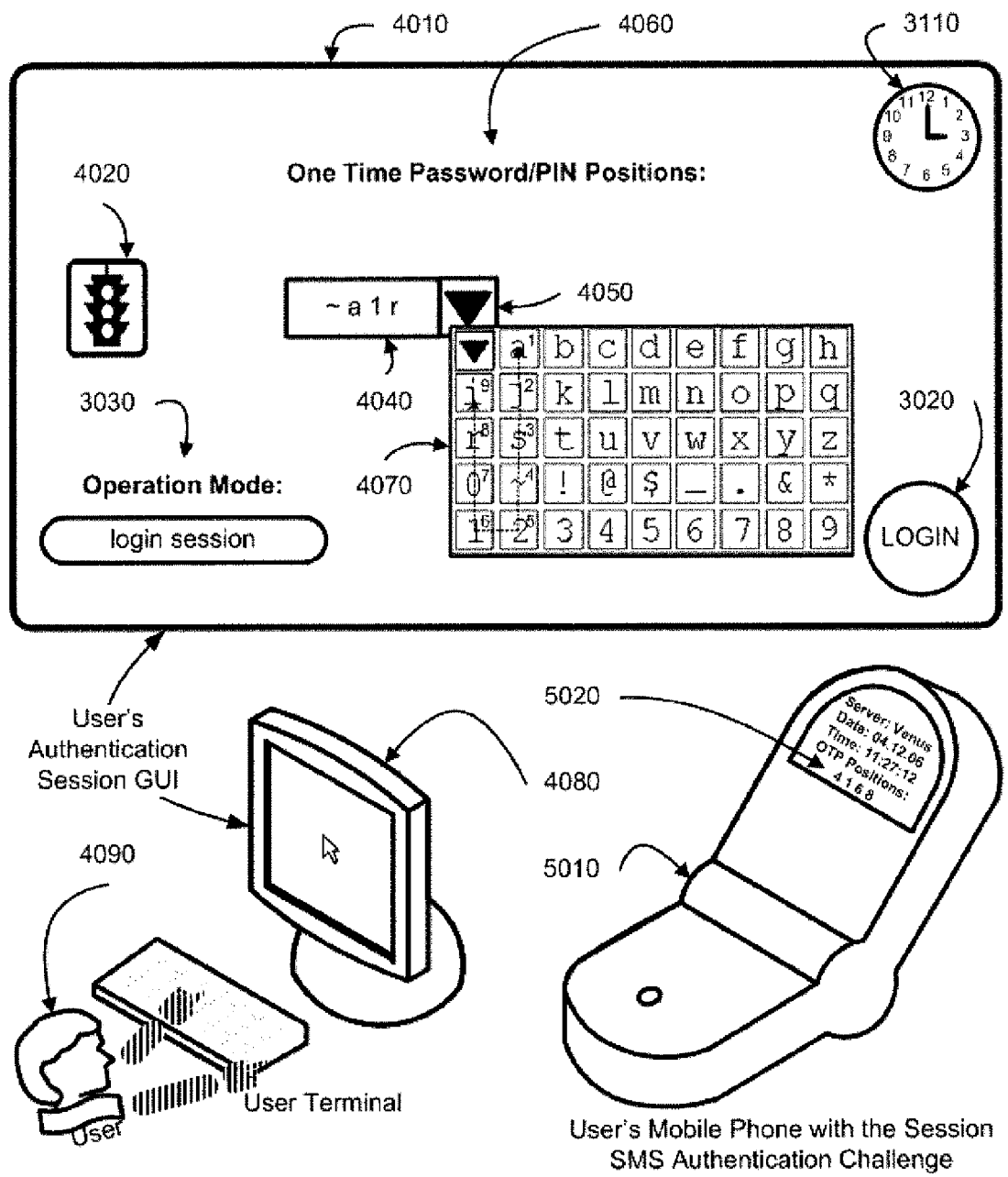
FIG. 6B illustrates a graphical user interface supporting the login process at the random partial PIN or password data entry state, with session only valid personalized PIN or password highlighted on the virtual drop-down keyboard and session only valid personalized authentication challenge displayed as a SMS text message at user's mobile communication device, used in another example of an authentication program according to the present invention.

FIG. 6B illustrates an identical RPPPR authentication login session as FIG. 6A with a two-channel split between a one time authentication challenge OTAC and a one time authentication response OTAR, and a session authentication credential SAC (a one time session-only random graphical password) on user's terminal 4080 highlighted with a directed line digitized at each cell along the line direction on two-dimensional menu grid 4070. The only difference is that it represents another example of OTAC, SAP, and OTAR. In this particular example, one time authentication challenge OTAC 5020 displayed on mobile phone 5010 is "4 1 6 8", whereas session authentication credential SAC highlighted in menu 4070 is: "a" character—occupies the $1^{st}$ position along the graphical password, "j" character—occupies the $2^{nd}$ position along the graphical password, "s" character—occupies the $3^{rd}$ position along the graphical password, "~" special mark—occupies the $4^{th}$ position along the graphical password, "2" character—occupies the $5^{th}$ position along the graphical password, "1" character—occupies the $6^{th}$ position along the graphical password, "0" character—occupies the $7^{th}$ position along the graphical password, "r" character—occupies the $8^{th}$ position along the graphical password, "i" character—occupies the $9^{th}$ position along the graphical password. Following the RPPPR protocol step 2060 (FIG. 2) of generating a one time authentication response OTAR, in this particular case, user 4090 performs several simple instructions to select the appropriate characters or special marks from the SAC (highlighted in menu 4070 one time session-only random graphical password) entering them into field 4040, which constitute "~a 1r" as the one time authentication response OTAR for shown in FIG. 6B particular one time authentication challenge OTAC and session authentication credential SAC.

The authentication method presented in FIG. 6A and FIG. 6B can be implemented with conventional object-oriented software (like J2EE, C++, etc.), networking, and Web Services technologies for remote client-server architectures. This strong authentication (two-factor user authentication) utilizing PIN or password as a first authentication factor and RPPPR authentication factor with two-channel split between a one time authentication challenge OTAC and a one time authentication response OTAR and session-only generated authentication credential SAC as a second authentication factor may provide unique advantages for mass consumer markets like e-commerce or on-line banking for several reasons. First, no memorization effort is required from a user as there is no client-server static shared secret needed to perform an authentication session. Also, no effort is necessary to set up or reset unfamiliar authentication credentials except conventional PIN or password, which altogether are greatly improving usability. Along with a wide spread of mobile communication devices, which are available without any additional cost as personalized hardware authentication factors, and high security of the method presented, it makes it a competitor with most currently used strong authentication combination (PIN or password)+hardware token. The assessment made in Table 1A (FIG. 25) demonstrates the good security scalability against guessing attacks with changing a number of password or PIN character or special mark positions in a one time authentication challenge OTAC (changing it from three to five positions in the challenge leads to lowering probability to guess OTAR from ~1.2e-5 to ~6.1e-9, if letters are case insensitive in the menu 4070 in FIG. 6A or FIG. 6B, and from ~2.9e-6 to ~5.9e-10 for case sensitive letters), whereas entropy leakage of a static authentication credential vanishes as a security issue to consider over a number of possibly recorded authentication sessions with transitioning to a session authentication credential SAC.

To summarize user's steps in a two-factor authentication case, once a user selects login session 3040 in operation mode menu 3030 in FIG. 3A, the user enters her User Name into field 3010 and Password (or PIN) into field 3120 in FIG. 3C, and indicates LOGIN button 3020 to send them to server 1030 in FIG. 1. If User Name and/or Password (or PIN) is/are not recognized by server 1030, an error message appears in GUI 4010 FIG. 3C requesting user to reenter the correct values or terminate the session. If server 1030 positively recognizes User Name and Password (or PIN), then the GUI 4010 in user 4090 browser or on a screen of user's terminal 4080 is updated (see FIG. 6A or FIG. 6B) displaying RPPPR authentication factor graphical construct, allowing the user to invoke two-dimensional menu 4070 of alphanumeric characters and special marks with a highlighted session authentication credential SAC, by indicating field 4050.

At the same time, one time authentication challenge OTAC 5020 is delivered as a SMS text message to user's 4090 personal mobile phone 5010. Now, user 4090 follows the simple instructions of RPPPR protocol in FIG. 2 and generates a one time authentication response OTAR by clicking on cells with appropriate alphanumeric character or special mark content along the highlighted graphical password in menu 4070, and eventually enters OTAR into field 4040. Then, user 4090 closes menu 4070 by clicking on the upper left cell with a triangle mark, or anywhere outside of the menu, and indicating LOGIN button 3020, one time authentication response OTAC is sent to server 1030 (FIG. 1) which compares received and expected OTAR and signals back to user 4090 a positive or negative authentication result. If the authentication result is successful, stoplight 4020 changes from yellow to green and user is rerouted to the protected destination of interest 1060 in FIG. 1. Otherwise, stoplight 4020 changes color back from yellow to red, indicating a failed authentication result in FIG. 6A or FIG. 6B, concurrently with an error message requesting the user to reenter a correct one time authentication response OTAR or terminate the session.

Password (or PIN) in this two-factor authentication scheme plays, if correct, several roles.

(i) It confirms user to the server by the first authentication factor.

(ii) It triggers the server to generate a random session-only one time authentication credential SAC and send it along with the RPPPR GUI containing a graphical construct to enter a one time authentication response OTAR to the client.

(iii) It triggers the server to generate a one time authentication challenge OTAC and send it as a SMS text message to the user's personal mobile phone.

An intruder without the password (or PIN) cannot initiate the authentication session and invoke the second authentication factor. At the same time, an intruder without user's personal mobile phone where the one time authentication challenge OTAC is arriving cannot fulfill the second authentication factor even having obtained access to the GUI in a browser or on a screen where the session authentication credential SAC is highlighted, rendering the authentication session failed. Conventional intruder techniques of recording authentication sessions, and gathering and analyzing front-end authentication credential information to eventually determine the user's authentication credential by entropy leakage over a number of authentication sessions does not work in this architecture due to the integration of two-factor authentication using a password (or PIN) with RPPPR authentication and the two-channel split between OTAC and OTAR, and session authentication credential SAC. Another conventional intruder's technique of applying guessing or offline brute force computer-processing attacks or software key logging attacks would also not work for this authentication scheme because a new random session-only valid one time user authentication credential is generated during each session that defeats the purpose of the attacks. Even assuming an intruder directly observes OTAC and SAC during the user's authentication session ("shoulder surfing"; 100% credential entropy loss per authentication session), it would be hard for the intruder to do anything with this short lived information during the authentication session (typically, it is less than one minute—the usual duration of an authentication session). It is interesting to compare it with the known security deficiency of the SecureID type hardware tokens—once the passcode (PIN+six digit random number which is generated every 60 seconds on the token indicator) enters the communication-lines, intruders who intercept the passcode, have the opportunities to reuse it for approximately 60 seconds until the next six digit number is generated at the token. This invention technique does not allow any latency time for a session authentication credential SAC because once the one time authentication response OTAR reaches the server, the SAC is automatically obliterated.

Random Partial Digitized Path Recognition (RPDPR) Authentication Factor

Figure 7:
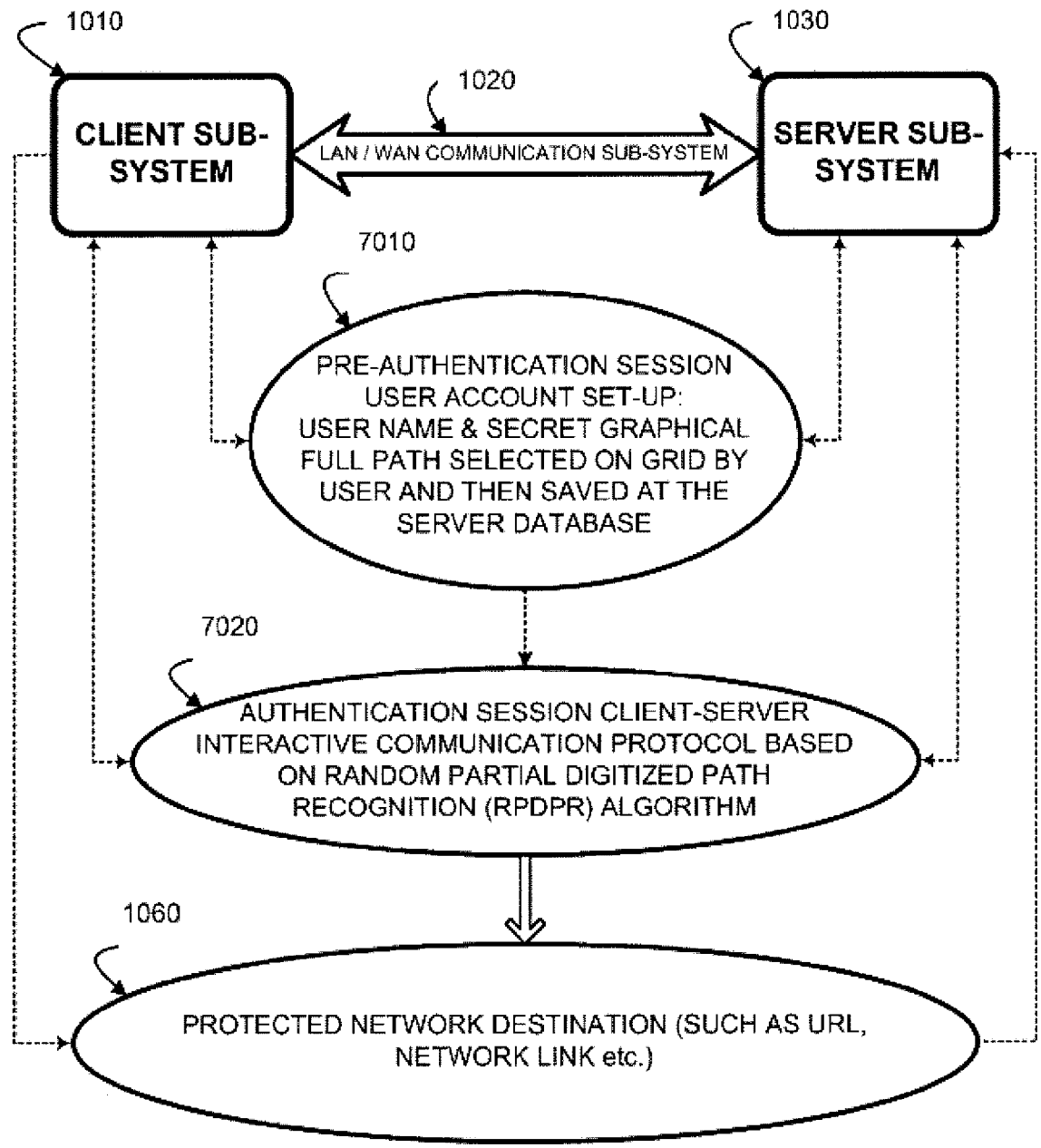
FIG. 7 illustrates client-server architecture for implementation of a user authentication process based on RPDPR algorithm according to the present invention.
Figure 8:
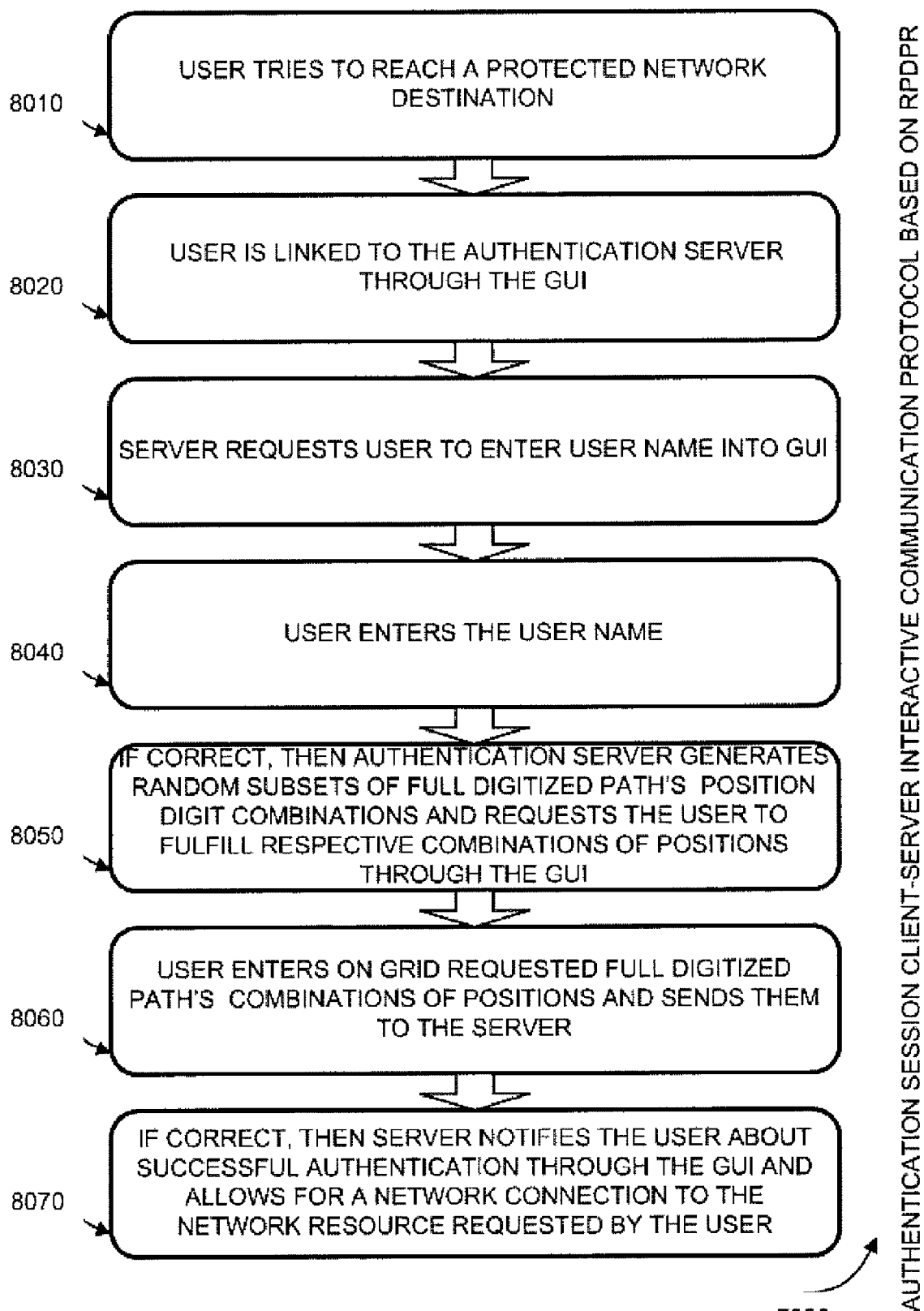
FIG. 8 is a flowchart of a basic random partial digitized path recognition RPDPR authentication session according to the present invention.

FIG. 7 illustrates a basic communication set up for RPDPR authentication processes according to the present invention.

Client subsystem 1010 communicates by communication media, such as local area network or wide area network communications subsystem 1020, with server subsystem 1030. Protected network destination 1160 controls access to resources such as secure web sites identified by URLs, links to secure networks, and the like.

To set up access, pre-authentication session 7010 is executed by client subsystem 1010 and server subsystem 1030. In pre-authentication session 7010, a user account is set up in server subsystem 1030, the user name and a secret graphical full digitized path represented by an ordered data set of data fields is selected by the user and stored in server subsystem 1030. In the ordered data set, the data fields have a position in the data set and have respective field contents. For RPDPR, the field contents include combinations of field coordinates on a frame of reference of points characterizing data field locations along a directed digitized path on the frame of reference. The position in the data set corresponds to the position of a corresponding point on the directed graphical digitized path, which has coordinates known to the client on the frame of reference. The position in the data set therefore indicates such coordinates to the client, and the coordinates can be used to select an indicator to be supplied as a part of the authentication factor that corresponds to the position indicated by the clue.

The user account information, user name and ordered set of data fields are stored in a secure server database, along with such other information utilized during an authentication session. In some embodiments, information supporting additional authentication factors is stored in the database.

To gain access to protected network destination 1160, the client subsystem 1010 and server subsystem 1030 execute an authentication session 7020 that includes a client-server interactive communication protocol based on RPDPR. A more detailed description of an embodiment of an authentication session 7020 is provided with reference to FIG. 8.

According to one basic flow, an authentication session is initiated when the user tries to reach a protected network destination (block 8010). The protected network destination redirects the user's attempted access to the authentication server or the attempted access is otherwise detected at authentication server 1030. In one example where the user is attempting access using an Internet browser, a communication interface that includes a graphical user interface and links to authentication server 1030 (block 8020) are returned to the user's browser. The communication interface may be returned through redirection, for example, by the authentication server or another network resource. Through the graphical user interface, the server prompts the user to enter a user name into a field in the graphical user interface (block 8030). The user enters the user name, which is returned to the authentication server (block 8040). If the user name is valid, then the authentication server identifies a random subset of data fields from the ordered data set of data fields that have field contents indicating coordinates of a set of points that together define a full graphical digitized path on the frame of reference. For instance, in one embodiment, there are ten data fields comprising a full graphical digitized path with the starting path field in position 1, next consecutive data field in position 2, and onward up to the last data field at the full graphical digitized path end in position 10 which is presented with digit 0. Then, random subsets identified by the authentication server (a clue) and presented to the user through the graphical user interface will look like a random set of random digit combinations, such as, "2 4", "0 1 9", "7", "6 8". The user is prompted to complete input field values that correspond to the coordinates in member data fields in the random subset of data fields using the graphical user interface (block 8050). In one example, the input field values are selected from an array of indicators located on an instance of the frame of reference, where the indicators in the array have locations on the instance of the frame of reference corresponding to candidate coordinates in the frame of reference. The user inputs the indicators or other data corresponding to the coordinates for the random subset of the digitized path and for the input field contents, and the input data is returned to the server (block 8060). If the input data matches the field contents for the random subset, then successful authentication is signaled to the user via, for example, the graphical user interface, signaled to the protected network destination and/or signaled to other resources (such as authorization and accounting systems) that need to know that the authentication session has succeeded, and network connection to the requested protected network destination is allowed (block 8070).

Figure 9:
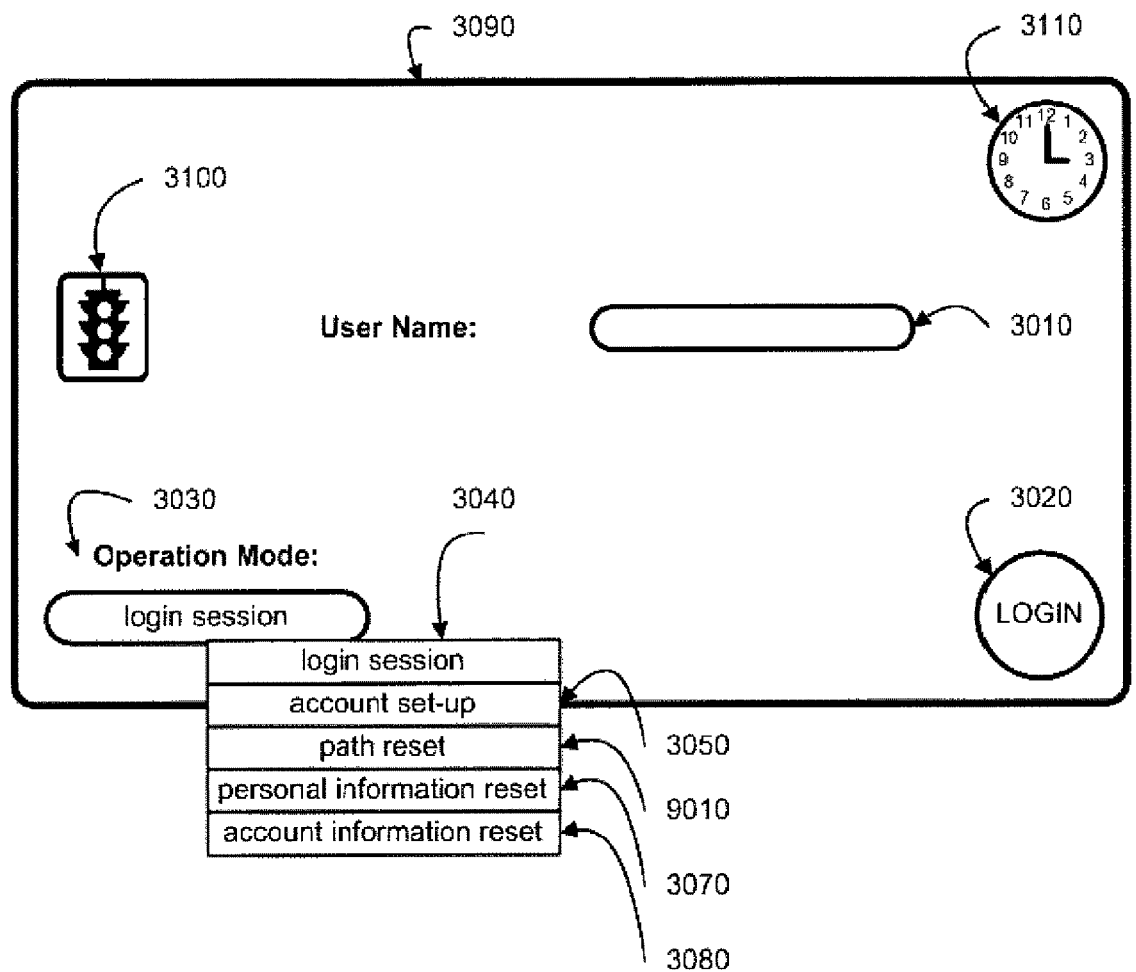
FIG. 9 illustrates a graphical user interface supporting the variety of RPDPR operation modes, and particularly, the login process at the user name entry state used in one example of an authentication program according to the present invention.

FIGS. 9, 3B, and 3C illustrate input constructs based on graphical user interfaces presented using Web browsers for a login and authentication session. FIG. 9 illustrates an opening screen 3090 which is presented to the user at the beginning of an RPDPR authentication session. In the opening screen 3090, data entry field 3010 is used for entry of a user name. Login button 3020 is indicated to initiate processing of field data and to start a login process.

Operation mode menu 3030 is included and when it is indicated, it causes a drop-down menu of operation mode buttons including login session operation mode button 3040, account set up operation mode button 3050, path reset operation mode button 9010, user personal information reset button 3070, and user account information reset button 3080. Stoplight icon 3100 is included in screen 3090. Stoplight icon 3100 is red before the user name is entered (either by indicating LOGIN button 3020, or hitting the "Enter" key on the user's keyboard), is yellow during client-server communications while the client is waiting for verification of the user name, and turns green when user name is accepted. Also included in screen 3090 is session timer icon 3110 indicating session elapsed time for the login session. The system administrator can set parameters in the server that terminate the login process or any other operation mode session selected by a user in menu 3030 if the timer expires (session time can have different time limits for various operation modes), or otherwise react to timer expiry. FIG. 3B and FIG. 3C were described above for RPPPR authentication factor and are identical in functionality as RPDPR authentication factor as well, illustrating RPIDPR login session beginning with a user name only in FIG. 3B, or if such is the case, when two-factor authentication (strong authentication) scheme including password (or PIN) as the first authentication factor (User Name and Password (or PIN) are entered into GUI in FIG. 3C) and PPDPR as a second authentication factor.

Figures 10A, 10B, 10C, 10D, 10E, 10F:
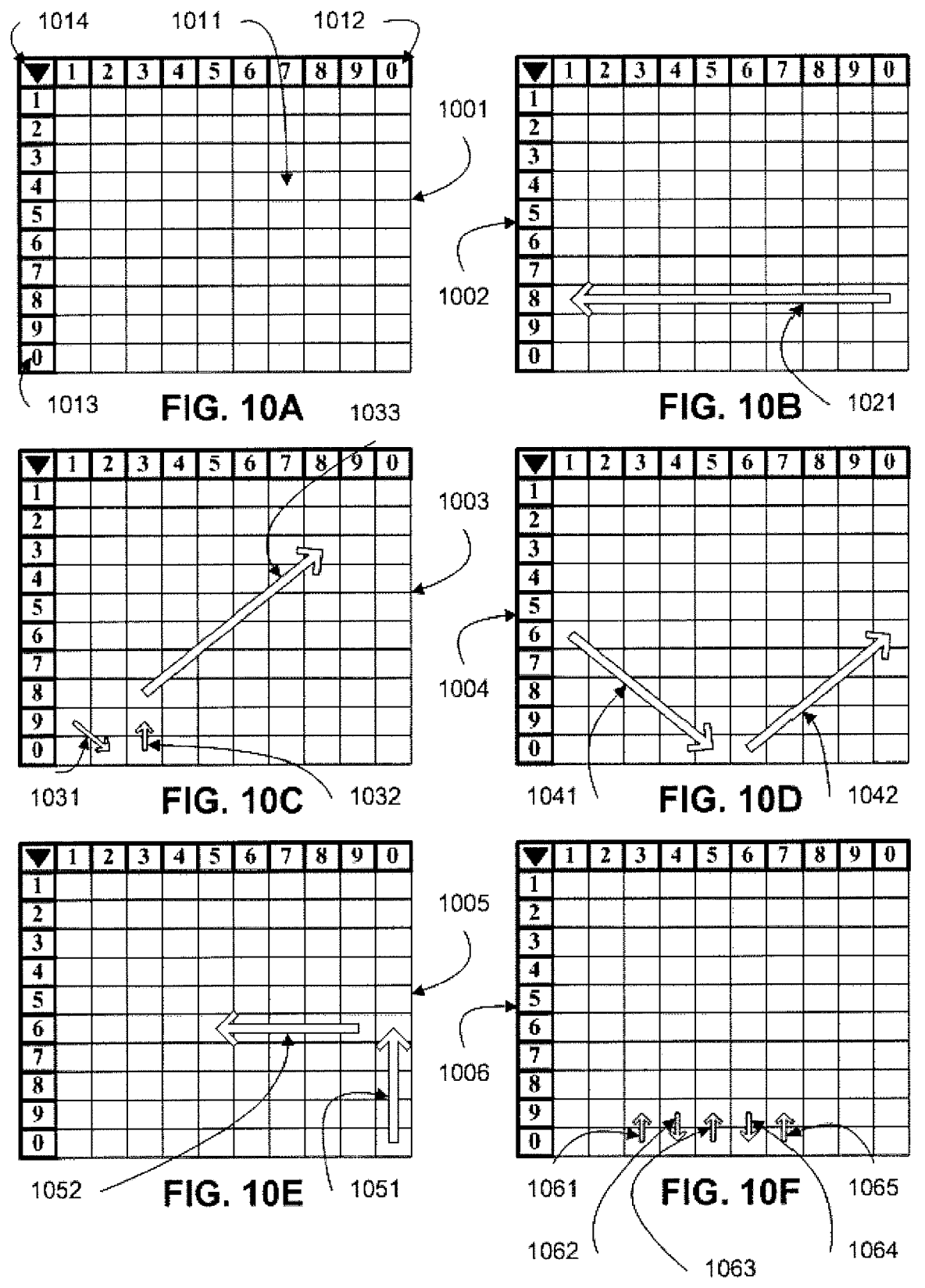

FIGS. 10A-10F when related to FIGS. 10G-10K and FIGS. 11A-11F when related to FIGS. 11G-11L illustrate how a digitized path is specified with respect to a frame of reference for use as a RPDPR authentication factor. In this example, the frame of reference consists of a reference grid as shown in FIG. 10A. Reference grid 1001 in this embodiment consists of an array of locations (e.g. 1011) that can be characterized by coordinates along horizontal and vertical axes 1012, 1013 respectively, as in a Cartesian coordinate system. Other frames of reference may be organized according to other coordinate systems, such as polar coordinate systems. In the example shown in FIG. 10A location 1011 can be characterized by coordinates (7, 4). FIG. 10A represents an instance of a frame of reference for display on a user interface during an account setup procedure, for example, used by a client to specify a full graphical digitized path. Thus, the instance includes icon 1014 with a triangle mark depicted on it at the intersection of the reference axes, used as a button for opening and closing the instance. The client may draw (or choose, or select) a graphical path on the reference grid with a mouse, a keyboard, or other input device, or the graphical path may be provided by a server, as suits a particular instance of the set up algorithm.

Figures 10G, 10H, 10I, 10J, 10K:
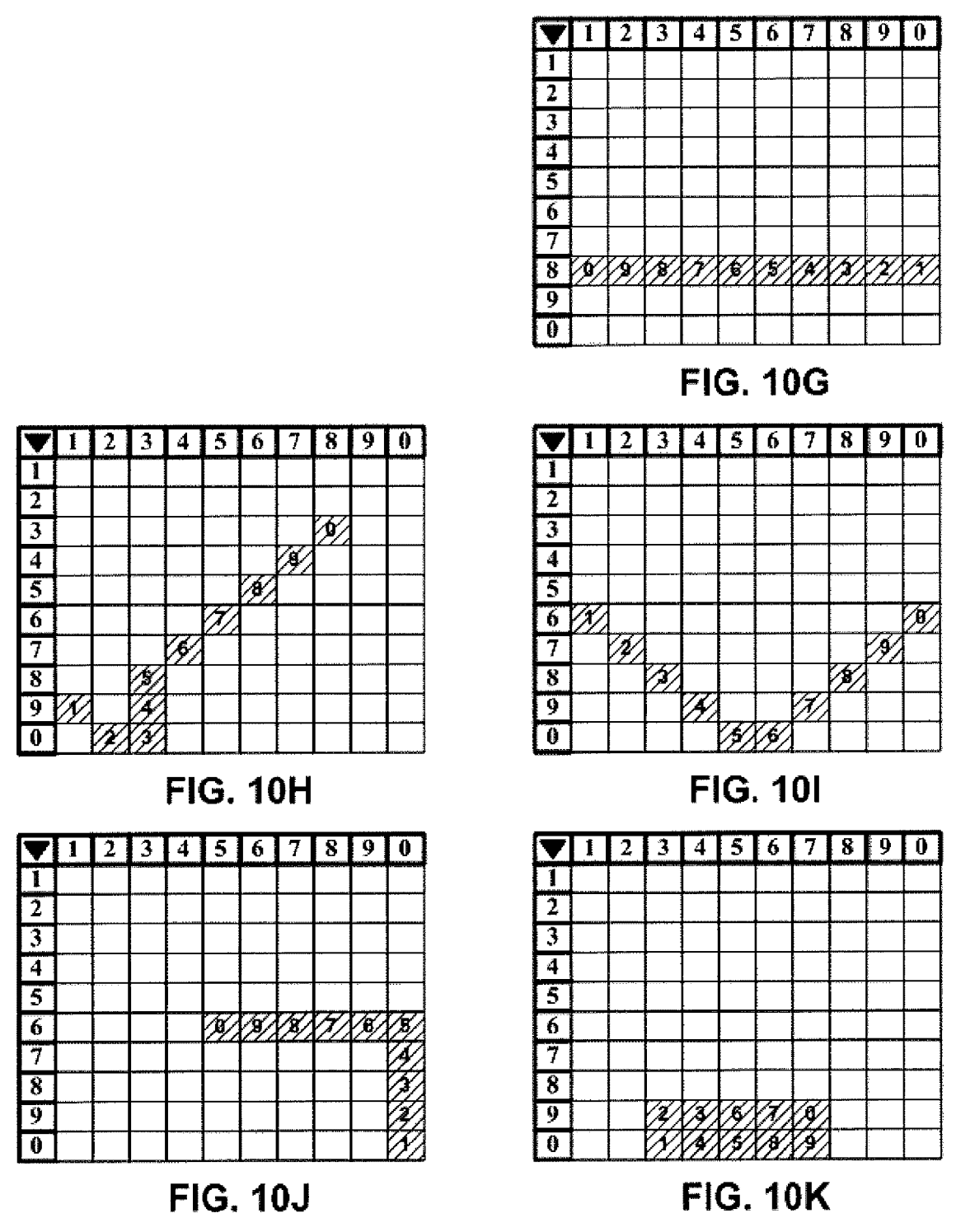

FIGS. 10B-10F illustrate representative graphical digitized paths which can be set up using the frame of reference 1001. Related FIGS. 10G-10K disclose the meaning of word "digitized" combined in the text together with "graphical path". Shaded grid fields consecutively numbered with digits 1, 2, 3, 4, 5, 6, 7, 8, 9, 0 from the beginning to the end of the graphical path comprise fall graphical digitized paths. Digital content of a field represent the field position along a full graphical digitized path. Thus, FIG. 10B and its related figure, FIG. 10G, illustrate graphical path 1021 on an instance 1002 of the reference grid. The path includes a set of points beginning with a point at coordinates (0, 8). The path proceeds in a straight line in order with points at the coordinates (9, 8), (8, 8), (7, 8), . . . , (1, 8). A data set corresponding with this digitized path comprises a set of data fields having positions 1 through 0 (here and everywhere in this application 0 represents position number 10) in the data set (where the positions can be represented by a field number using a data set that comprises a linear array of data fields). The data fields at the 10 positions respectively store combinations of coordinates (0, 8) through (1, 8) in order. In this manner, if the client knows the path and the location of a data field in the data set, the client can determine the coordinates stored in the data field. Those coordinates can be used to fulfill the authentication factor as described below.

FIG. 10C and its related figure, FIG. 10H, illustrate a graphical path represented by arrows 1031, 1032, 1033 on an instance 1003 of the frame of reference. The graphical path of FIG. 10C and its digitized representation in FIG. 10H include the coordinates in order: (1,9), (2,0), (3,0), (3,9), (3,8), (4,7), (5,6), (6,5), (7,4), and (8,3). These coordinates are stored in the data fields in positions 1 through 0 respectively (see FIG. 10H) in the data set used as the authentication factor based on the path in FIG. 10C.

FIG. 10D and its related figure, FIG. 10I, illustrate a path represented by arrows 1041, 1042 on an instance 1004 of the frame of reference. The graphical path of FIG. 10D and its related figure, FIG. 10I, include the coordinates in order: (1,6), (2,7), (3,8), (4,9), (5,0), (6,0), (7,9), (8,8), (9,7), and (0,6). These coordinates are stored in the data fields in positions 1 through 0 respectively (see FIG. 10I) in the data set used as the authentication factor based on the path in FIG. 10D.

FIG. 10E and its related figure, FIG. 10J, illustrate a path represented by arrows 1051, 1052 on instance 1005 of the frame of reference. The graphical path of FIG. 10E and its digitized representation in FIG. 10J, include the coordinates in order: (0,0), (0,9), (0,8), (0,7), (0,6), (9,6), (8,6), (7,6), (6,6), and (5,6). These coordinates are stored in the data fields in positions 1 through 0 respectively (see FIG. 10J) in the data set used as the authentication factor based on the path in FIG. 10E.

FIG. 10F and its related figure, FIG. 10K, illustrate a path represented by arrows 1061, 1062, 1063, 1064, 1065 on instance 1006 of the frame of reference. The graphical path of FIG. 10F and its digitized representation in FIG. 10K include the coordinates in order: (3,0), (3,9), (4,9), (4,0), (5,0), (5,9), (6,9), (6,0), (7,0), and (7,9). These coordinates are stored in the data fields in positions 1 through 0 respectively (see FIG. 10K) in the data set used as the authentication factor based on the path in FIG. 10F.

The digitized paths shown in FIGS. 10B through 10F and their related figures, FIGS. 10G through 10K, are herein considered continuous digitized paths, because all of the coordinates on the path are adjacent to other coordinates on the path in order. Continuous paths may be easier to remember for some clients.

Also, all of the representative digitized paths have the same number of points (or fields). Using the same number of points (or fields) on each graphical path facilitates the execution of the RPDPR authentication algorithm, but is not necessary to the concept of the RPDPR authentication factor.

Other embodiments of the invention use digitized paths that are non-continuous, such as described in reference to FIGS. 11A-11F and their related figures, FIGS. 11G-11L.

Figures 11A, 11B, 11C, 11D, 11E, 11F:
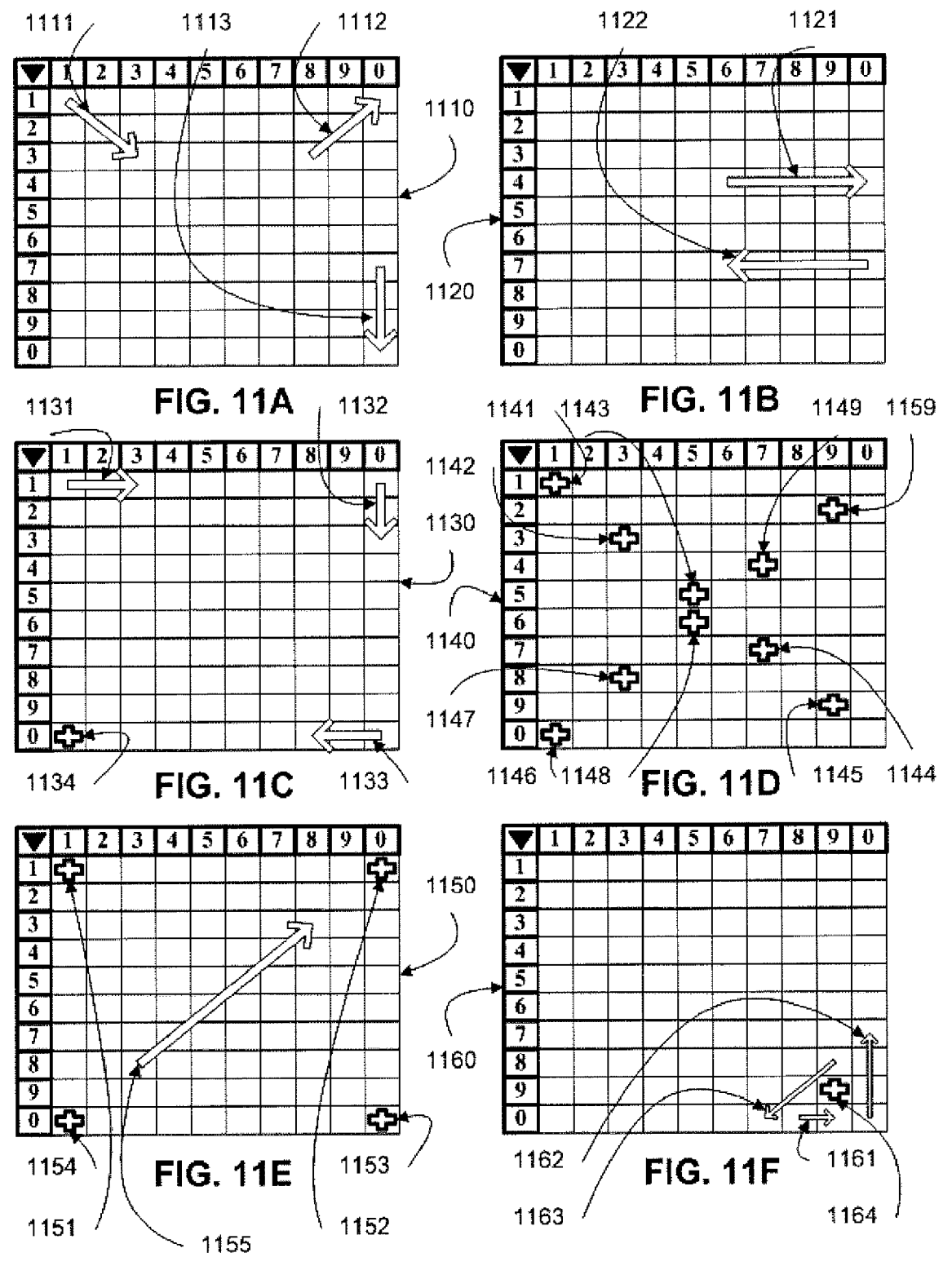
Figures 11G, 11H, 11I, 11J, 11K, 11L:
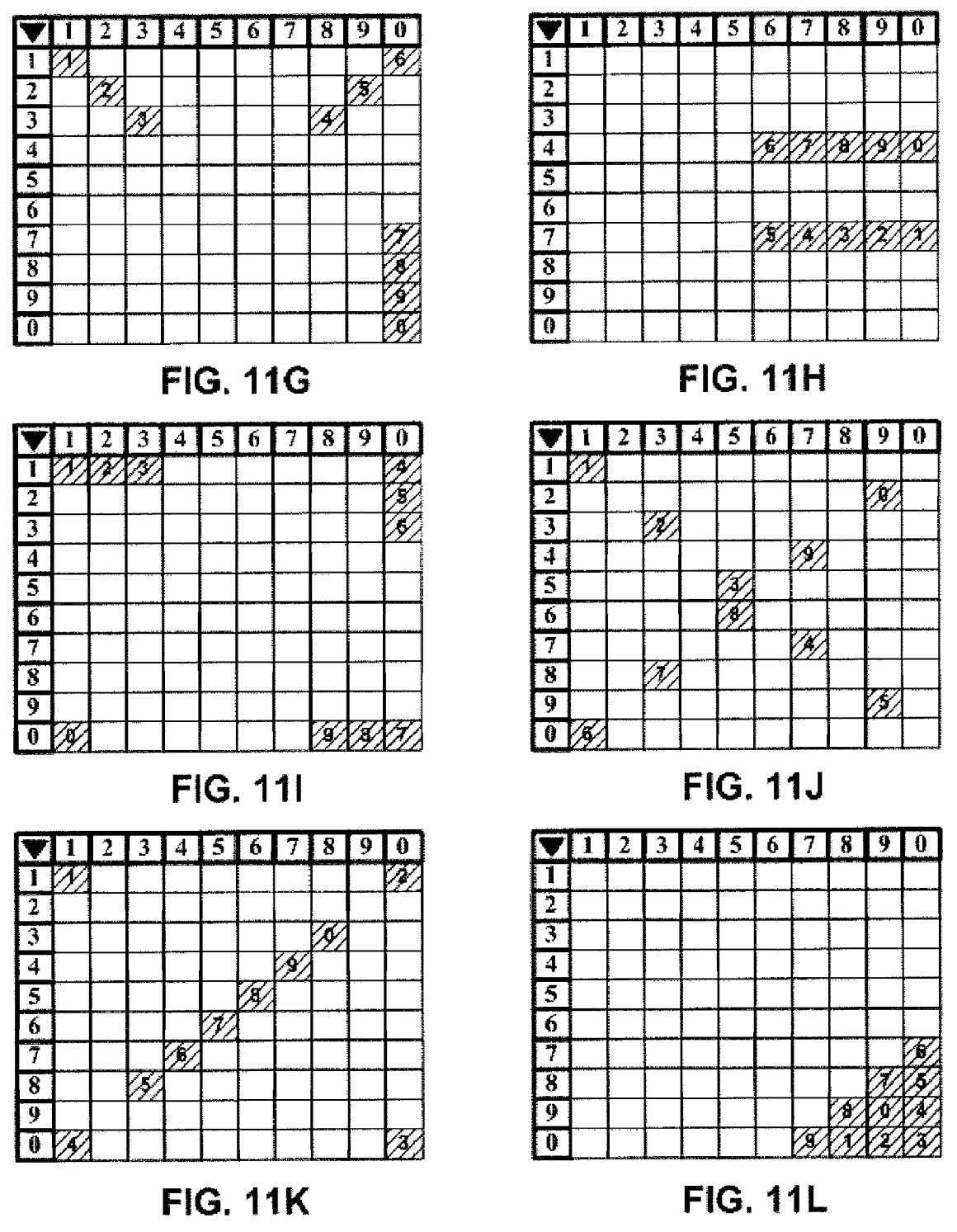

FIG. 11A and its related figure, FIG. 11G, illustrate a non-continuous path represented by arrows 1111, 1112, 1113 on instance 1110 of the frame of reference. The graphical path of FIG. 11A and its digitized representation in FIG. 11G include the coordinates in order: (1,1), (2,2), (3,3), (8,3), (9,2), (0,1), (0,7), (0,8), (0,9), and (0,0). A discontinuity in the path occurs between coordinates (3, 3) and (8, 3). Also, a discontinuity occurs between coordinates (0, 1) and (0, 7). These coordinates are stored in the data fields in positions 1 through 0 (see FIG. 11G) respectively in the data set used as the authentication factor based on the path in FIG. 11A.

FIG. 11B and its related figure, FIG. 11H, illustrate a non-continuous path represented by arrows 1121, 1122 on instance 1120 of the frame of reference. The graphical path of FIG. 11B and its digitized representation in FIG. 11H include the coordinates in order: (0, 7), (9, 7), (8, 7), (7, 7), (6, 7), (6, 4), (7, 4), (8, 4), (9, 4), and (0, 4). These coordinates are stored in the data fields in positions 1 through 0 respectively (see FIG. 11H) in the data set used as the authentication factor based on the path in FIG. 11B.

FIG. 11C and its related figure, FIG. 11I, illustrate a non-continuous path represented by arrows 1131, 1132, 1133 and cross 1134 on instance 1130 of the frame of reference. The path of FIG. 11C and its digitized representation in FIG. 11I include the coordinates in order: (1, 1), (2, 1), (3, 1), (0, 1), (0, 2), (0, 3), (0, 0), (9, 0), (8, 0), and (1, 0). These coordinates are stored in the data fields in positions 1 through 0 respectively (see FIG. 11I) in the data set used as the authentication factor based on the path in FIG. 11C.

FIG. 11D and its related figure, FIG. 11J, illustrate a non-continuous path represented by crosses 1141, 1142, 1143, 1144, 1145, 1146, 1147, 1148, 1149, 1159 on instance 1140 of the frame of reference. The graphical path of FIG. 11D and its digitized representation in FIG. 11J include the coordinates in order: (1, 1), (3, 3), (5, 5), (7, 7), (9, 9), (1, 0), (3, 8), (5, 6), (7, 4), and (9, 2). These coordinates are stored in the data fields in positions 1 through 0 respectively (see FIG. 11J) in the data set used as the authentication factor based on the path in FIG. 11D.

FIG. 11E and its related figure, FIG. 11K, illustrate a non-continuous path represented by crosses 1151, 1152, 1153, 1154 and arrow 1155 on instance 1150 of the frame of reference. The graphical path of FIG. 11E and its digitized representation in FIG. 11K include the coordinates in order: (1, 1), (0, 1), (0, 0), (1, 0), (3, 8), (4, 7), (5, 6), (6, 5), (7, 4), and (8, 3). These coordinates are stored in the data fields in positions 1 through 0 respectively (see FIG. 11K) in the data set used as the authentication factor based on the path in FIG. 11E.

FIG. 11F and its related figure, FIG. 11L, illustrate a non-continuous path represented by arrows 1161, 1162, 1163 and cross 1164 on instance 1160 of the frame of reference. The graphical path of FIG. 11F and its digitized representation in FIG. 11L include the coordinates in order: (8, 0), (9, 0), (0, 0), (0, 9), (0, 8), (0, 7), (9, 8), (8, 9), (7, 0), and (9, 9). These coordinates are stored in the data fields in positions 1 through 0 respectively (see FIG. 11L) in the data set used as the authentication factor based on the path in FIG. 11F.

Figure 12:
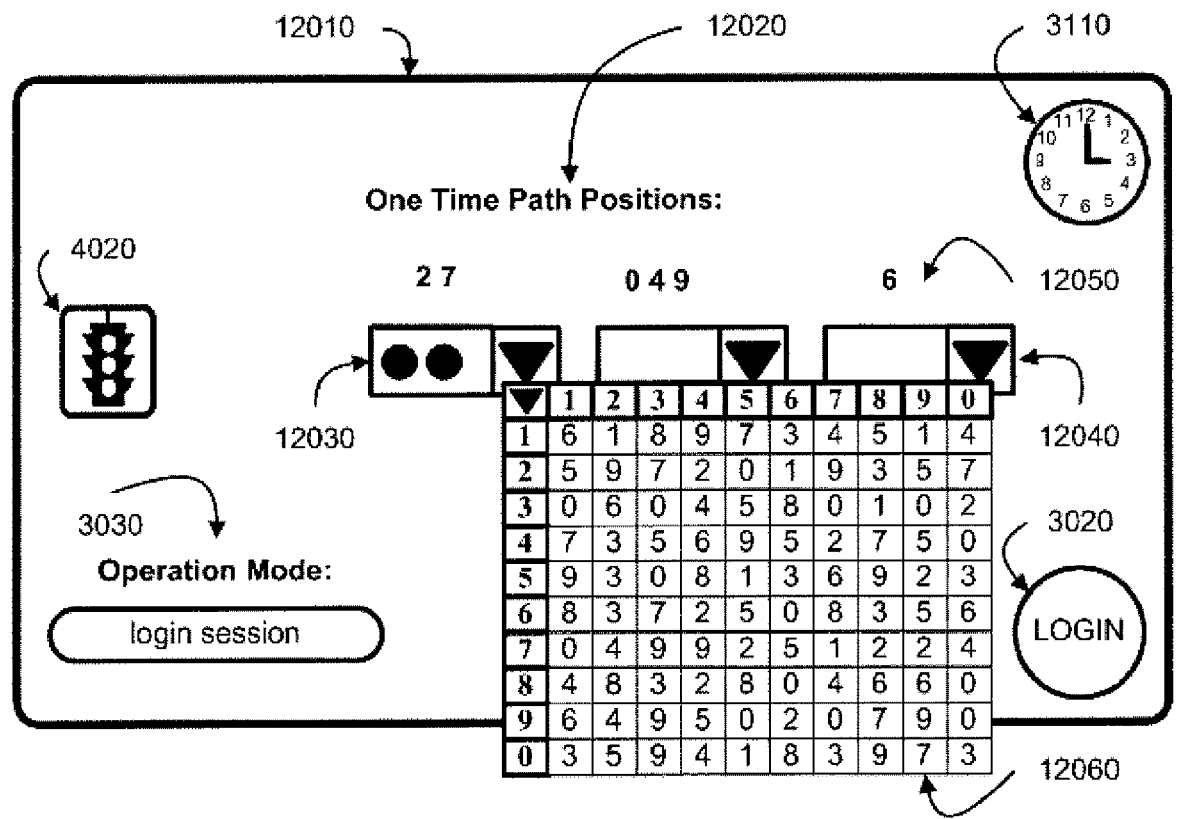
FIG. 12 illustrates a graphical user interface in a desktop or laptop's browser or on a screen supporting the login process at the random partial digitized path data entry state, used in one example of an authentication program according to the present invention.

FIG. 12 illustrates graphical user interface screen 12010, which is presented at the beginning of an authentication session based on RPDPR after the user name in field 3010 in FIG. 3B (or user name and password (or PIN) in FIG. 3C in a two-factor authentication case which includes Password (or PIN)+RPDPR authentication factors) is recognized by server 1030 in FIG. 7. The entered and accepted user name could be displayed in user name field 3010, either as text or as a sequence of echo dots for security reasons. The password is always veiled by echo dots as the only available operation mode. After acceptance of the user name, interface 12010 prompts the client for fulfillment of the RPDPR authentication factor. Otherwise, if the user name (or the user name and password) is not accepted by the authentication server, an error message appears in GUI 3090 requesting user to reenter the correct data or terminate the session. Graphical user interface screen 3090 in FIG. 3B (or in FIG. 3C in the two-factor authentication case) will not be replaced with GUI 12010 in FIG. 12. Stoplight icon 4020 appears red before data has been entered into data fields 12030 or before login button 3020 is indicated. The stoplight icon 4020 appears yellow during client-server communications and before acceptance of the input data representing field contents. Stoplight icon 4020 appears green to signal successful authentication.

Data entry fields (e.g. 12030) are presented for a pattern comprising a corresponding number of fields which will constitute the random subset of the data set of data fields stored for the user. In this example, a plurality of the random subsets are presented to the user by sets of field position numbers (e.g. 12050), and includes the set of field position numbers "2 7", "0 4 9", "6" out of a data set of, for example, 10 data fields corresponding to a digitized path comprising 10 points. In this embodiment, associated with each of the data entry fields is button 12040 with a corresponding window for entry field 12030 of indicators selected by the user. By indicating button 12040, drop-down menu 12060 is displayed. The drop-down menu can be closed by clicking inside the menu on the upper left field with a triangle mark, or anywhere outside of the menu. Drop-down menu 12060 comprises an instance of a reference grid, such as shown in FIGS. 10A-10F and 11A-11F, where the points on the grid are populated by a randomized array of indicators. Thus, an indicator at the point with coordinates (4, 5) is the digit 8. Server 1030 in FIG. 7 produces a different instance of the array of indicators for each instance of the reference grid 12060. The different instances of the array of indicators can be generated randomly, or pseudo-randomly, in preferred embodiments. Alternatively, a set of previously generated arrays of indicators can be utilized in random order. Other techniques can be utilized for making the presentation of the arrays of indicators variable to strengthen the authentication factor.

Graphical user interface 12010 presents clues represented by the sets of field position numbers (e.g. 12050) titled "One Time Path Positions" 12020. Corresponding input fields 12030 are presented to the user. The user fulfills the authentication factor by including the indicators from the points on the reference grid with the coordinates that correspond to the field position numbers that identify the random subset of the full digitized graphical path, associated as clues with the input fields. Thus, in the input fields corresponding to the set of field position numbers "2 7", for a full digitized path as shown in FIG. 10B, the indicators chosen will be a combination of the indicator at the coordinates stored in field position number 2 and the coordinates stored in field position number 7 of the full data set. Field position number 2 in FIG. 10B stores the coordinates (9, 8). The indicator at the coordinates (9, 8) is the digit 6. Field position number 7 in the example of FIG. 10B stores the coordinates (4, 8). The indicator at coordinates (4, 8) is the digit 2. Therefore, input field 12030 is fulfilled by inputting indicators 6 and 2, which are veiled by echo dots in FIG. 12 for security reasons in an attempt to reduce credential entropy leakage over a number of authentication sessions. A similar procedure is followed to fulfill the fields corresponding to the clues that consist of the sets of field position numbers "0 4 9" and "6" for graphical user interface 12010 shown in FIG. 12.

Two-Channel Challenge-Response RPDPR Authentication Factor

Figure 13:
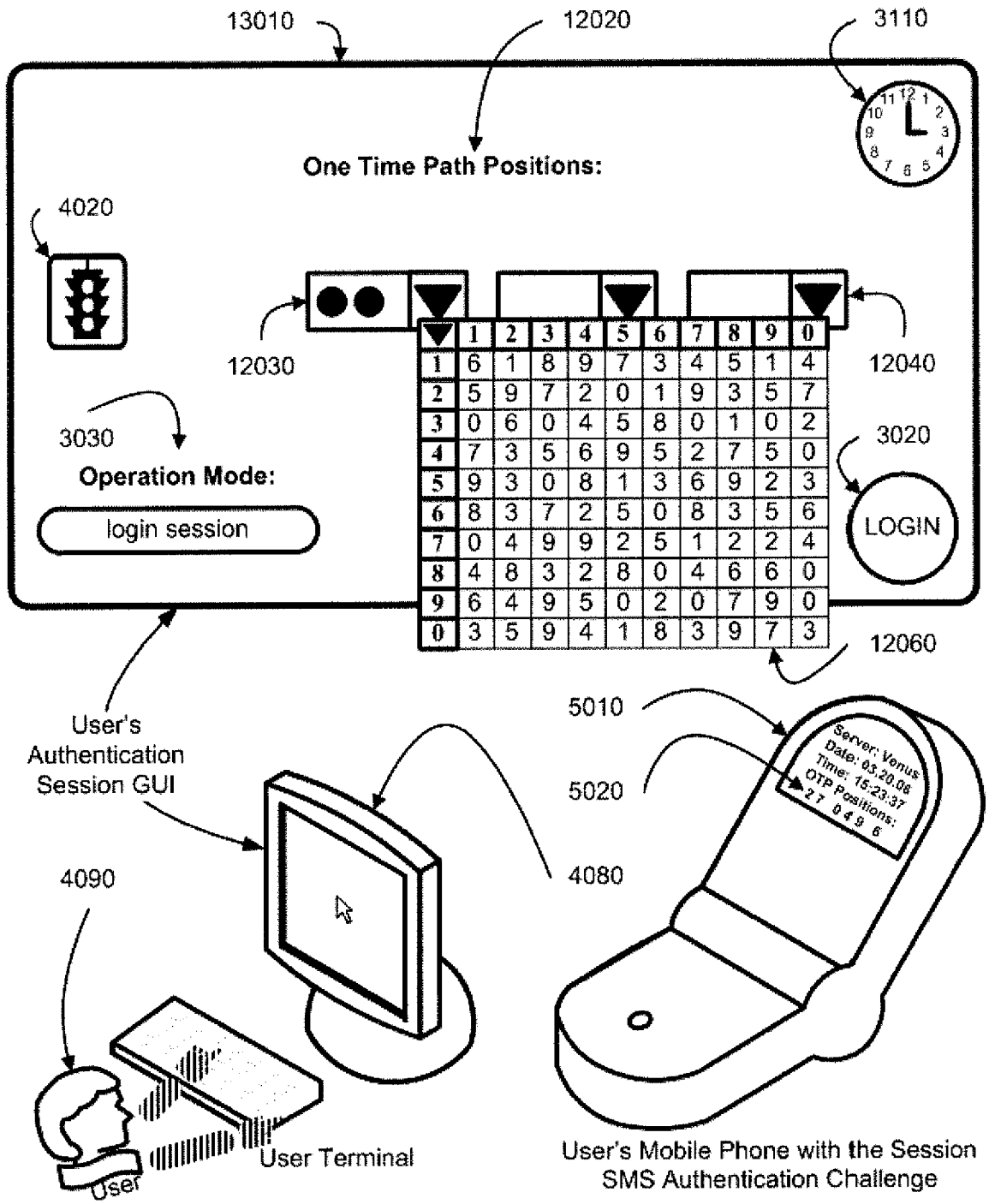
FIG. 13 illustrates a graphical user interface supporting the login process at the random partial digitized path data entry state while the authentication challenge is coming as a SMS text message to user's mobile communication device, used in one example of an authentication program according to the present invention.

FIG. 13 illustrates the same login session with RPDPR authentication factor as in FIG. 12, but the only difference is that a one time authentication challenge OTAC 12050 is delivered to user 4090 personal mobile communication device 5010 rather than the GUI. This splits a one time authentication challenge OTAC, generated by server 1030 (FIG. 1) and delivered with Short Message Service (SMS) 24010, 24020 (see FIG. 23 and FIG. 24) text message 5020 displayed on user's personal mobile communication device 5010, and a one time authentication response OTAR generated by the user in GUI 13010 in the browser or on a screen of user's terminal 4080, where graphical construct 12030, 12040, 12060, and 3020 to enter and send OTAR to the server is presented.

Such a two-channel split between OTAC and OTAR makes it much harder for an intruder to reengineer user's credential—it would require more sessions with recorded OTAR to assure that all characters and special marks in the credential are already gathered and it will be much more difficult to analyze the eventual credential form. Altogether, it further reduces credential entropy leakage while enhancing the RPDPR authentication credential security against various attacks. Indeed, let's consider, for example, the graphical path in FIG. 11H, and assume that there are two digits in OTAC with one digit at each field (there would be always two fields per session) from which a grid is instantiated for every authentication session (two digits in OTAR at only one field during each authentication session would be an equivalent situation). Then, in the case of no channel split between OTAC and OTAR, it could take only five authentication sessions in the worst case scenario performance of the algorithm generating OTAC to expose and let the intruder record all ten field locations in FIG. 11H along with consecutive position numbers along the path. However, in the case of a two-channel split between OTAC and OTAR, the intruder would know only all fields comprising the path but not the actual path direction, because the path's field positions information is not available for the record due to a two-channel split between OTAC and OTAR. Now, the intruder is to guess further the actual path direction. Even the simplest assumption that the path begins at the edge of a line segment in FIG. 11H would give at least eight possibilities of a potential path direction. If the assumption is not correct the number of guessing attempts would be further magnified. Clearly, the entropy leakage of the credential per authentication session is lower in the case of a two-channel split between OTAC and OTAR. Having more than one discontinuity in a graphical path, would further reduce a credential entropy leakage per authentication session.

Session Authentication Credential in RPDPR with Two-Channel Challenge-Response

Figure 14A:
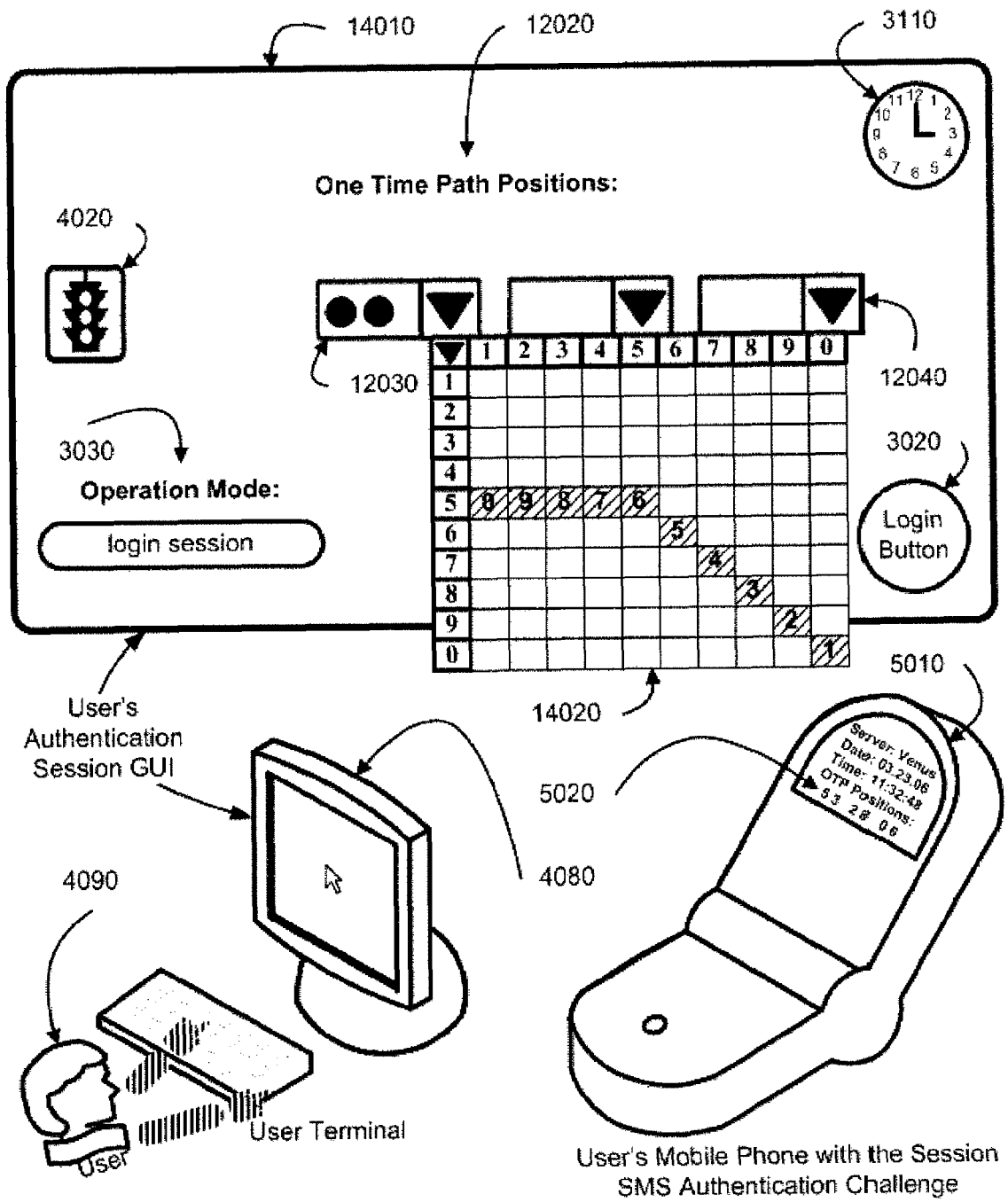
FIG. 14A illustrates a graphical user interface supporting the login process at the random partial digitized path data entry state with session only valid personalized graphical path highlighted on the virtual drop-down grid depicted by consecutive digits and shadowed grid fields along the path, and session only valid authentication challenge displayed as a SMS text message at user's mobile communication device, used in one example of an authentication program according to the present invention.

FIG. 14A illustrates the same login session with RPDPR authentication factor as in FIG. 13, with one time authentication challenge OTAC 5020 arriving to the personal mobile communication device 5010 and a one time authentication response OTAR entered into field 12030 in GUI 14010 on a browser or a login screen of a desktop or laptop 4080 of user 4090. The only difference is that user 4090 does not need to exercise any cognitive association with a static client-server shared secret to generate one time authentication response OTAR entered into fields 12040. There is no static shared secret in this approach. Instead, Session Authentication Credential (SAC) is generated by server 1030 (FIG. 1) and transmitted to the GUI in a browser or on a login screen of user 4090 desktop or laptop 4080, once the User Name (and PIN or password as a first authentication factor in a two-factor (strong authentication) case) is recognized by the server. User 4090 can see session authentication credential SAC (a one time session-only random graphical path) on user's terminal 4080 highlighted with a consecutively digitized SAC at each shaded field along the graphical path direction on two-dimensional drop-down grid 14020.

In this particular embodiment, the graphical path (which is a session authentication credential SAC) shown in FIG. 14A is: "1" digit—occupies the $1^{st}$ position along the graphical path with coordinates (0, 0), "2" digit—occupies the $2^{nd}$ position along the graphical path with coordinates (9, 9), "3" digit—occupies the $3^{rd}$ position along the graphical path with coordinates (8, 8), "4" digit—occupies the $4^{th}$ position along the graphical path with coordinates (7, 7), "5" digit—occupies the $5^{th}$ position along the graphical path with coordinates (6, 6), "6" digit—occupies the $6^{th}$ position along the graphical path with coordinates (5, 5), "7" digit—occupies the $7^{th}$ position along the graphical path with coordinates (4, 5), "8" digit—occupies the $8^{th}$ position along the graphical path with coordinates (3, 5), "9" digit—occupies the $9^{th}$ position along the graphical path with coordinates (2, 5), "0" digit—occupies the $10^{th}$ position along the graphical path with coordinates (1, 5). One time authentication challenge OTAC 5020 displayed on the user 4090 personal mobile phone 5010 and in this particular embodiment in FIG. 14A is "5 3 2 8 0 6".

These digits point to specific field positions of the session authentication credential SAC (a full graphical path digitized at each field along the path, which is highlighted as shadowed numbered fields in drop-down grid 14020) to be fulfilled in the one time authentication response OTAR entered into sub-field 12030. This particular embodiment in GUI 14010 presents three fields (having two sub-fields each) corresponding to three groups of digits in the OTAC 5020—"5 3" is a random subset of the full graphical path consecutive field positions highlighted by shadowed fields SAC to be entered into the first field, "2 8" is a random subset of the full graphical path consecutive field positions highlighted by shadowed fields SAC to be entered into the second field, and "0 6" is a random subset of the full graphical path consecutive field positions highlighted by shadowed fields SAC to be entered into the third field. The user then instantiates drop-down grids by indicating sub-fields 12040. The number of fields from which the drop-down grids can be instantiated at any given session can be fixed or random within a certain range depending on the system administrator set security parameters. The same is true for a number of digits in groups of digits in OTAC 5020 related to each particular field—the administrator can set it to either fixed or varying within a certain range for all the fields at any given authentication session.

Drop-down grid 14020 instantiated from the first field shown in a particular embodiment of GUI 14010 in FIG. 14A highlights the SAC with field 5 position along the full graphical path in coordinates (6, 6), and field 3 position along the full graphical path in coordinates (8, 8). The user, consecutively clicking on these fields in the grid according to the OTAC 5020 and entering these pairs of coordinates, but in sub-field 12030 they are veiled as echo dots.

There are two options of SAP appearance when drop-down grids are instantiated in the second and third fields in the particular embodiment of FIG. 14A. In the case of the first option, the SAC for the first field also appears at each field, from which a drop-down grid is instantiated. Considering this option, for the second field from which the drop-down grid is instantiated, the user enters fields "2 8" of the SAP in grid 14020 in coordinates (9, 9) and (3, 5). Accordingly, for the third field, from which the drop-down grid is instantiated, the user enters fields "0 6" of the SAC in grid 14020 in coordinates (0, 0) and (5, 5).

In the case of the second option, different SAP is generated by server 1030 for each field of OTAR within the same authentication session and for the same OTAC. Considering this option, for the second field from which the drop-down grid is instantiated, the SAP, for instance, is the same as in FIG. 10I. Then, the user enters fields "2 8" of the SAC in grid 14020 in coordinates (2, 7) and (8, 8). For the third field from which the drop-down grid is instantiated, the SAP, for instance, is the same as in FIG. 11K. Then, the user enters fields "0 6" of the SAC in grid 14020 in coordinates (8, 3) and (4, 7). Certainly, a particular option is selected and set by the system administrator considering authentication factor security, while the first option would be the preferred embodiment of this invention.

Then, user 4090 indicates LOGIN button 3020 to send the authentication response to server which would compare the one time authentication response OTAR with the expected authentication response and then signal a successful or failed authentication result in a similar way as in FIGS. 12 and 13. Stoplight 4020 and session elapsed time clock 4020 in FIG. 14A function identical to the previous cases.

Figure 14B:
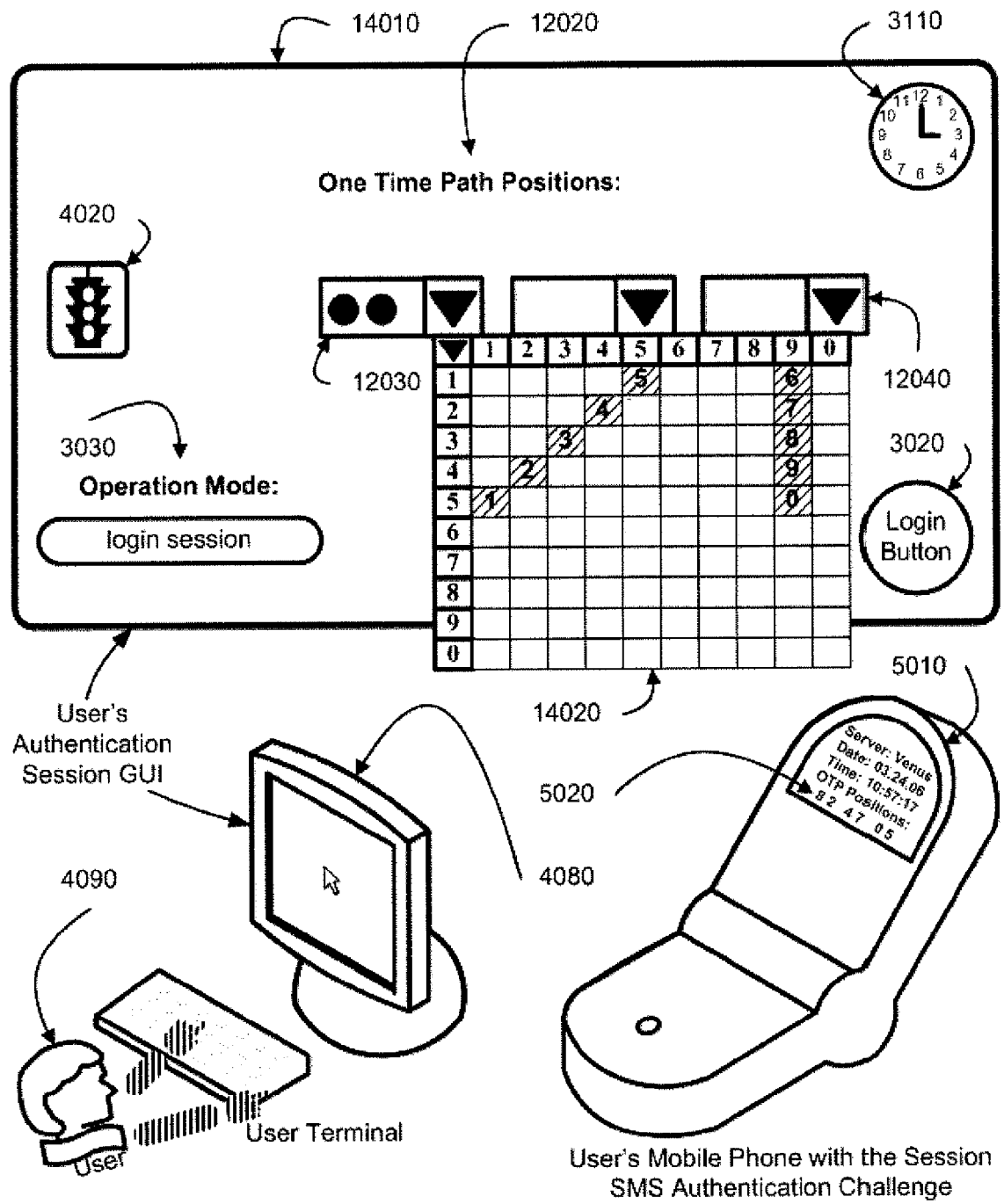
FIG. 14B illustrates a graphical user interface supporting the login process at the random partial digitized path data entry state with session only valid personalized graphical path highlighted on the virtual drop-down grid depicted by digits and shadowed grid fields along the path, and session only valid authentication challenge displayed as a SMS text message at user's mobile communication device, used in another example of an authentication program according to the present invention.

FIG. 14B is identical to FIG. 14A RPDPR in its authentication login session with two-channel split between a one time authentication challenge OTAC and a one time authentication response OTAR, and a session authentication credential SAC (a one time session-only random graphical path) on user's terminal 4080 highlighted with a full graphical path digitized at each field along the path of shadowed fields on two-dimensional drop-down grid 14020. The only difference is that it represents another example of OTAC, SAP, and OTAR. In this particular example, one time authentication challenge OTAC 5020 displayed on mobile phone 5010 is "8 2 4 7 0 5", whereas session authentication credential SAC highlighted in drop-down two-dimensional grid 14020 is: "1" digit—occupies the $1^{st}$ position along the graphical path with coordinates (1, 5), "2" digit—occupies the $2^{nd}$ position along the graphical path with coordinates (2, 4), "3" digit—occupies the $3^{rd}$ position along the graphical path with coordinates (3, 3), "4" digit—occupies the $4^{th}$ position along the graphical path with coordinates (4, 2), "5" digit—occupies the $5^{th}$ position along the graphical path with coordinates (5, 1), "6" digit—occupies the $6^{th}$ position along the graphical path with coordinates (9, 1), "7" digit—occupies the $7^{th}$ position along the graphical path with coordinates (9, 2), "8" digit—occupies the $8^{th}$ position along the graphical path with coordinates (9, 3), "9" digit—occupies the $9^{th}$ position along the graphical path with coordinates (9, 4), "0" digit—occupies the $10^{th}$ position along the graphical path with coordinates (9, 5).

Following the RPDPR protocol step 8060 (FIG. 8) of generating a one time authentication response OTAR, in this particular case, user 4090 performs several simple tasks of selecting and clicking on appropriate fields from the SAC (highlighted in grid 14020 one time session-only random graphical path) and entering pairs of coordinates corresponding to OTAC 5020 into sub-field 12030 as echo dots, (9, 3) (2, 4)—in the first field in FIG. 14B, (4, 2) (9, 2)—in the second field, and (9, 5) (5, 1)—in the third field; which altogether constitute the one time authentication response OTAR for shown in FIG. 14B as a particular one time authentication challenge OTAC and session authentication credential SAC.

Several security aspects of RPDPR authentication factor with two-channel split between OTAC and OTAR, and server generated SAC is discussed below. For example, let's review the shared secret full graphical digitized path shown in FIG. 14A on grid 14020. OTAC 5020 is "5 3 2 8 0 6". In this case, the security parameters chosen by the system administrator are: the number of digits indicating a random subset of field positions from the ordered set of all shadowed field positions on the full graphical digitized path at each field the drop-down grid is instantiated from, and the number of such fields in one authentication session. The fewer digits contained in a one time authentication challenge OTAC, the lower is the path entropy leakage per session. However, the probability to guess RPDPR session-specific one time authentication response OTAR is higher. Hence, the administrator is the one to reconcile these opposite security trends in order to optimize the security strategy when choosing the security parameters. Typically, one-two digits (field position indicators) in a challenge at each field the grid is instantiated from (two digits are chosen by the system administrator in FIG. 14A), as well as two-three of such fields in the OTAC (three fields are chosen by the system administrator in FIG. 14A) would be a good compromise. In comparing to password or PIN, there are three key advantages to using graphical path in the RPSSR system:

Graphical path recall is easier than remembering textual password (several studies had proved this)

Table 1B shown in FIG. 26 contains calculated combinatorial capacities to guess one or more OTAR field positions on a 10 by 10 grid in a non-SAC case (FIG. 13) and SAC case (FIG. 14A and FIG. 14B). The table also presents OTAR combinatorial capacities and guessing probabilities in a case insensitive alphanumeric character or special mark in a SAC case of 9 depicted by a directed line cells (FIG. 6A, 6B). It is important to note here that OTAC can have any position repeated from one time to the maximum number of positions in a password (or PIN) or path. Comparing Table 1A (FIG. 25) and Table 1B (FIG. 26), the following conclusions could be derived:

In the non-SAC case, RPDPR OTAR combinatorial capacity per field is higher compared to RPPPR case—from ~1.4 times, for one OTAC position, to ~8.5 times for six positions (if considering letter case sensitivity; otherwise, it is from ~2.3 times to ~138 times higher respectively). It mirrors the fact that there are 100 fields on a 10 by 10 grid 12060 FIG. 12 to choose from compare to 44 characters and special marks (or 70, if considering letter case sensitivity) in 2D drop-down grid-like menu 4070 FIG. 4A In the SAC case, RPDPR OTAR combinatorial capacity per field is higher compare to RPPPR case—from ~1.1 times, for one OTAC position, to ~1.9 times for six positions (no letter case sensitivity here—SAC can include by design only small case letters). It mirrors the fact that there is always a 10 field SAC on a 10 by 10 grid 12060 (FIG. 13A and FIG. 13B) to choose from compare to 9 characters and special marks SAC in 2D drop-down grid-like menu 4070 (FIG. 6A and FIG. 6B).

Entropy leakage from a graphical digitized path technique can be reduced to less than that of a password in RPSSR-based authentication systems by: (1) having the number of fields in the entire full graphical digitized path higher than the number of characters in a password and (2) reducing the number of digits (field position indicators) in a session-specific authentication challenge. In this case, the entropy leakage that results from entering a random subset of a full graphical path can be much lower than the entropy leakage that results from entering the digits (password character position indicators) in a random subset of the entire password.

Random Partial Pattern Recognition (RPPR) Authentication Factor

Figure 15:
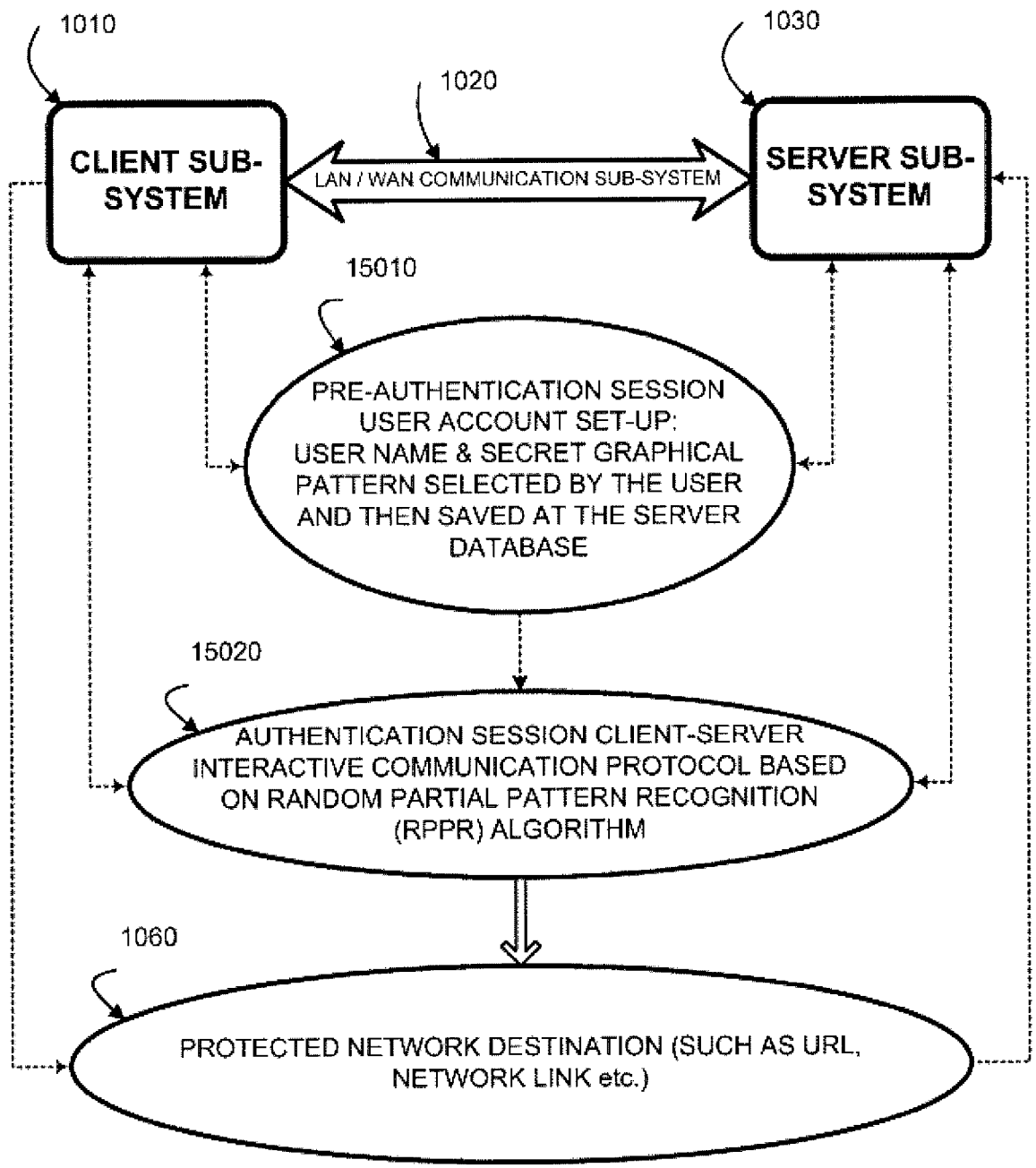
FIG. 15 illustrates client-server architecture for implementation of a user authentication process based on RPPR algorithm according to the present invention.

FIG. 15 illustrates a basic communication set up for RPPR authentication processes according to the present invention. Client subsystem 1010 communicates by communication media, such as local area network or wide area network communications subsystem 1020, with server subsystem 1030. Protected network destination 1060 controls access to resources such as secure web sites identified by URLs, links to secure networks, etc.

To set up access, pre-authentication session 15010 is executed by client subsystem 1010 and server subsystem 1030. In pre-authentication session 15010, a user account is set up in server subsystem 1030, the user name and a secret pattern that includes an ordered data set of data fields is selected by the user and stored in server subsystem 1030. In the ordered data set, the data fields have a position in the data set and have respective field contents. For RPPR, the field contents are related by a cognitive function of their respective positions in the data set. The user account information, user name and ordered data set of data fields for a first authentication factor are stored in a secure server database. In strong authentication embodiments, at least one additional parametrically independent data set for a second authentication factor is included in the database for the user accounts.

To gain access to protected network destination 1060, client subsystem 1010 and server subsystem 1030 execute authentication session 15020 that includes a client-server interactive communication protocol based on RPPR. A more detailed description of an embodiment of authentication session 15020 is provided with reference to FIG. 16.

According to one basic flow, an authentication session is initiated when the user tries to reach a protected network destination (block 16010). The protected network destination redirects the user's attempted access to the authentication server, or the attempted access is otherwise detected at authentication server 1030. In one example, where the user is attempting access using an Internet browser, a communication interface is returned to the user's browser including a graphical user interface with links to authentication server 1030 (block 16020). The communication interface may be returned through redirection, for example, by the authentication server or another network resource. Via the graphical user interface, the server prompts the user to enter a user name into a field in the graphical user interface (block 16030). The user enters the user name, which is returned to the authentication server (block 16040). If the user name is valid, then the authentication server generates a random subset of ordered pattern fields' position numbers and requests the user to fulfill the respective fields through the GUI (block 16050). The user inputs data for the field contents in the identified fields, and the input data are returned to the server (block 16060). If the input data matches the field contents for the random subset, then successful authentication is signaled to the user via, for example, the graphical user interface. Also, it is signaled to the protected network destination and/or signaled to other resources, such as authorization and accounting systems that need to know that the authentication session has succeeded, and network connection to the requested protected network destination is allowed (block 16070).

Figure 17:
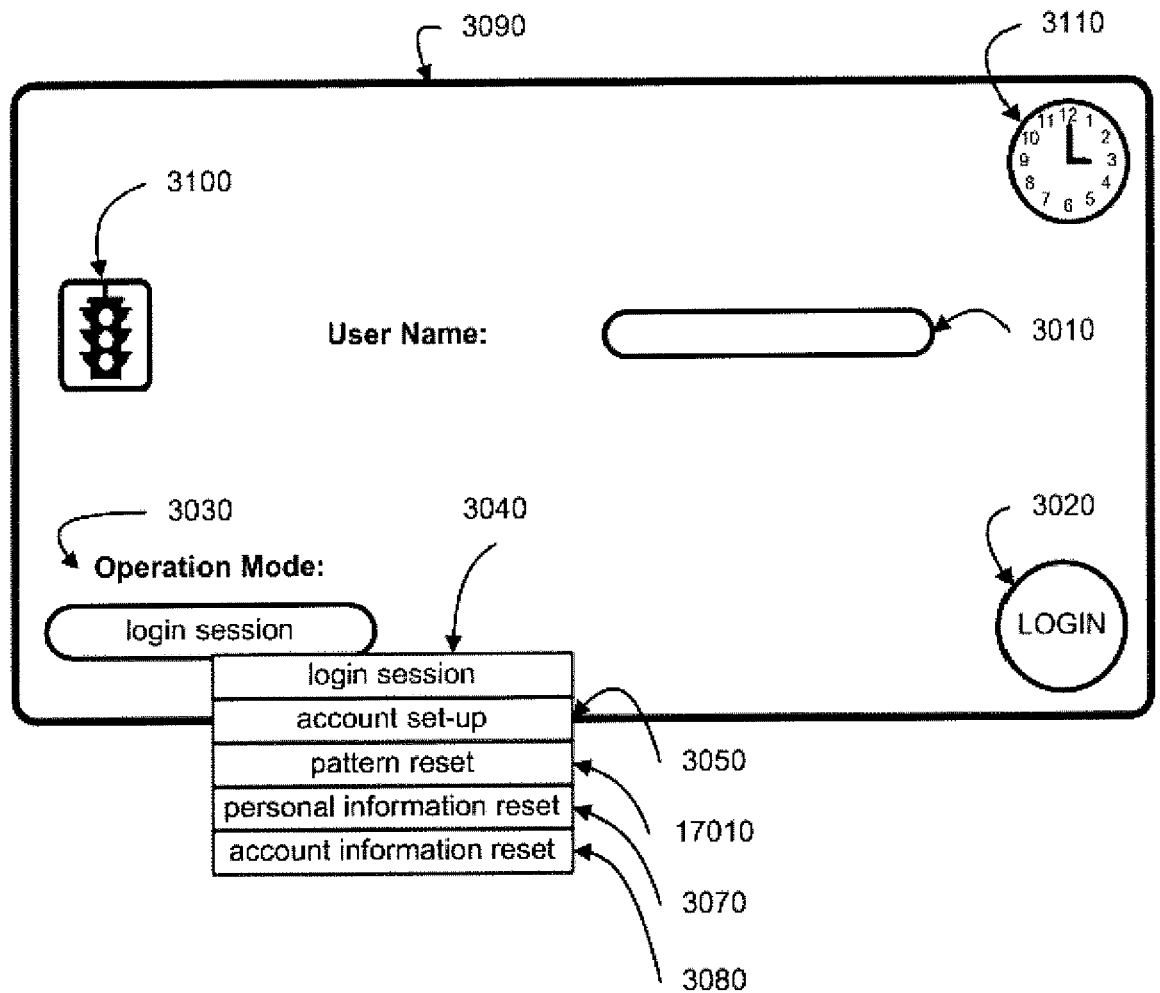
FIG. 17 illustrates a graphical user interface supporting the variety of RPPR operation modes, and particularly, the login process at the user name entry state used in one example of an authentication program according to the present invention.

FIGS. 17, 3B, and 3C illustrate input constructs based on graphical user interfaces presented using Web browsers or user's laptop or desktop screen for a login and authentication session. FIG. 17 illustrates an opening screen 3090 which is presented to the user at the beginning of an RPPR authentication session. In the opening screen 3090, data entry field 3010 is used for entry of a user name. Login button 3020 is indicated to initiate processing of field data and to start a login process.

Operation mode menu 3030 is included, and when it is indicated, it creates a drop-down menu of operation mode buttons, including login session operation mode button 3040, account set up operation mode button 3050, pattern reset operation mode button 17010, user personal information reset button 3070, and user account information reset button 3080. Stoplight icon 3100 is included in screen 3090. Stoplight icon 3100 color is red before the user name is entered (either by indicating LOGIN button 3020, or hitting the "Enter" key on the user's keyboard), it turns yellow during client-server communications while the client is waiting for verification of the user name, and it turns green when the user name is accepted. Also included in screen 3090 is session timer icon 3110 indicating session elapsed time for the login session. A system administrator can set parameters in the server that terminate the login process or any other operation mode session selected by user in menu 3030 if the timer expires (session time can have different time limits for various operation modes), or otherwise react to timer expiry. FIG. 3B and FIG. 3C illustrate the same functionality for RPPR authentication factor as described above for both RPPPR and RPDPR authentication factors, presenting RPPR login session beginning with a user name only in FIG. 3B, or two-factor authentication ("strong" authentication) scheme including password (or PIN) as the first authentication factor (User Name and Password (or PIN) are entered into GUI in FIG. 3C) and PPPR as the second authentication factor.

Figure 18:
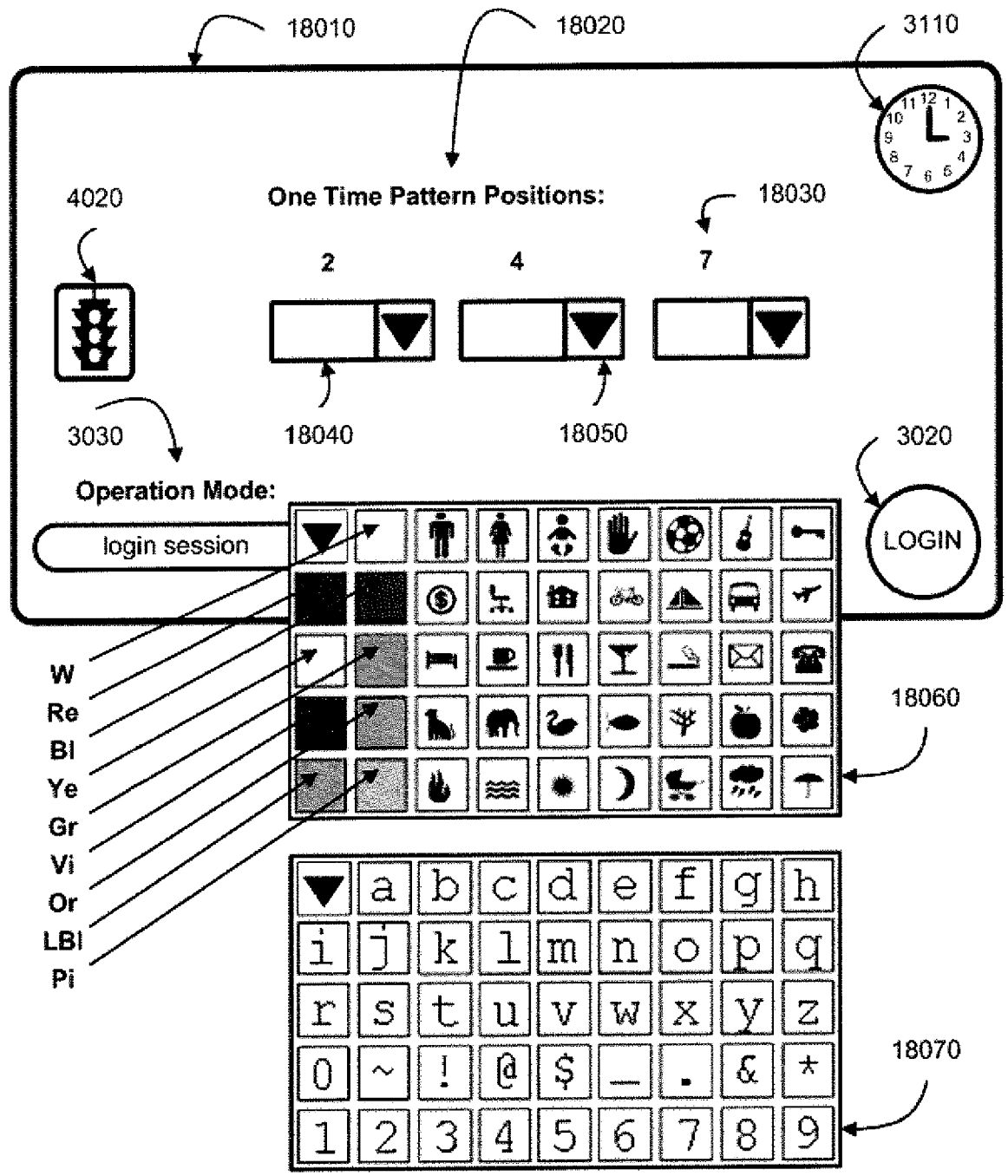
FIG. 18 illustrates a graphical user interface supporting the login process with a drop-down two-dimensional alphanumeric character and special mark menu and a drop-down two-dimensional color and image menu, at the random partial pattern data entry state used in one example of an authentication program according to the present invention.

FIG. 18 illustrates input constructs based on graphical user interfaces presented using Web browsers or user's laptop or desktop screen for a login and authentication session based on RPPR. FIG. 18 illustrates screen 18010 which is presented to the user after the user name (or user name and password (or PIN) in a two-factor "strong" authentication case) was successfully recognized by the authentication server 1030 (FIG. 15) at the beginning of login sessions in FIG. 3B or FIG. 3C. Data entry sub-fields (e.g. 18040 and 18050) are presented for a pattern comprising a corresponding number of fields which will constitute the random subset of the data field positions that define the full pattern stored for the user. In this example, the random subset of full pattern field positions (titled "One Time Pattern Positions:" 18020) is presented to the user by field numbers (e.g. 18030) corresponding to positions in the data set, including field number 2, field number 4, and field number 7 out of an ordered set of 9 data fields In this embodiment, two-dimensional alphanumeric character and special mark drop-down menu 18070 can be invoked by indicating into data entry sub-fields 18040, whereas two-dimensional color and background image drop-down menu 18060 can be invoked by indicating into data entry sub-fields 18050 marked with a triangle sign. Both menus have the same architecture and operations:

Five rows and nine columns.
Upper row leftmost cell with a triangle sign allows for:
Closing the menu by clicking the left mouse button over this cell or outside of the menu.
Deleting entry data in subfields 18040 or 18050 by clicking right mouse button over it.
Cell contents in both menus are fixed and do not change at various menu instantiations.

By indicating sub-field 18050, drop-down menu 18060 of candidate color and image icons is displayed and used as a data entry tool for entry of the field contents for the ordered set of data fields. In this example, drop-down menu 18060 includes a set of candidate colors, implemented as background colors in the first two columns of menu 18060 (except for the triangle sign icon used for closing the menu), and a set of candidate image icons in the last seven columns of menu 18060. The colors in this embodiment include W-white, Bl-blue, Gr-green, Or-orange, Pi-pink, LBl-light blue, Vi-violet, Ye-yellow, and Re-red. The user enters alphanumeric characters in sub-fields 18040 by placing the caret inside the sub-fields and using a keyboard, or by opening menu 18070 by clicking a left mouse button inside the sub-menu and clicking over cell content(s) of interest to enter alphanumeric character(s) and/or special mark(s) (capital letters can be entered by pressing on the Ctrl key in the keyboard and simultaneously clicking on the letter of interest). The user may select an image icon and a background color in second sub-field 18050 as part of the field contents by moving a mouse or another input device over menu 18060. In this example, the random subset includes three fields. However, other numbers of fields may be used. Also, the number of RPPR fields is a security parameter set by the system administrator and may be either fixed or varied from session to session within a certain range for added security.

Login button 3020 is indicated to initiate processing of field data and to start the login process. Stoplight icon 4020 is included in screen 18010. It turns red before data has been entered into data fields or before login button 3020 in FIG. 18 is indicated. Stoplight icon 4020 turns yellow during client-server communications and before acceptance of the input data representing field contents. Stoplight icon 4020 turns green to signal successful authentication. Also included in the screen is session timer icon 3110 indicating elapsed time for the login session. A system administrator can set parameters in the server that cause reset of the login process if the timer expires or otherwise react to timer expiry.

The RPPR algorithm is based on a random subset of data field positions from a full data set where the field contents in some embodiments represent a pattern that is a function of position in the data set to help facilitate user memorization. Naturally, any pattern of field contents may be used including purely random field contents, provided the client is able to recall the field contents for the random subset of the full pattern during login, as may be the case for authentication of hardware devices. A random subset that is usually less than the full ordered set is requested by the server from a client during each login/access session.

FIGS. 19A-19D illustrate several methods for building patterns based on cognitive functions of position in the ordered set of data fields, which are easy to remember and operate.

Figure 19A:
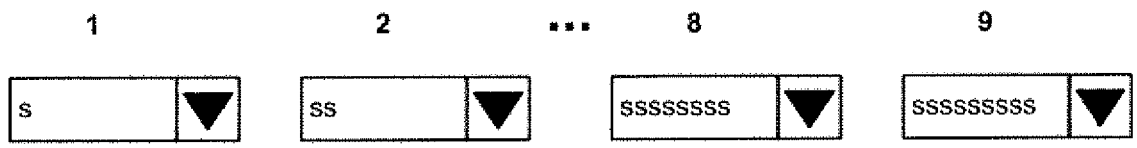
FIGS. 19A-19D illustrate an "object repetition method", "conditional key method", "field compliant method", and "even-odd method" for pattern generation according to a cognitive function of position in an ordered set of data fields.

FIG. 19A illustrates the basic Object Repetition Method (ORM). In the illustrated example, the field contains a single character "s" which is repeated for a number of times based on the field number within the ordered set. Thus, the field contents of data field 1 is "s", the field contents of data field 2 is "ss", and so on until the field content of data field 9 consists of "sssssssss". More elaborated ORM patterns may be made in this manner.

Figure 19B:
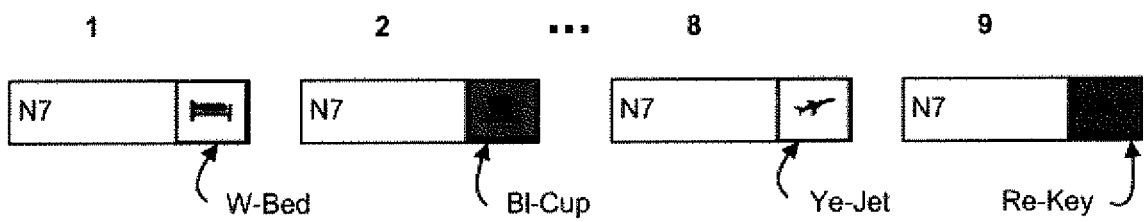

Another method is named as the Conditional Key Method (CKM), and it is illustrated in FIG. 19B. According to the CKM example in FIG. 19B, alphanumeric characters "N7" are entered into every data field in the pattern, and a graphical icon and a background color are selected according to a simple graphical path in menu 18060 FIG. 18. Referring also to FIG. 19B, the pattern begins in data field 1 with the Bed image icon and the White background. Data field 2 is the Cup with the Blue background. Data field 3 (not shown) is the Utensil image icon with the Green background. Data field 4 is the Wine Glass image icon with the Orange background. Data field 5 is the Cigarette icon with the Pink background. Data field 6 is the Envelope image icon with the Light Blue background. Data field 7 is the Telephone image icon with the Violet background. Data field 8 is the Jet image icon with the Yellow background. Data field 9 is the Key image icon with the Red background. In this example, image icons are selected by traversing the row that begins with the bed icon to the right, and proceeding at the end of the row up the last column in the set of candidate image icons in a counter-clockwise direction. The background colors are also selected by following another simple graphical path in menu 18060 FIG. 18—the candidate background colors proceed down the column that begins with the white background color to the bottom of the column and then up the column of background colors in a clockwise direction, creating a cognitive function of position in the ordered set that is easy to remember. Other CKM codes can be designed in a similar fashion.

Figure 19C:
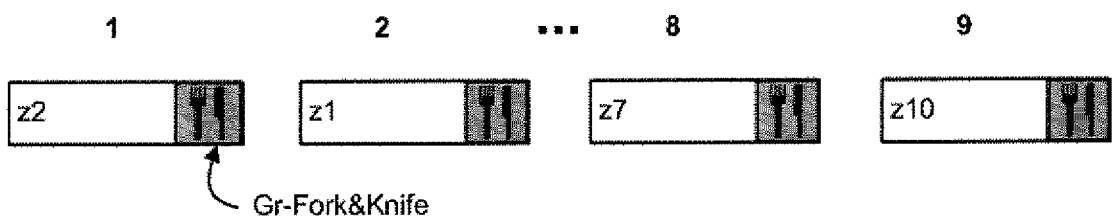

FIG. 19C illustrates the basic even-odd method (EOM) of defining field contents for an ordered set of data fields according to a cognitive function of position in the ordered set. According to the EOM, the field contents for odd-numbered fields consists of the letter "z" and any number equal to the field number plus 1. For even-numbered fields, the field contents consist of the letter "z" and a number equal to the field number minus 1. Thus, the field content for data field 1 is z2. In data field 2, the field content is z1. The pattern repeats so that the field content in data field 8 is z7. In data field 9, the field content is z10. In this particular example, for additional security complimentary to EOM implemented in sub-fields 18040, all sub-fields 18050 contain the Utensil image icon with the Green background. According to one even-odd method, the user selects two secret algorithm meters—one for even fields and another one for odd fields.

Figure 19D:
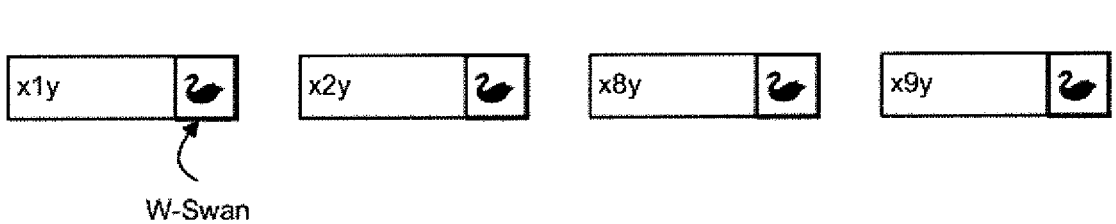

FIG. 19D illustrates the basic Field Compliant Method (FCM) for assigning a cognitive function of position in the development of the field contents for the ordered set of data fields which constitutes the authentication codes. This can be seen in FIG. 19D, where the field contents for the data fields consist of x(N)y with the black Swan image icon on the White background. The parameter in parentheses (N) represents the field number. Thus, data field 1 includes the field contents x1y-White Swan. Data field 2 includes the field contents x2y-White Swan. The pattern repeats so that data field 8 includes the field contents x8y-White Swan and the data field 9 includes the field contents x9y-White Swan.

Basically, FCM is based on selecting an object consisting of any combination of characters, colors and/or images to be a root object for all fields. Field contents are completed by embedding into this object a meter, changing in a strict correspondence to the field sequential number according to a certain secret algorithm.

Figure 16:
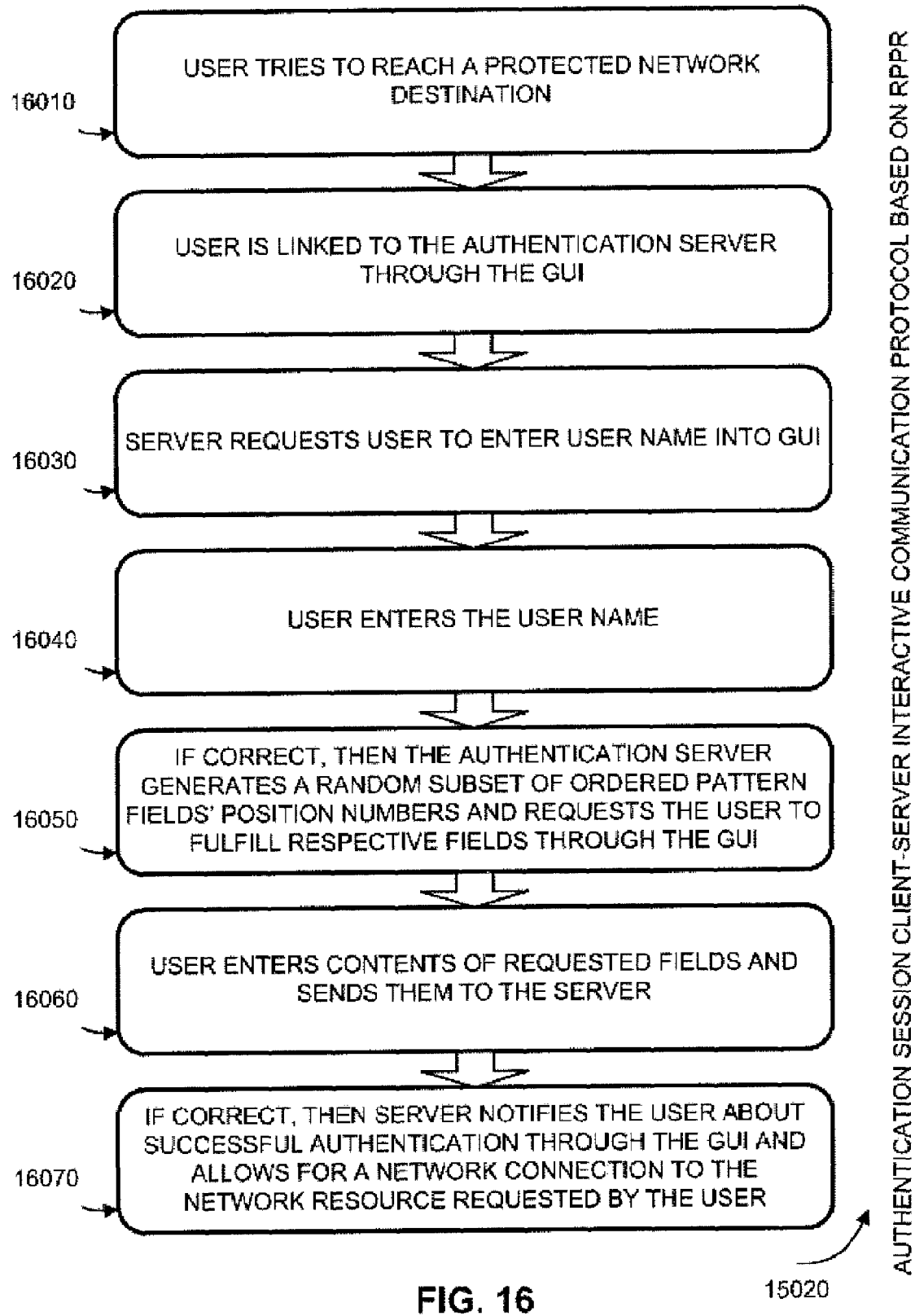
FIG. 16 is a flowchart of a basic random partial pattern recognition RPPR authentication session according to the present invention.

Pattern as a shared secret in RPPR protocol in FIG. 16 is an ordered set of fields (Field 1, Field 2, . . . , Field 8, Field 9) containing certain contents. Each field (see FIG. 18) has two parts: "character and special mark" sub-field 18040 and abutted to it "color and image" sub-field. Similar architecture 2D (two-dimensional) static drop-down menus—"character and special mark" menu 18070, and "color and image" menu 18060—can be instantiated by a mouse click over a respective sub-field or by a certain operation with a key board. Each of the 2D drop-down menus has a fixed set of cells containing either characters and special marks (one character or special mark per cell) or background color and image cells (one color and/or one image per cell). Hence, each field of a pattern may contain any number of alphanumeric characters or special marks and/or one image and/or one background color which can be selected in the respective 2D drop-down menus by a mouse click over a respective cell or by navigating inside the menus, and selecting a chosen cell with a keyboard. The only limitation is that each field of a pattern must contain at least one of the objects: a character (or a special mark), a background color, and an image icon. Examples of various patterns are shown in FIGS. 19A-19D. Users are free to choose any allowable pattern during account setup or credential reset sessions, but it is preferable to choose the ones with easy to recall graphical paths on the 2D drop-down menus. This makes patterns as easy to use as paths. Users wouldn't have to remember the content of each pattern field; they could just recall the graphical path on the 2D drop-down menu and move along the path selecting the cell which position corresponds to the field position indicator. Assuming that the pattern is built using the second from the top horizontal row as a path from left to right on the "character and special mark" menu 18070 (FIG. 18) and the third from the top horizontal row as a path from left to right on the "ecolor and image" menu 18060 (FIG. 18), the full pattern would be: Field 1: i Yellow; Field 2: j Green; Field 3: k Bed; Field 4: l Cup; Field 5: m Utensil; Field 6: n Wine Glass; Field 7: o Cigar; Field 8: p Envelope; Field 9: q Telephone. Then, one time authentication challenge OTAC 18030 "2 4 7" in FIG. 18 requesting a user to enter a random subset of the full pattern would correspond to entering the respective contents into Fields 2, 4, and 7 as the one time authentication response OTAR: Field 2: j Green; Field 4: l Cup; and Field 7: o Cigar. The security parameter chosen by the system administrator in this case is a number of digits indicating a random subset of field positions from the ordered set of all field contents on the pattern in a session's one time authentication challenge OTAC. The fewer digits are in a challenge, the lower is the pattern entropy leakage per session. However, the probability to guess RPPR authentication response is higher. Hence, the administrator is the one to reconcile these opposite security trends in order to optimize the security strategy when choosing the security parameters. Typically, two or three digits (field position indicators) in the one time authentication challenge OTAC would be a good compromise. If applied to pattern vs. path differences in RPSSR-based authentication system, the results of analysis are:

A pattern recall, with the 2D drop-down grid-like static menus, follows the method similar to a path recall. Both methods are much easier, than remembering textual passwords (except the RPPPR case in FIG. 5). In this regard, pattern has no preference over path Table 2 shown in FIG. 27 present one RPPR field combinatorial capacity with respect to a number of objects (object types are: CO—a color, IM—an image, CR—a character or a special mark) entered into a field. It is assumed that letters in drop-down menu 18070 FIG. 18 have a letter case sensitivity (Click over the letter in menu 18070 and simultaneously press the Ctrl key to achieve a capital size letter).

Let's compare Table 2 (FIG. 27) results to one RPDPR sub-field 12030 FIG. 12 combinatorial capacity with respect to the number of grid 12060 FIG. 12 field locations entered (veiled by random digit contents in the fields 12060). It is assumed, that every field location is an object that can be entered more than once along the full graphical path on grid 12060 and there is one chance per hundred at any time to guess a path's field location on 10 by 10 grid 12060. Then, the ratios of RPPR/RPDPR combinatorial capacities in one field with respect to a number of objects entered are: 1 object— 1.14, 2 objects—0.829, 3 objects—0.581, 4 objects—0.406, 5 objects—0.285. Clearly, RPPR combinatorial capacity per one field gets lower compare to one RPDPR field with growing number of objects per field, though for one object per field RPPR combinatorial capacity is slightly higher compare to RPDPR. The further analysis revealed the following:

The data in table 3 in FIG. 28 present RPPR combinatorial capacity of a one time authentication response OTAR vs. number of field positions in a one time authentication challenge OTAC, and with respect to a number of objects per field.

The data in table 4 shown in FIG. 29 present RPDPR combinatorial capacity of a one time authentication response OTAR vs. number of fields, from which the reference grids are instantiated, and objects per field in a one time authentication challenge OTAC.

Table 5 shown in FIG. 30 is derived from data presented in table 3 (FIG. 28) and table 4 (FIG. 29). It introduces the RPPR/RPDPR ratios of combinatorial capacities with respect to a number of fields, and objects per field. Similar to data presented above for one field, the RPPR combinatorial capacity per several fields gets lower compared to the RPDPR combinatorial capacity of the same number of RPDPR fields with increased number of fields and objects per field. Only in the case of one object per field, the RPPR combinatorial capacity is actually slightly growing compare to the RPDPR combinatorial capacity with increased number of fields.

It is apparent from table 5 shown in FIG. 30, that path authentication factor has higher combinatorial capacity than pattern (except the case of one object per field) given the same number of fields and objects per field in a one time authentication response OTAR.

Figure 20:
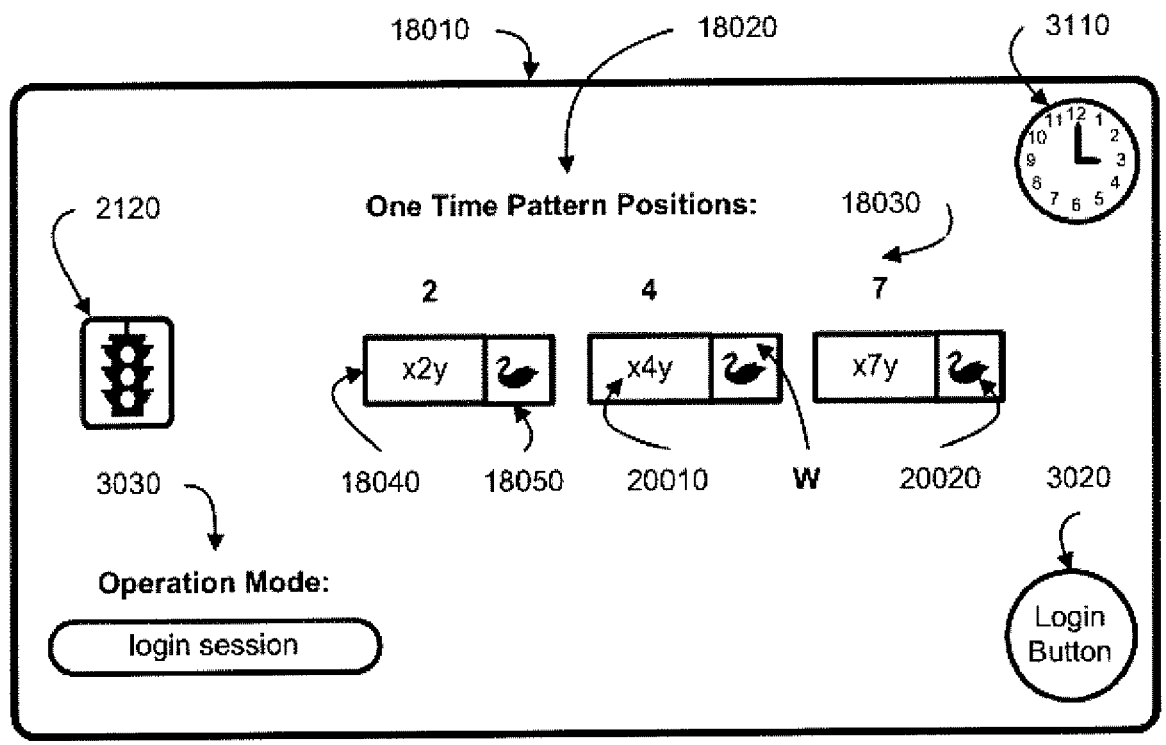
FIG. 20 illustrates a graphical user interface supporting the login process at the random partial pattern data entered state used in one example of an authentication program according to the present invention.

FIG. 20 illustrates the next screen 18010 presented to the user during the RPPR authentication session right after either of the two cases below: The user entered her user name in field 3010 FIG. 3B, pressed login button 3020 in screen 3090 FIG. 3B, and it was successfully verified by server 1030 FIG. 15 (stoplight 3100 FIG. 3B turns green). Otherwise, the error message informs the user that the user name entered is incorrect and should be reentered. The user entered her user name in field 3010 FIG. 3C and her password in field 3120 (the beginning of a two-factor authentication session), pressed login button 3020 in screen 3090 FIG. 3C, and the first authentication factor (the password (or PIN)) was successfully verified by server 1030 FIG. 15 (stoplight 3100 FIG. 3B turns green). Otherwise, the error message informs the user that either all the data, or the user name, or the password entered are incorrect and should be reentered.

In FIG. 20, the user has entered alphanumeric characters in the fields (e.g. 18040) and an image icon (Swan) with background color (White) in the field 18050 (the background color is indicated by the label "W" beneath the field in the drawing, but appears as the color of the background for the image icon, which is black, in field 18050 in preferred embodiments). Other ways to include color in the field contents include providing a background color for field 18050, a color for the image icons, a color for the alphanumeric characters, and so on. A simple pattern which is a cognitive function of position in the data set is illustrated in this example, where the field contents for the data fields in the data set include the alphanumeric characters x(N)y, where (N) is a digit representing a field position in the data set, and the black Swan image icon on the White background.

The random subset "2 4 7" of pattern field positions 18030 FIG. 20 titled as "One Time Pattern Positions:" 18020 represent a one time authentication challenge OTAC. The user enters the input data representing field contents into sub-fields 18040 and 18050 for a one time authentication response OTAR, and indicates login button 3020 to initiate communication with server 1030 FIG. 15. Stoplight 2120 is red during the data entry process in sub-fields 18040 and 18050, it turns yellow while the data are in transit or processed at server 1030 FIG. 15, and it turns green signaling successful authentication event, or it turns back to red color if the authentication request is failed. In summary, the key advantages of the RPPR authentication factor compare to password are:

The RPPR patterns have much higher combinatorial capacities preventing better than passwords from computer-processed guessing attacks (see table 2 (FIG. 27) and table 3 (FIG. 28))

The RPPR patterns have lesser entropy leakage per an authentication session than passwords because server 1030 in FIG. 15 never requests entering the entire pattern, preventing a quick loss of an authentication credential over a couple of authentication sessions.

Two-Channel Challenge-Response RPPR Authentication Factor

Figure 21:
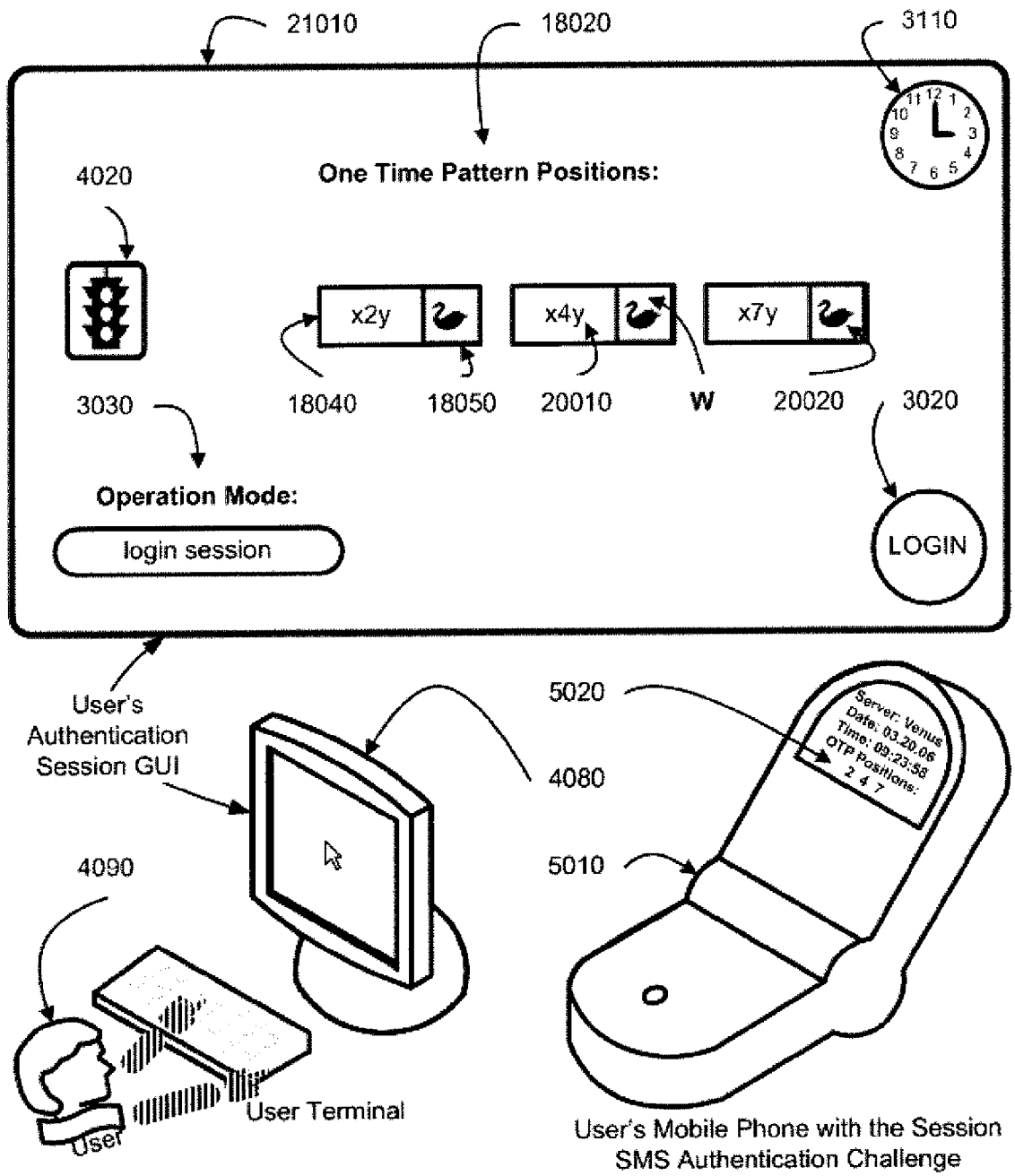
FIG. 21 illustrates a graphical user interface supporting the login process at the random partial pattern data entry state while the authentication challenge arrives as a SMS text message to user's mobile communication device used in one example of an authentication program according to the present invention.

FIG. 21 illustrates the same login session with the RPPR authentication factor as in FIG. 20, but the only difference is that one time authentication challenge OTAC 18030 FIG. 20 is delivered to user's 4090 personal mobile communication device 5010 rather than GUI 21010. This splits OTAC, generated by server 1030 (FIG. 15) and delivered with Short Message Service (SMS) 24010, 24020 FIG. 24 text message 5020 displayed on user's 4090 personal mobile communication device 5010, and a one time authentication response OTAR generated by user 4090 in GUI 21010 in the browser or on a screen of user's terminal 4080, where graphical construct 18040, 18050, 18060, 18070, and 3020 to enter and send OTAR to the server is presented.

Such a two-channel split between OTAC and OTAR makes it more difficult for an intruder to reengineer user's credential—it would require more sessions with recorded OTAR to assure that all characters and special marks, colors and images in the credential are already gathered, and it will be more difficult to analyze the eventual credential form. Altogether, it farther reduces credential entropy leakage while enhancing the RPPR authentication credential security against various attacks. Indeed, let's consider, for example, the graphical pattern in FIG. 19C, and assume there are two fields at each authentication session (two digits OTAC). Then, in the case of no channel split between OTAC and OTAR, it could take only five authentication sessions in the worst case scenario performance of the algorithm generating OTAC to expose and let the intruder record all nine field contents in FIG. 19C along with consecutive position numbers along the pattern. However, in the case of a two-channel split between OTAC and OTAR, the intruder would know only all contents of the fields comprising the pattern but not the actual field position associated with a specific content, because the pattern's field positions information is not available for the record due to a two-channel split between OTAC and OTAR. Now, the intruder is to guess further the actual pattern order of fields having the specific contents. It is at least 72 possibilities in the example above, unless the intruder figured out the ordering algorithm in FIG. 19C. Clearly, the entropy leakage of the credential per authentication session is lower in the case of a two-channel split between OTAC and OTAR. Having more intelligent field content ordering algorithm in a graphical pattern, would further reduce a credential entropy leakage per authentication session.

Session Authentication Credential in RPPR with Two-Channel Challenge-Response

Figure 22A:
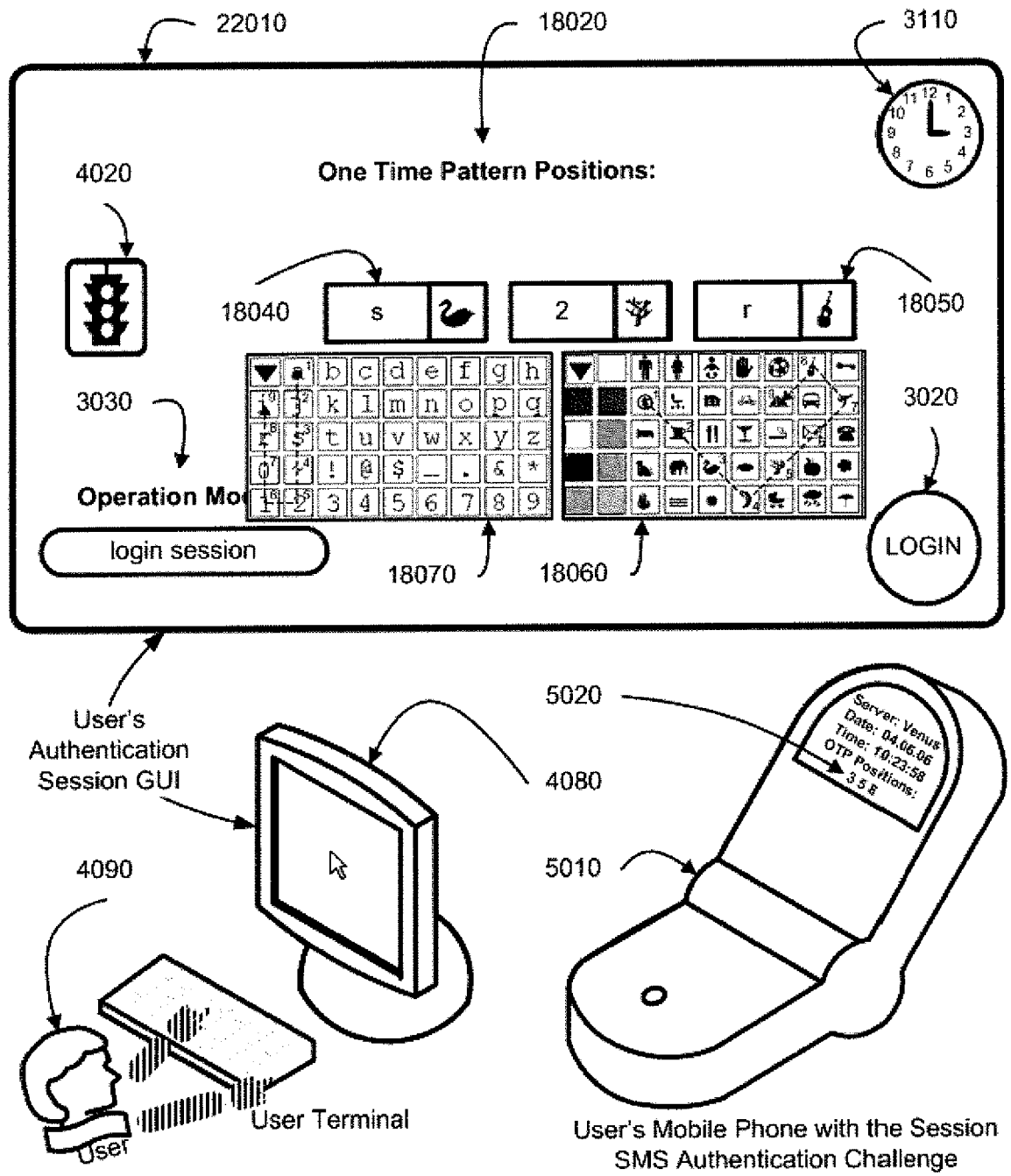
FIG. 22A illustrates a graphical user interface supporting the login process at the random partial pattern data entry state with session only valid personalized graphical pattern contents depicted on the virtual two-dimensional drop-down menu grids, and session only valid authentication challenge displayed as a SMS text message at user's mobile communication device, used in one example of an authentication program according to the present invention.

FIG. 22A illustrates the same login session with the RPPR authentication factor as in FIG. 21, with one time authentication challenge OTAC 5020 arriving to personal mobile communication device 5010 and a one time authentication response OTAR entered into field 18040 and field 18050 in GUI 22010 on a browser or user's 4090 laptop or desktop login screen. The only difference is that user 4090 does not need to exercise any cognitive association with a static client-server shared secret to generate a one time authentication response OTAR in fields 18040 and 18050. There is no static shared secret in this approach. Instead, a Session Authentication Credential (SAC) is generated by server 1030 (FIG. 15) and transmitted to the GUI in a browser or user's 4090 laptop or desktop login screen, once the User Name (and PIN or password as a first authentication factor in the two-factor "strong" authentication case) is recognized by the server. User 4090 can see session authentication credential SAC (a one time session-only random graphical pattern) on user's terminal 4080 highlighted with a consecutively digitized SAC at each cell along the graphical paths depicted with directed lines on two-dimensional drop-down menu grid 18060 and 18070.

In this particular embodiment, the graphical pattern (which is a part of the session authentication credential SAC) shown in FIG. 22A menu 18070, is expected to be entered into sub-fields 18040 as: "a"—occupies the $1^{st}$ field position content, "j"—occupies the $2^{nd}$ field position content, "s"—occupies the $3^{rd}$ field position, "~"—occupies the $4^{th}$ field position, "2"—occupies the $5^{th}$ field position, "1"—occupies the $6^{th}$ field position, "0"—occupies the $7^{th}$ field position, "r"—occupies the $8^{th}$ field position content, "i"—occupies the $9^{th}$ field position content. At the same time, the graphical pattern (which is another part of the session authentication credential SAC) shown in FIG. 22A menu 18060 and is expected to be entered into sub-fields 18050 as: "Dollar"—occupies the $1^{st}$ field position content "Cup"—occupies the $2^{nd}$ field position content, "Swan"—occupies the $3^{rd}$ field position, "Moon"—occupies the $4^{th}$ field position, "Tree"—occupies the $5^{th}$ field position, "Envelop"—occupies the $6^{th}$ field position, "Jet"—occupies the $7^{th}$ field position, "Guitar"—occupies the $8^{th}$ field position content, "Ship"—occupies the $9^{th}$ field position content. One time authentication challenge OTAC 5020 displayed on user's 4090 personal mobile phone 5010 and in this particular embodiment in FIG. 22A is "3 5 8".

These digits point to the specific field content of the session authentication credential SAC (the full graphical pattern with digital indexes at each cell along the paths, which are highlighted with the directed lines in drop-down menu grids 18060 and 18070) to be fulfilled in the one time authentication response OTAR entered into sub-fields 18040 and 18050. This particular embodiment in GUI 22010 presents three fields (having two sub-fields each) corresponding to three digits in OTAC 5020—"3 5 8" is a random subset of the full graphical pattern consecutive field positions. Hence, user 4090 is to generate a one time authentication response OTAR by entering into fields presented in GUI 22010 random partial SAC field "3", "5", and "8" contents pointed by one time authentication challenge OTAC 5020. The user then instantiates drop-down menu grids by indicating sub-fields 18040 and 18050. The number of fields from which the drop-down menu grids can be instantiated at any given session can be fixed or random within a certain range depending on the system administrator set security parameters.

Drop-down menu grid 18060 and 18070 instantiated from the first field shown in a particular embodiment of GUI 22010 in FIG. 22A highlight the SAC with field 3 position content—"s Swan", field 5 position content—"2 Tree", and field 8 position content—"r Guitar". The user, consecutively clicking on these cells in the menu grids 18060 and 18070 according to the OTAC 5020, enters these cell contents in respective sub-fields 18040 and 18050. In these sub-fields, the content entered can be shown as is, or it can be veiled with echo dots in sub-fields 18040 and a changed color of triangle marks in sub-fields 18050 (FIG. 18), depending on the system administrator default settings.

There are two options of SAP appearance when drop-down menu grids are instantiated in subfields 18040 and 18050 of the first field shown in GUI 22010 in the particular embodiment in FIG. 22A. In the case of the first option, the SAC for the first field also appears at each following field from which the drop-down menu grids are instantiated. Considering this option, for the second field from which the drop-down menu grids are instantiated, the user enters cell contents "2 Tree" of the SAP in menu grids 18060 and 18070. Accordingly, for the third field, from which the drop-down grid menus are instantiated, the user enters cell contents "r Guitar" of the SAC in menu grids 18060 and 18070.

In the case of the second option, different SAP is generated by server 1030 (FIG. 15) for each field of OTAR within the same authentication session and for the same OTAC. Considering this option, for the second field from which the drop-down menu grids are instantiated, the SAP, for instance, is the same as in FIG. 19B. Then, the user enters cell contents "N7 Pink Cigar" of the SAC in menu grids 18060 and 18070. For the third field from which the drop-down menu grids are instantiated, the SAP, for instance, is the same as in FIG. 19A. Then, the user enters cell content "ssssssss" of the SAC in menu grid 18060. Certainly, a particular option is selected and set by the system administrator considering authentication factor security, while the first option would be the preferred embodiment of this invention.

Then, user 4090 indicates LOGIN button 3020 to send the authentication response to server which would compare the one time authentication response OTAR with the expected authentication response, and then signal a successful or failed authentication result in a similar way as in FIG. 20 and FIG. 21. Stoplight 4020 and session elapsed time clock 4020 in FIG. 22A function identical to the previous cases.

Figure 22B:
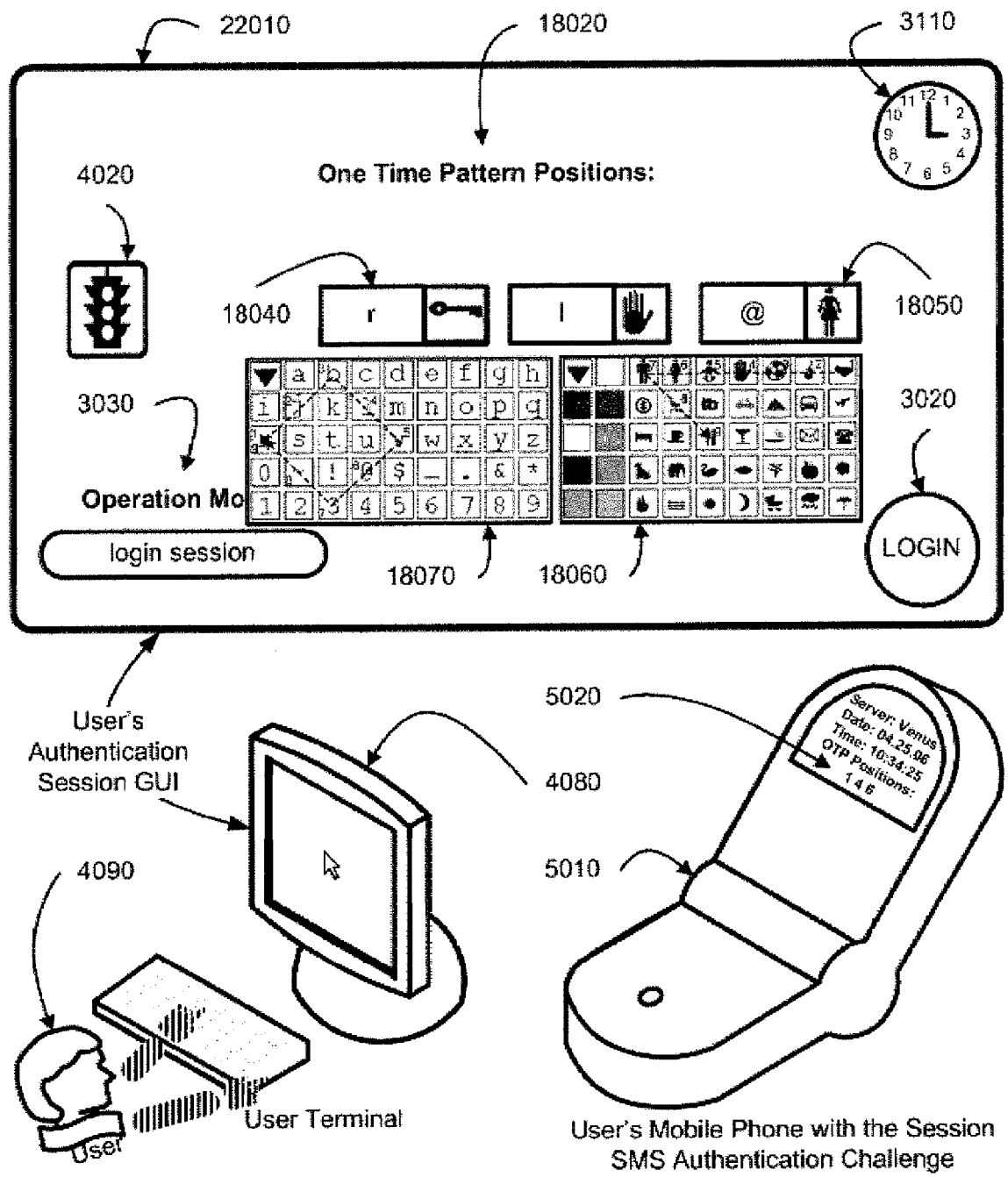
FIG. 22B illustrates a graphical user interface supporting the login process at the random partial pattern data entry state with session only valid personalized graphical pattern contents depicted on the virtual two-dimensional drop-down menu grids, and session only valid authentication challenge displayed as a SMS text message at user's mobile communication device, used in another example of an authentication program according to the present invention.

FIG. 22B is identical to FIG. 22A RPPR in its authentication login session with two-channel split between a one time authentication challenge OTAC and a one time authentication response OTAR, and a session authentication credential SAC (a one time session-only random graphical pattern) on user's terminal 4080 highlighted with graphical paths digitized at each cell along the path of selected cells along directed lines on two-dimensional drop-down menu grid 18060 and 18070 in FIG. 22B. The only difference is that it represents another example of OTAC, SAP, and OTAR. In this particular example, one time authentication challenge OTAC 5020 displayed on mobile phone 5010 is "1 4 6", whereas the graphical pattern (which is a part of the session authentication credential SAC) shown in FIG. 22B menu 18070 and is expected to be used for entering data into sub-fields 18040 as: "r"—occupies the $1^{st}$ field position content, "j"—occupies the $2^{nd}$ field position content, "b"—occupies the $3^{rd}$ field position, "l"—occupies the 4$^{th}$ field position, "v"—occupies the 5$^{th}$ field position, "@"—occupies the 6$^{th}$ field position, "3"—occupies the 7$^{th}$ field position, "~"—occupies the 8$^{th}$ field position content, "r"—occupies the 9$^{th}$ field position content. At the same time, the graphical pattern (which is another part of the session authentication credential SAC) shown in FIG. 22B menu 18060 and is expected to be used for entering data into sub-fields 18050 as: "Key"—occupies the 1$^{st}$ field position content, "Guitar"—occupies the 2$^{nd}$ field position content, "Ball"—occupies the 3$^{rd}$ field position, "Arm"—occupies the 4$^{th}$ field position, "Baby"—occupies the 5$^{th}$ field position, "Girl"—occupies the 6$^{th}$ field position, "Boy"—occupies the 7$^{th}$ field position, "Chair"13 occupies the 8$^{th}$ field position content, "Utensil"—occupies the 9$^{th}$ field position content. One time authentication challenge OTAC 5020 is displayed on user's 4090 personal mobile phone 5010 and in this particular embodiment in FIG. 22A is "1 4 6".

Then, the first field shown in GUI 22010 FIG. 22B according to OTAC 5020 has position 1 of the SAC and the user enters cell contents "r Key" of the SAC in menu grids 18060 and 18070. The second field shown in GUI 22010 according to OTAC 5020 has position 4 of the SAC, and the user enters cell contents "1 Arm" of the SAC in menu grids 18060 and 18070. Eventually, the third field shown in GUI 22010 according to OTAC 5020 has position 6 of the SAC and the user enters cell contents "@ Girl" of the SAC in menu grids 18060 and 18070. Altogether, the content entered into the fields of GUI 22010 constitute the one time authentication response OTAR based on, as shown in FIG. 22B, the particular one time authentication challenge OTAC "1 4 6" 5020 and session authentication credential SAC highlighted in drop-down menu grids 18060 and 18070.

Several security aspects of the RPPR authentication factor with a two-channel split between OTAC and OTAR, and a server generated SAC is discussed below. Similar to the RPDPR case, the fewer digits are contained in a one time authentication challenge OTAC (which is equivalent to the fewer number of data fields in the challenge to fulfill), the lower is the pattern entropy leakage per session. Similarly, the fewer objects are in a data field to fulfill, the lower is the pattern entropy leakage per session. However, the probability to guess RPPR session-specific, one time authentication response OTAR is higher in these cases. Hence, the administrator is the one to reconcile these opposite security trends in order to optimize the security strategy when choosing the security parameters. Typically, two or three digits in a challenge OTAC (that is two or three data fields to fulfill), as well as two or three objects per field set by the system administrator through security parameters and credential on-line policies would be a good compromise.

One-Channel Two-Session Challenge-Response with Session Authentication Credential A usual opportunity for a user to work concurrently with two browsers or two windows at user's laptop or desktop terminal provides a possibility of a two-channel split between OTAC, OTAR, and SAC. The scheme introduced in Table 6 shown in FIG. 31 presents the preferred embodiment of this invention. When trying to reach a protected network resource, a user is rerouted to an authentication GUI in Browser 1. Simultaneously, Browser 2 with another GUI is open for a user. The user enters the user name or user ID into browser 1 and sends it to the server. The server sends back a one time session PIN to be entered into browser 2 along with the user name or user ID. Optionally, both browsers may display a Server Watermark image after the server obtained and positively verified user name information. The Server Watermark image is preset during the user account opening process to assure server mutual authentication, which is preventing phishing attacks by warning the user from entering authentication credentials, if the Server Watermark is absent or not visually recognized. Then, in addition to that, the user is expected to enter a static PIN, chosen during the user account opening process, and information entered by the user in browser 2 GUI (user name+session PIN+static PIN) is sent to the server which verifies it first, and then sends to browser 1 an authentication GUI with a graphical construct to enter OTAR, and optionally the server also sends a Grid Watermark, which can be seen by the user each time the user instantiates a reference grid from the field.

A Grid Watermark is another visual mark authenticating the server—it contains several fields on a grid with customized background colors set by a user during account opening process. If considered together with a Server Watermark, it provides a two-factor "strong" authentication of the server to the user. Certainly, a Grid Watermark can be used in any embodiments including the RPDPR grids. In a two-factor "strong" mutual authentication of the user and server, The Grid Watermark is more secure factor compare to the Server Watermark because a Grid Watermark cannot be seen, unless the intruder knows the password (or another first authentication factor). Therefore, it is more difficult for the intruder to forge a Grid Watermark to initiate a phishing attack.

At the same time, the server sends a one time authentication challenge OTAC to browser 2, and the user already knowing the OTAC, generates a one time authentication response OTAR, combining the OTAC in browser 2 and the session authentication credential SAC in browser 1. Then, OTAR is entered into GUI in browser 1 and sent to the server, which verifies the OTAR and signals back to browser 1 a positive or negative authentication result. The two-browser scheme allows splitting between two communication sessions over the non-trusted communication network (such as the Internet) of two authentication factors in a two-factor "strong" user authentication, for example, PIN+Graphical Path presented in Table 6 (FIG. 31). Moreover, the second authentication factor is also a two-browser split between the OTAC, and OTAR and SAC. Any of the RPSSR authentication factors can be used in the two-browser scheme above.

The fundamental difference between a two-channel split challenge-response authentication method in RPSSR system and a two-browser split scheme introduced in Table 6 (FIG. 31) is as follows:

Two-channel split challenge-response assumes that each channel represents another physical network or network protocol (such as the Internet and wired phone, or wireless mobile devices, or HTTP and SMTP protocols allowing to split challenge-response between a browser and an email), but together they provide for an authentication session.

Two-browser split challenge-response assumes that it is actually two concurrent communication sessions split over the same physical network to provide for an authentication session.

Two-session split challenge-response may turn out to be more advantageous to certain extent compared to a two-channel split challenge-response because typically, a two-channel split requires either additional hardware (for instance, a mobile device) or an additional software application (for instance, an email application), whereas a two-session split challenge-response (like a two-browser split described in Table 6 (FIG. 31)) does not have these additional requirements while preserving all advantages of a two-channel split challenge-response. A two-browser split is similar to the scheme when a user receives a call during an authentication session to his personal mobile device being a pre-registered phone number with a request to call to a certain number, and when the user calls, his mobile device caller ID is checked at the server to authenticate the user. In this example, two sessions can be performed only in a consecutive manner, whereas two-browser split scheme allows for a simultaneous execution of two concurrent sessions.

One-Session One-Factor Two-Iteration Two-Channel Challenge-Response in RPSSR System with Session Authentication Credential One Time Pin or Password OTP based user authentication services utilizing a browser or user's desktop or laptop screen and user's personal mobile communication device are known in the industry and operate applying two basic architectures:

1. The user enters into a browser or a user's desktop or laptop login screen the User Name and the PIN, and then receives a SMS message from the server with OTP to be entered into the same browser or login screen
2. Alternatively, the user enters the User Name into a browser or a user's desktop or laptop login screen, and then receives a SMS message from the server with OTP to be entered into the same browser or login screen together with the PIN, forming a one string passcode Security of both architectures depends on known by user PIN or password and an ownership of a mobile device. PIN or password are believed to be a quite weak protection because numerous known attacks allow for relatively easy interception of these credentials by an intruder. Therefore, the first communication channel—the Internet browser or a user's desktop or laptop login screen are either weakly protected by PIN or password in the first architecture or not protected at all in the second architecture. This opens ample opportunities for an intruder to hijack or mimic the session as a legitimate user with the following computer-processing guessing attacks or man-in-the-middle attacks. Hence, the preemption by the intruder of the first communication channel leads to a potential breach of security even without obtaining by the intruder of the user's mobile device (the second communication channel). At the same time, the disclosure of PIN or password cannot be noticed by the legitimate user. Also, in no way PIN or password, whether they are stolen or not, relate to the safety of the user's mobile device. Conventional technique of stealing user's mobile device or getting a temporary hold of it does not have any technological protection, except locking the device with a device's PIN if not in use (which most people neglect for convenience) and being vigilant by the user. In the case of the second conventional architecture, the fist communication channel (for example, the Internet browser enabled communication session) is defenseless as the user name is not considered a secure protection at all. Then, taking over the user's mobile device by the intruder allow for an easy obtaining of the OTP with the following computer-processing guessing attacks. The combinatorial capacity of the passcode is seriously diminished in this case by a significant entropy leakage (loss of OTP). Certainly, a weak protection of both communication channels in both conventional architectures discussed above jeopardize security of this technology for the consumer market, especially if these architectures gain a wide industry acceptance and become a lucrative target for intruders (and quite possibly for intruding organizations).

Several alternative RPSSR-based architectures introduced below offer substantial security enhancements compared to conventional architectures overviewed above, while keeping the same level of usability and the nature of authentication factors—the first factor is "what user knows", and the second factor is a personal mobile device:

1. The user enters the User Name into an Internet browser or user's desktop or laptop login screen. Then, a one time RPPPR, or RPDPR, or RPPR authentication challenge OTAC appears in the browser GUI or user's desktop or laptop login screen. Now, based on the respective credential cognitive association, the user generates a one time authentication response OTAR and enters it into the same GUI. If the entered by the user information is correct, the authentication session is continuing (otherwise, an error message is sent to the user) and the server generates and sends a new OTAC to the user's mobile device, and then the user generates another OTAR based on a cognitive association with the same credential as in the first iteration. Eventually, the user enters the second OTAR of the same RPSSR authentication factor into the same Internet browser or user's desktop or laptop login screen and sends it to the server which sends back a positive or negative authentication signal, after verifying the user's response.

2. Unlike item 1, there is no second iteration, but the first iteration of a one time authentication challenge OTAC is coming to the user's mobile phone instead of the Internet browser or user's desktop or laptop login screen.

3. The same architecture as in item 1, but the second iteration of a one time authentication challenge OTAC comes to the user's mobile device along with a random session-only authentication credential SAC coming to the same Internet browser or the user's desktop or laptop login screen.

The first disclosed architecture secures the first communication channel with an RPSSR-based authentication factor, which is more resilient against intruding attacks due to a higher combinatorial capacity and a lower entropy leakage compare to PIN or password. Also, the first disclosed above architecture secures both communication channels because the second iteration OTAC coming to the user's mobile device is useless for the intruder, if the mobile device is compromised, without knowing the RPSSR shared secret. Hence, the intruder cannot break the system even having obtained both communication channels without the shared secret knowledge, whereas in the case of PIN or password, the combinatorial capacity of the credential gets drastically reduced due to a significant entropy leakage if any of the channels (the Internet browser or the user's desktop or laptop login screen, or the mobile device) is compromised. The second disclosed above architecture implies a server communicating the OTAC to the user's mobile phone before the first communication channel with the Internet browser has been proved to be owned by the user. However, it is offset by the fact that without knowing the RPSSR credential, intruder's preemption of either the browser or the user's mobile phone, or both of them together do not allow to complete the authentication session rendering the access to data failed. Yet, all the advantages of the first architecture plus the security on the RPSSR credential gets increased because the intruder cannot observe and/or record the entered OTAR data along with OTAC information which makes it more difficult to reengineer the credential. The third architecture disclosed above has all the advantages of the first ones and, at the same time, improves usability as the user does not need to remember the authentication credential for the second credential iteration. It also provides more security to the RPSSR shared secret in the first iteration as it is less exposed to the intruder's observation and/or recording during one authentication session. Essentially, all three architectures disclosed above have the same two "what user knows" and "what user has" authentication factors as the conventional architectures, but the access security is much higher in the RPSSR system.

Network and Hardware Resources

Figure 23:
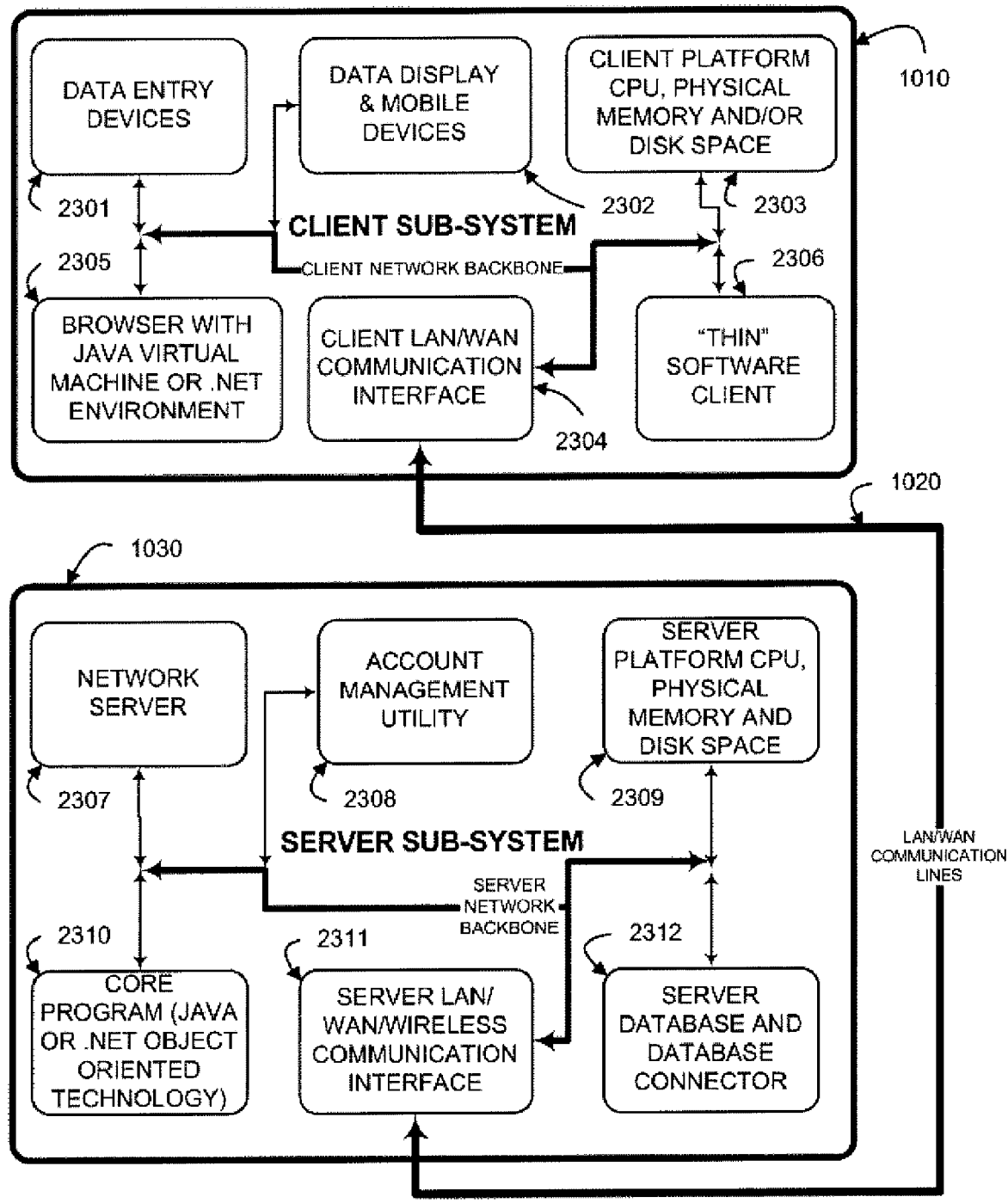
FIG. 23 is a basic architecture diagram for an embodiment of a client-server system according to the present invention, including support for the RPPPR, RPDPR, and RPPR authentication processes utilizing one communication channel (like an Internet browser) to deliver an authentication challenge to the client.

FIG. 23 illustrates a client-server system including authentication resources according to the RPPPR, RPDPR and RPPR authentication factors of the present invention. The client subsystem 1010 includes data entry devices 2301 (keyboard, mouse, voice input, etc.), a display device 2302 (CRT, LCD panel, mobile communication device, etc.), and a physical platform 2303 (personal computer, hand held computer, internet appliance, etc.) including a processing unit, memory, and other data processing resources. Software running in the client includes a browser 2305 or a "thin" software client 2306 such as may be provided on personal digital assistants, mobile phones, and other simple Internet appliances which may not support full browser functionality. The browser 2305 includes Java Virtual Machine or a NET environment which supports the client-server dialog. Likewise, the "thin" software client 2306 may support the client-server dialog. Finally, an interface 2304 to the network communication media 2330 is provided. The communication media 2330 may be a private or pubic, local area network or a wide area network using wired, wireless or optical media in representative systems.

The server subsystem 1030 includes network server resources 2307, an account management utility 2308 for the user accounts subject of the authentication process, and a platform 2309 including a processing unit, memory, disk space and other data processing resources. Core program 2310 supporting the authentication process is included in the server subsystem 1030. The core program may be implemented using Java or .NET object-oriented technology for examples. Also, a server database (or a directory service, such as LDAP) and database connector 2312 is included. Finally, an interface 2311 to communication media for server LAN/WAN communication-lines 2330 is provided. In some embodiments, the server and server data are implemented with security features to protect user account information files from intruders.

Figure 24:
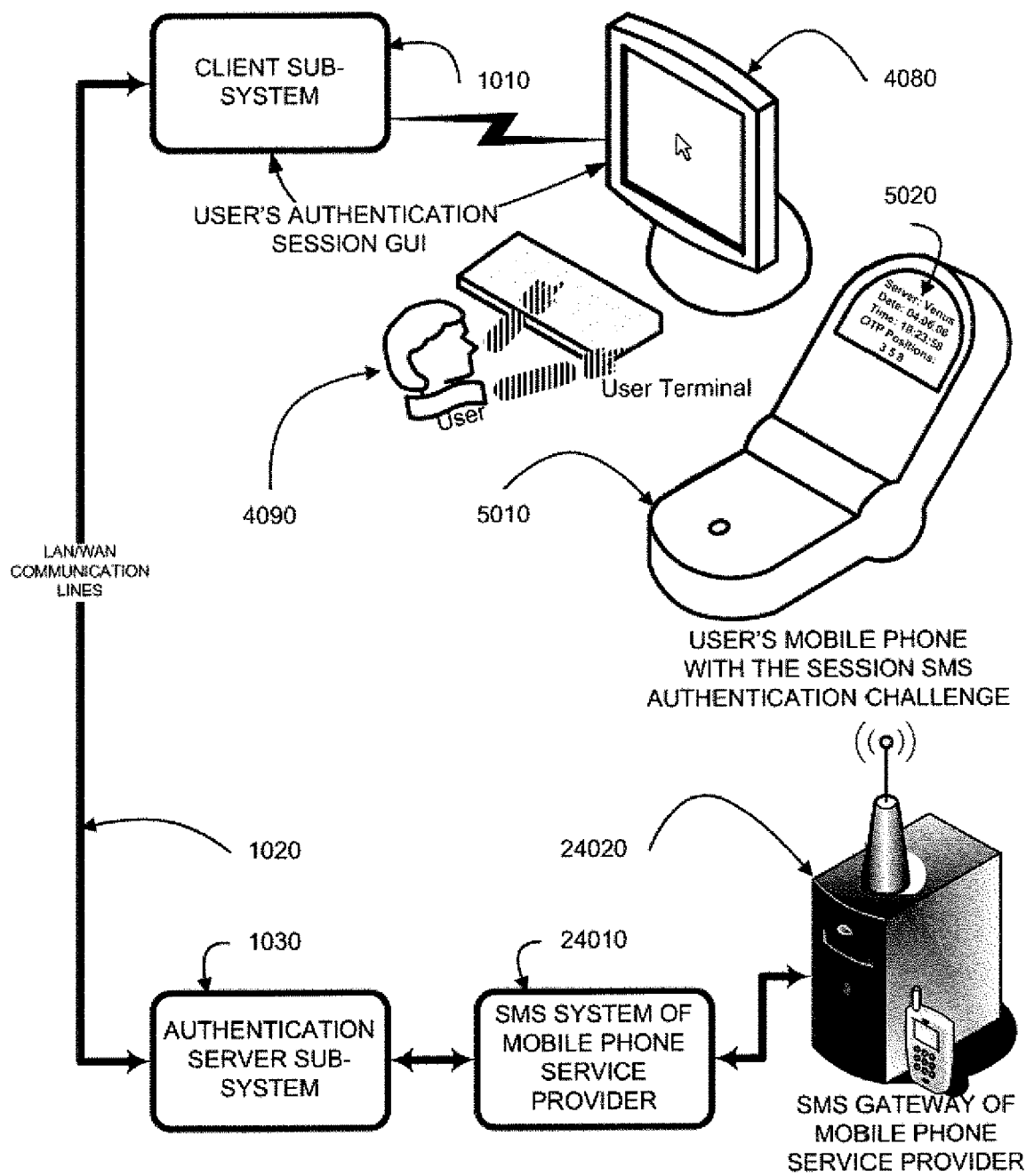
FIG. 24 is a basic architecture diagram for an embodiment of a client-server system according to the present invention, including support for the RPPPR, RPDPR, and RPPR authentication processes utilizing two communication channels (like an Internet browser and a mobile communication device) to split and deliver an authentication challenge to the client.

FIG. 24 illustrates a basic architecture of an embodiment of a client-server system according to the present invention, including support for RPPPR, RPDPR, and RPPR authentication process utilizing two communication channels (such as an Internet browser at terminal 4080 and a personalized mobile communication device 5010) to split and deliver a one time authentication challenge OTAC 5020 to user's 4090 mobile phone 5010, and a one time authentication response OTAR and a session authentication credential SAC to an Internet browser. Client sub-system 1010 and server sub-system 1030 along with communication-lines 2330 assure bi-directional message exchange between server 1030 and Internet browser or a screen of user's 4090 desktop or laptop's 2303 terminal 2301 and 4080. SMS (Short Message Service) system of mobile phone service provider 24010 directed by authentication server sub-system 1030 sends an SMS text message 5020 to user's 4090 mobile phone 5010 through SMS Gateway of mobile phone service provider 24020.

Two-Channel Challenge-Response in RPSSR System with Session Authentication Credential The authentication method presented in FIGS. 6A, 6B, 14A, 14B, 22A, 22B can be implemented with conventional object-oriented software (like J2EE, C++, etc.), Web/Network Servers, Databases, Directory Services, and Web Services technologies for remote client-server architectures. Strong authentication (two-factor user authentication) utilizes a PIN or password as a first authentication factor and the RPPPR, RPDPR, or RPPR authentication factor with a two-channel split between a one time authentication challenge OTAC and a one time authentication response OTAR. A session-only, dynamically generated authentication credential SAC as a second authentication factor provides unique advantages for mass consumer markets like e-commerce or on-line banking for several reasons—no memorization is required from a user because there is no client-server static shared secret needed to perform an authentication session, and there is no need to set up or reset unfamiliar authentication credentials except conventional PIN or password, which altogether greatly improves usability. In addition to the wide spread of mobile communication devices, which are available without any additional cost as personalized hardware authentication factors, the high security of the presented method makes it a competitor to the currently preferred strong authentication combination (PIN or password)+hardware token.

If entered correctly, the password (or PIN) in this two-factor authentication scheme plays several roles:

(i) It confirms the user to the server by the first authentication factor (ii) It triggers the server to generate a random session-only one time authentication credential SAC and sends it along with the RPPPR, RPDPR, or RPPR GUI containing a graphical construct to enter a one time authentication response OTAR (iii) It triggers the server to generate a one time authentication challenge OTAC and send it as a SMS text message to the user's personal mobile phone An intruder without a password (or PIN) cannot initiate the authentication session and invoke the second authentication factor. At the same time, an intruder without a user's personal mobile phone, where the one time authentication challenge OTAC is arriving, cannot fulfill the second authentication factor even with access to the GUI in a browser or on a screen where the session authentication credential SAC is highlighted, rendering the authentication session failed. The conventional intruder techniques of recording authentication sessions, and gathering and analyzing front-end authentication credential information to determine the user's authentication credential by entropy leakage over a number of authentication sessions, does not work in this architecture due to the integration of an authentication password (or PIN) with the RPPPR, RPDPR, or RPPR authentication factor having two-channel split between OTAC and OTAR, and session authentication credential SAC. Another conventional intruder technique of applying guessing or offline brute force computer-processing attacks, or software key logging attacks would not work in this authentication scheme because a new random session-only valid one time user authentication credential SAC is generated during each session, which defeats the purpose of the attacks. Even assuming an intruder directly observing OTAC and SAC during user's authentication session ("shoulder surfing"; 100% credential entropy loss per authentication session), it would be difficult for an intruder to reuse this short lived information (typically, it is less than a minute—a usual duration of an authentication session). There is a known security deficiency of hardware tokens—once the passcode (PIN+six digits random number which is generated every 60 seconds on the token indicator) enters communication lines, intruders who intercept the passcode, have the opportunity to reuse it during an approximately 60 second period, until the next six digit number is generated. This invention's technique does not allow any latency time for a session authentication credential SAC because once the correct one time authentication response OTAR reaches the server, the SAC is automatically obliterated.

Two-Channel Challenge-Response Authentication Method Architectures in RPSSR System In addition to preferred embodiments of this invention presented above, there are other architectures of a two-channel split between a one time authentication challenge OTAC, a one time authentication response OTAR, and a session authentication credential SAC in the RPSSR system which would be advantageous for various markets. Some of the architectures are introduced in the list below to illustrate seemingly most attractive practical combinations:

The reminder to the abbreviations is in the list below:

RPPPR—random partial PIN or password recognition authentication factor (the credential is a textual or graphical password (or PIN))

RPDPR—random partial digitized path recognition authentication factor (the credential is a graphical path on a grid)

RPPR—random partial pattern recognition authentication factor (the credential is a graphical pattern of an ordered set of field contents)

RPSSR—random partial shared secret recognition (system; authentication factor; etc.)

OTAC—RPPPR, RPDPR, or RPPR one time authentication challenge

SAC RPPPR, RPDPR, or RPPR random session-only authentication credential

OTAR—RPPPR, RPDPR, or RPPR one time authentication response

The arrow→near User Name, PIN (or Password), Voice Pattern, and OTAR points to where this information is entered, whereas the same arrow near SAC, OTAC points to where this information is delivered.

1. User Name→GUI in user's desktop/laptop login screen or browser; RPPPR, or RPDPR, or RPPR OTAC→user's mobile device in the SMS mode; OTAR and, optionally, SAC→GUI in user's desktop/laptop login screen or browser
2. User Name and PIN (or Password)→GUI in user's desktop/laptop screen or browser; RPPPR, or RPDPR, or RPPR OTAC→user's mobile device in the SMS mode; OTAR and, optionally, SAC→GUI in user's desktop/laptop login screen or browser
3. User Name and PIN (or Password)→GUI in user's desktop/laptop screen or browser; Voice Pattern→user's mobile device in the voice mode; RPPPR, or RPDPR, or RPPR OTAC→GUI in user's desktop/laptop login screen or browser; OTAR and, optionally, SAC→GUI in user's desktop/laptop login screen or browser
4. User Name→GUI in user's desktop/laptop screen or browser; Voice Pattern→user's mobile device in the voice mode; RPPPR, or RPDPR, or RPPR OTAC, and optionally SAC→GUI in user's desktop/laptop login screen or browser; OTAR→GUI in user's desktop/laptop login screen or browser
5. User Name→GUI in user's desktop/laptop screen or browser; RPPPR, or RPDPR, or RPPR OTAC and SAC→user's mobile device in the SMS mode; OTAR→GUI in user's desktop/laptop login screen or browser
6. User Name→GUI in user's desktop/laptop screen or browser; RPPPR, or RPDPR, or RPPR OTAC and SAC→user's eMail client; OTAR→GUI in user's desktop/laptop login screen or browser
7. User Name→user's mobile device in the Internet mode; RPPPR, or RPDPR, or RPPR OTAC and, optionally, SAC→user's mobile device in the Internet mode; OTAR→GUI user's mobile device in the Internet mode
8. User Name and PIN (or Password)→user's mobile device in the Internet mode; RPPPR, or RPDPR, or RPPR OTAC and, optionally, SAC→user's mobile device in the Internet mode; OTAR→GUI user's mobile device in the Internet mode
9. User Name and PIN (or Password), and Geo Location→user's mobile device in the Internet mode; RPPPR, or RPDPR, or RPPR OTAC and, optionally, SAC→user's mobile device in the Internet mode; OTAR→GUI user's mobile device in the Internet mode.
10. User Name (or a phone number/device ID)→GUI in user's mobile device browser in Internet mode; RPPPR, or RPDPR, or RPPR OTAC→user's mobile device in the SMS, or IM mode, or optionally to the user's mobile device e-mail client; OTAR and, optionally, SAC→GUI in user's mobile device browser in the Internet mode
11. User Name (or account number)→GUI in Point of Sale (POS)/ATM terminal screen or browser; RPPPR, or RPDPR, or RPPR OTAC→user's mobile device in the SMS mode or optionally to the mobile device e-mail client; OTAR and, optionally, SAC→GUI in POS/ATM screen or browser
12. User Name→GUI in Point of Sale (POS) browser; RPPPR, or RPDPR, or RPPR OTAC→POS; OTAR→GUI user's POS device
13. User Name (or phone number/device ID)→GUI-VoIP phone browser (i.e. CISCO phone); RPPPR, or RPDPR, or RPPR OTAC→GUI-VoIP phone browser; OTAR→GUI-user's VoIP phone browser
14. User Name (or phone number/device ID)→GUI-VoIP phone browser (i.e. CISCO phone); RPPPR, or RPDPR, or RPPR OTAC→user's mobile device in the SMS mode, or optionally to the mobile device e-mail client; OTAR and, optionally, SAC→GUI-VoIP phone browser
15. User Name (or phone number/device ID)→GUI— VoIP phone browser (i.e. CISCO phone); RPPPR, or RPDPR, or RPPR OTAC→user's desktop/laptop e-mail or IM client; OTAR and, optionally, SAC→GUI-VoIP phone browser
16. User Name→GUI in user's desktop/laptop login screen or browser; RPPPR, or RPDPR, or RPPR OTAC→user's VoIP phone device; OTAR and, optionally, SAC→GUI in user's desktop/laptop login screen or browser.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An interactive, computer implemented method for execution by server side computer resources in a client-server system to authenticate a client having access to a first data processing machine and a second data processing machine, comprising:

connecting via a first communication channel to the first data processing machine;

receiving an input client identifier from the first data processing machine via one or more data communications on the first communication channel;

verifying the input client identifier, and after said verifying, providing a session authentication credential comprising a plurality of storage elements to the client via one or more data communications on the first communication channel, the session authentication credential usable for only one authentication session;

connecting via a second communication channel to the second data processing machine;

providing a session authentication challenge to the second data processing machine via one or more data communications on the second communication channel, the session authentication challenge identifying a random subset of the plurality of storage elements in the session authentication credential;

accepting an authentication response, after the session authentication credential has been provided to the client, from the first data processing machine via one or more data communications on the first communication channel, the authentication response comprising a code based on a cognitive association between the subset identified in the session authentication challenge and the session authentication credential, and does not include all of the session authentication credential; and determining whether the authentication response matches the subset of the session authentication credential identified by the session authentication challenge.

2. The method of claim 1, including:

dynamically generating the session authentication credential at the server side computer resources, so that the session authentication credential for a current authentication session with the client is different than authentication credentials used in other authentication sessions with the client.

3. The method of claim 1, including executing an additional security tier including maintaining a shared secret static authentication credential in the server side resources associated with the client; and either before or after providing the session authentication credential to the first data processing machine, verifying an input matching the additional authentication credential, having been input at the first data processing machine and received via one or more data communications on the first communication channel.

4. The method of claim 3, wherein the shared secret static authentication credential consists of one of a password and a personal identification number.

5. The method of claim 1, wherein the session authentication credential includes an ordered set of data fields, data fields in said ordered set including respective field contents including one or more storage elements in the data fields in the ordered set of data fields, and the session authentication challenge comprises identifiers of positions in said ordered set of a random subset of data fields from said ordered set.

6. The method of claim 5, where the data fields in the ordered set include field contents comprising one or more storage elements represented by corresponding graphical objects on a graphical menu, and including presenting to the client via one or more data communications on the first communication channel an input construct for entry of field contents of said random subset of data fields, the input construct including a plurality of content entry data fields, and at least one instance of the graphical menu for selecting one or more graphical objects to cause entry of corresponding storage units into respective content entry data fields in the plurality of content entry data fields; and wherein the session authentication challenge identifies positions in said ordered set of a random subset of data fields from said ordered set, including one or more positions in the random subset for each of the plurality of content entry data fields.

7. The method of claim 6, wherein the instance of the graphical menu comprises a first menu including a graphical pattern of graphical objects and a second menu including a graphical pattern of graphical objects, where the first and second menus include different graphical objects, wherein the first menu and second menu enable entry of at least one storage element represented by a graphical object on the first menu and at least one storage element represented by a graphical object on the second menu into a single content entry data field.

8. The method of claim 5, where the data fields in the ordered set include field contents comprising one or more storage elements represented by corresponding graphical objects on a graphical menu, and including, presenting to the client via one or more data communications on the first communication channel an input construct for entry of field contents of said random subset of data fields, the input construct including a plurality of content entry data fields, and at least one an instance of said graphical menu for selecting one or more graphical objects to cause entry of corresponding storage units into respective content entry data fields in the plurality of content entry data fields; and wherein the session authentication challenge identifies positions of a random subset of data fields in said data set, including more than one position in the random subset for at least one content entry data field of the plurality of content entry data fields.

9. A client-server authentication system to authenticate a client having access to a first data processing machine and a second data processing machine, comprising:

data processing resources, including one or more processors, memory and a communication interface;

data stored in said memory defining including authentication credentials for clients, authentication credentials for a particular client in the database including a client identifier;

the data processing resources including executable instructions stored in said memory adapted for execution by the processor, including logic to connect via a first communication channel to the first data processing machine;

receive an input client identifier from the first data processing machine via one or more data communications on the first communication channel;

verify the input client identifier, and after verifying the input client identifier, to provide a session authentication credential comprising a plurality of storage elements to the client via one or more data communications on the first communication channel, the session authentication challenge usable for only one authentication session;

connect via a second communication channel to the second data processing machine;

provide a session authentication challenge to the second data processing machine via one or more data communications on the second communication channel, the session authentication challenge identifying a random subset of the plurality of storage elements in the session authentication credential;

accept an authentication response, after the session authentication credential has been provided to the client, from the first data processing machine via one or more data communications on the first communication channel, the authentication response comprising a code based on a cognitive association between the subset identified in the session authentication challenge and the session authentication credential, and does not include all of the session authentication credential; and determine whether the authentication response matches the subset of the session authentication credential identified by the session authentication challenge.

10. The system of claim 9, including:

logic to dynamically generate the session authentication credential at the server side computer resources, so that the session authentication credential for a current authentication session with the client is different than authentication credentials used in other authentication sessions with the client.

11. The system of claim 9, including logic to execute an additional security tier including maintaining a shared secret static authentication credential in the server side resources associated with the client; and either before or after providing the session authentication credential to the first data processing machine, verifying an input matching the additional authentication credential, having been input at the first data processing machine and received via one or more data communications on the first communication channel.

12. The system of claim 11, wherein the shared secret static authentication credential consists of one of a password and a personal identification number.

13. The system of claim 9, wherein the session authentication credential includes an ordered set of data fields, data fields in said ordered set including respective field contents including one or more storage elements in the plurality of storage elements, and the session authentication challenge comprises identifiers of positions in said ordered set of a random subset of data fields from said ordered set.

14. The system of claim 13, where the data fields in the ordered set include field contents comprising one or more storage elements represented by corresponding graphical objects on a graphical menu, and including logic to present to the client via one or more data communications on the first communication channel an input construct for entry of field contents of said random subset of data fields, the input construct including a plurality of content entry data fields, and at least one instance of a graphical menu for selecting one or more graphical objects to cause entry of corresponding storage units into respective content entry data fields in the plurality of content entry data fields; and wherein the session authentication challenge identifies positions in said ordered set of a random subset of data fields from said ordered set, including one or more positions in the random subset for each of the plurality of content entry data fields.

15. The system of claim 14, wherein the instance of the graphical menu comprises a first menu including a graphical pattern of graphical objects and a second menu including a graphical pattern of graphical objects, where the first and second menus include different graphical objects, wherein the first menu and second menu enable entry of at least one storage element represented by a graphical object on the first menu and at least one storage element represented by a graphical object on the second menu into a single content entry data field.

16. The system of claim 13, where the data fields in the ordered set include field contents comprising one or more storage elements represented by corresponding graphical objects on a graphical menu, and including logic to present to the client via one or more data communications on the first communication channel an input construct for entry of field contents of said random subset of data fields, the input construct including a plurality of content entry data fields, and at least one instance of the graphical menu for selecting one or more graphical objects to cause entry of corresponding storage units into respective content entry data fields in the plurality of content entry data fields; and wherein the session authentication challenge identifies positions of a random subset of data fields in said data set, including more than one position in the random subset for at least one content entry data field of the plurality of content entry data fields.

17. The system of claim 9, wherein said logic to connect to the first data processing machine via a first communication channel includes logic to initiate the first communication channel in response to a request from the first data processing machine; and said logic to connect to the second data processing machine includes logic to initiate the second communication channel in response to a request by server side computer resources.

* * * * *